US010612223B2

(12) United States Patent
Moore

(10) Patent No.: US 10,612,223 B2
(45) Date of Patent: Apr. 7, 2020

(54) TOILET PAN BODY AND ITS METHOD FOR MANUFACTURING

(71) Applicant: PHOENIX PRODUCT DEVELOPMENT LIMITED, Basildon (GB)

(72) Inventor: Garry Moore, Basildon (GB)

(73) Assignee: Phoenix Products Development Limited, Basildon, Essex (GB)

(*) Notice: Subject to any disclaimer, the term of this patent is extended or adjusted under 35 U.S.C. 154(b) by 0 days.

(21) Appl. No.: 15/828,020

(22) Filed: Nov. 30, 2017

(65) Prior Publication Data

US 2018/0087251 A1 Mar. 29, 2018

Related U.S. Application Data

(63) Continuation of application No. 14/382,226, filed as application No. PCT/EP2013/054212 on Mar. 1, 2013, now Pat. No. 9,834,917.

(30) Foreign Application Priority Data

Mar. 1, 2012 (GB) .................................. 1203691.9

(51) Int. Cl.
*E03D 1/012* (2006.01)
*A47K 13/24* (2006.01)
(Continued)

(52) U.S. Cl.
CPC ............ *E03D 1/012* (2013.01); *A47K 13/242* (2013.01); *A47K 13/26* (2013.01); *B32B 37/12* (2013.01);
(Continued)

(58) Field of Classification Search
CPC ........................................................ E03D 11/02
(Continued)

(56) References Cited

U.S. PATENT DOCUMENTS 1,038,834 A 9/1912 Bloom
2,431,263 A 11/1947 Lundgren
(Continued)

FOREIGN PATENT DOCUMENTS

CN 2158896 3/1994
CN 2240554 Y 11/1996
(Continued)

OTHER PUBLICATIONS

British Search Report for Application No. GB 1715487.3, Completed by the British Patent Office dated Nov. 20, 2017, 4 pages.
(Continued)

*Primary Examiner* — Lori L Baker
(74) *Attorney, Agent, or Firm* — Brooks Kushman P.C.

(57) ABSTRACT

A ceramic toilet pan 12 has a raised rear portion 18 to which a hinge tube 28 may be accurately located and fixed in position for example by adhesive using a jig 22 despite variations in pan body size due to ceramic firing, a water pump 82 and air pump 102 being provided for flushing the toilet pan 10 when a seat 58 and lid 56 are in a closed position, the seat and lid being rotationally mounted to the pan 12 by a horizontal hinge pin 180 located in the hinge tube 28, a latch member 194 being provided for latching the lid 56 and seat 58 closed, a cistern having an overflow weir 320.

37 Claims, 43 Drawing Sheets

(51) Int. Cl.
  *A47K 13/26* (2006.01)
  *E03D 5/01* (2006.01)
  *E03F 1/00* (2006.01)
  *E03D 1/32* (2006.01)
  *B32B 37/12* (2006.01)
  *B32B 38/00* (2006.01)
  *E03D 11/02* (2006.01)

(52) U.S. Cl.
  CPC .......... *B32B 38/0036* (2013.01); *E03D 1/32* (2013.01); *E03D 5/01* (2013.01); *E03D 11/02* (2013.01); *E03F 1/006* (2013.01); *B32B 2315/02* (2013.01); *Y10T 29/4943* (2015.01); *Y10T 156/10* (2015.01)

(58) Field of Classification Search
  USPC .......................................................... 4/420
  See application file for complete search history.

(56) References Cited

U.S. PATENT DOCUMENTS

| | | | |
|---|---|---|---|
| 3,080,572 A | 3/1963 | Miller et al. | |
| 3,206,769 A * | 9/1965 | Gidner | A47L 17/00 251/244 |
| 3,514,807 A | 6/1970 | Triplett | |
| 4,079,471 A | 3/1978 | Corda | |
| 4,306,321 A | 12/1981 | Norlin | |
| 4,658,447 A | 4/1987 | Smith | |
| 5,305,475 A * | 4/1994 | Jaeckels | E03D 5/10 4/325 |
| 5,708,989 A * | 1/1998 | Ellis | A47K 13/06 4/237 |
| 6,003,161 A | 12/1999 | Tomaini | |
| 6,012,886 A | 1/2000 | Tanamura et al. | |
| 6,071,034 A | 6/2000 | Cavagna | |
| 6,073,275 A * | 6/2000 | Klopocinski | E03D 9/052 4/213 |
| 6,314,841 B1 | 11/2001 | Burk et al. | |
| 6,502,251 B1 * | 1/2003 | Teshima | E03D 1/36 4/300 |
| 6,754,912 B1 * | 6/2004 | Hayashi | E03D 9/08 239/468 |
| 6,772,449 B1 * | 8/2004 | Wolfe | A47K 13/307 4/213 |
| 8,789,213 B2 * | 7/2014 | Abunameh | E03D 9/05 4/213 |
| 2004/0255727 A1 | 12/2004 | Kovach | |
| 2005/0150332 A1 | 7/2005 | Russell | |
| 2006/0278047 A1 | 12/2006 | Thompson | |
| 2007/0113331 A1 | 5/2007 | Prokopenko et al. | |
| 2007/0163033 A1 * | 7/2007 | Kelly | A47K 13/307 4/217 |
| 2008/0066584 A1 | 3/2008 | Vines | |
| 2008/0178375 A1 | 7/2008 | Moore et al. | |
| 2008/0233915 A1 | 9/2008 | Saito et al. | |
| 2008/0253919 A1 | 10/2008 | Theisen et al. | |
| 2009/0013832 A1 | 1/2009 | Duffey et al. | |
| 2009/0165198 A1 * | 7/2009 | Shalev | E03D 1/00 4/415 |
| 2009/0282954 A1 | 11/2009 | Gnatz | |
| 2011/0214228 A1 * | 9/2011 | Rosser | A47K 11/06 4/483 |
| 2012/0054950 A1 * | 3/2012 | Abunameh | E03D 9/05 4/348 |
| 2013/0180041 A1 * | 7/2013 | Ding | E03D 9/08 4/447 |
| 2014/0068851 A1 * | 3/2014 | Rosser | A47K 11/04 4/483 |
| 2015/0352705 A1 | 12/2015 | Matthews, Jr. et al. | |
| 2017/0204595 A1 | 7/2017 | Hall et al. | |

FOREIGN PATENT DOCUMENTS

| | | |
|---|---|---|
| CN | 201212180 | 3/2009 |
| CN | 101718112 | 6/2010 |
| CN | 201822786 | 5/2011 |
| CN | 201912003 | 8/2011 |
| CN | 102345317 | 2/2012 |
| CN | 203729418 | 7/2014 |
| CN | 105019526 | 11/2015 |
| CN | 205675033 | 11/2016 |
| CN | 205742453 | 11/2016 |
| DE | 9103335 | 6/1991 |
| DE | 19643067 A1 | 5/1997 |
| DE | 10061615 A1 | 6/2002 |
| DE | 202004017964 U1 | 1/2005 |
| DE | 102006020205 | 11/2007 |
| EP | 0345835 A1 | 12/1989 |
| EP | 0997097 A2 | 5/2000 |
| EP | 1041205 A2 | 10/2000 |
| EP | 1071855 | 5/2004 |
| EP | 1511904 | 3/2005 |
| EP | 1917892 A1 | 5/2008 |
| EP | 1838193 | 5/2010 |
| EP | 2287469 | 2/2011 |
| GB | 258516 | 9/1926 |
| GB | 725309 | 3/1955 |
| GB | 2256206 A | 12/1992 |
| GB | 2369626 A | 6/2002 |
| GB | 2419377 A | 4/2006 |
| JP | H09327419 | 12/1997 |
| JP | 2000332310 | 11/2000 |
| JP | 2004113656 | 4/2004 |
| JP | 2008516861 | 5/2008 |
| JP | 2010115571 A | 5/2010 |
| JP | 2011000206 A | 1/2011 |
| JP | 2016123532 A | 7/2016 |
| KR | 20020080163 A | 10/2002 |
| NZ | 245806 | 3/1997 |
| WO | 9961285 | 12/1999 |
| WO | 2006084448 | 8/2006 |
| WO | 2006084458 | 8/2006 |
| WO | 2008092208 A1 | 8/2008 |
| WO | 2009000881 A1 | 12/2008 |
| WO | 2012012250 A1 | 1/2012 |
| WO | 2013003969 A2 | 1/2013 |
| WO | 2013017419 | 2/2013 |
| WO | 2016023419 | 2/2016 |
| WO | 2017010891 A1 | 1/2017 |

OTHER PUBLICATIONS

British Search Report for Application No. GB 1715488.1, Completed by the British Patent Office dated Nov. 20, 2017, 5 pages.
British Search Report for Application No. GB 1715485.7, Completed by the British Patent Office dated Nov. 28, 2017, 2 pages.
British Search Report for Application No. GB 1715482.4, Completed by the British Patent Office dated Nov. 29, 2017, 5 pages.
British Search Report for Application No. GB 1715479.0, Completed by the British Patent Office dated Nov. 29, 2017, 2 pages.
British Search Report for Application No. GB 1715478.2, Completed by the British Patent Office dated Nov. 30, 2017, 5 pages.
British Search Report for Application No. GB 1715484.0, Completed by the British Patent Office dated Nov. 30, 2017, 3 pages.
British Search Report for Application No. GB 1715483.2, Completed by the British Patent Office dated Nov. 30, 2017, 2 pages.
International Search Report for PCT/EP2013/054212, Completed by the European Patent Office dated Apr. 30, 2013, 7 Pages.
Written Opinion for PCT/EP2013/054212, Completed by the European Patent Office, dated Mar. 1, 2013, 8 Pages.
Britsh Search Report for Application No. GB1203691.9, Completed by the British Patent Office dated Jun. 6, 2012, 2 Pages.
British Search Report for Application No. GB 1203691.9, Completed by the British Intellectual Property Office dated Jul. 4, 2017, 3 Pages.
Chinese Search Report for Chinese Application No. CN 2013800212776, Completed by the Chinese Patent Office, dated Feb. 16, 2017, 1 Page.

(56) References Cited

OTHER PUBLICATIONS

Chinese Search Report for Chinese Application No. CN 2013800212776, Completed by the Chinese Patent Office, dated May 11, 2016, 2 Pages.

\* cited by examiner

TOILET PAN BODY AND ITS METHOD FOR MANUFACTURING

CROSS-REFERENCE TO RELATED APPLICATIONS

This application is a continuation of U.S. Ser. No. 14/382,226 filed Aug. 29, 2014 now U.S. Pat. No. 9,834,917 which is the U.S. national phase of PCT Application No. PCT/EP2013/054212 filed on Mar. 1, 2013, which claims priority to EP Patent Application No. 1203691.9 filed on Mar. 1, 2012, the disclosures of which are incorporated in their entirety by reference herein.

TECHNICAL FIELD

The present invention relates to components for toilet pan bodies and toilet systems more generally, including toilet pan bodies comprising toilet pan and hinge formations, latch arrangements for toilet pan bodies, latch members for latching toilet lids to toilet pans, overflow arrangements for toilet cisterns, manifolds for toilet pan bodies and seals for connection to the underside of toilet lids or toilet seats. The invention also relates to methods of manufacturing toilet pan bodies.

BACKGROUND

EP 1071855 discloses a toilet pan body including a double acting air pump for both pressurizing a toilet cistern for forcing water into a toilet pan and for providing air into the toilet pan for flushing purposes. The toilet pan body has as hinged lid which can be sealed on top of the toilet bowl so that a chamber can be formed below a seal/locking assembly and the pan bowl below it, the seal/locking assembly having a compression seal for making an air tight seal with the rim of the pan when the toilet lid is closed, so that air pressure provided inside the chamber will cause the contents of the pan to be evacuated. The seat and lid of the toilet have separate brackets which are connected to chassis outriggers. Due to the close tolerances required for the sealing with the compression seal, the toilet pan bowl and sealing/locking assembly and toilet lid can only be made of a material such as metal which can be reliably made to very close tolerances in size during manufacture. Furthermore, the compression seal is not particularly effective at adjusting to accommodate movement of the lid away from the pan during pressurization. Also, a latch for holding the toilet lid closed is relatively complicated and involves engagement of a latch bolt with the interior surface of the toilet pan which is not particularly hygienic. Additionally, the toilet lid and toilet seat cannot easily be removed from the toilet pan for cleaning and repair purposes. Furthermore, the air pump requires a significant amount of room behind the toilet pan and toilet pan has to have separate entry points for the air and water into it.

In EP-A-1838193, it is noted that sealing arrangements for sealing a lid to a body require a high level of manufacturing accuracy which is aggravated by the fact that sanitary ware is most conveniently produced in ceramic material, where a high level of dimensional accuracy is not possible due to distortion encountered in the manufacturing process. This document discloses a toilet having a seat and lid. The seat may be sealed to a rim area of the toilet pan by a peripheral seal and the lid may be sealed to the seat by a similar seal. However, it has been found that a high level of skill and attention is required during assembly otherwise the seals used are not always consistent around the full periphery thereof and a flexible flange of each of them which extends downwardly and inwardly from the lid or seat to which it is secured can have an uneven configuration along the length periphery thereof. The toilet also includes a handle member extending all of the way around the curved front edge of the toilet, the handle member being arranged to act upon two latches positioned on the two sides of the toilet lid and which have hooks arranged to releasably engage in respect recesses in the sides of the ceramic toilet pan. It is necessary to have two such hook members on the sides of the pan so that the hooks and recesses will still engage one another despite variation of the sizes of the ceramic pans which will be produced in each batch, due to varying sizes of the pans occurring naturally during the firing process of the ceramic pans and also due to slight changes in the pan molds each time the molds are used, the molds typically being plaster and varying in size each time they are used. The latch arrangements so formed are relatively expensive to make and the toilet parts cannot easily be disassembled for cleaning/repair purposes. Furthermore, pressure on the handle member for example by sitting on it when it is slightly raised may cause a trapping hazard.

Further, EP-A-1838193 goes on to show a toilet pan constructed with a lid and seat hinge axis located horizontally through vertical opposing faces positioned within indents provided in the side of the pan. This method of construction has the advantage that the components of the hinge attachment method are elevated away from the horizontal surface of the pan top where the hinges of traditionally WCs are positioned and which makes them susceptible to contamination with urine during use, whereupon they require regular cleaning, are prone to the ingress of urine and cleaning chemicals into the hinge pin and screw clamp components whereby lubrication, swelling and corrosion of the fixings occurs resulting in torsional/skew movement of the lid and seat in relation to the pan during subsequent normal use, and an unpleasant odor developing over time, which all require disassembly to rectify, where removal of the lid and seat may be impaired by the corroded hinge fixing components. However, known methods of providing a horizontal hinge located in vertical opposing faces in the side of the pan require the hinge components to be mechanically fixed into or clamped onto holes on faces that may not be perfectly parallel due to the fact that the faces may be required to have draft angle to allow de-molding during the ceramic pan manufacturing process. Poor surface finish and/or distortion during manufacture may further cause the side faces to diverge from parallel. These inaccuracies cause co-axial misalignment of the left hand and right hand hinge pins.

Furthermore, due to the way ceramic toilet pans vary in size during the firing process, it is usual to provide two relatively large vertical bores on either side of the ceramic toilet pan at a rear end thereof through which narrower hinge components for the toilet seat and lid may be inserted relatively loosely, before adjustment in the forward/backward and left/right directions and before clamping of the hinge parts in place by tightening clamps. However, the clamps/hinge parts can loosen over time allowing the toilet lid and seat to move undesirably relative to the ceramic pan.

Furthermore, many known toilet cisterns do not have very effective overflow arrangements for preventing the cisterns from filling up too much in the event of their water inlet jamming open or, in the case of toilets with a closeable lid, from preventing foul water backflowing into the cistern from the WC in the event of sewer malfunction or flood, whereupon it is desirable for the water inlet to remain uncontaminated to protect potable water supplies.

Those cisterns that are known to provide protection against such fluid category 5 contamination are provided with a non circular overflow weir to free space through the side of one of their wall of construction, but this is unsightly and makes collecting the overflow water for onward drainage difficult and space consuming.

Furthermore, with reduced flush volumes, it is necessary to accurately direct the flow of water into the pan in order to wash its surface effectively. Water distribution nozzles are an effective way of washing the pan with little water, and the consequential elimination of a flushing rim aids cleaning and hygiene. However, the construction of modern ceramic toilets can require double wall sections, which leave limited access to locate and attach the nozzle assemblies. Ceramic sanitaryware may also have a range of wall thicknesses produced throughout the life of the mold, with nozzle holes often cut by hand causing deformation and back-surface irregularities, which make attaching and sealing nozzle assemblies difficult.

The present invention aims to alleviate at least to a certain extent at least one of the problems of the prior art.

SUMMARY

According to a first aspect of the present invention there is provided a method of manufacturing a toilet pan body having a toilet pan constructed to provide an eminence of (or raised portion having) at least two side walls rising from a rear of a substantially horizontal surface of a pan top such that holes may be provided in the side walls of the eminence in which a substantially rigid bearing or sleeve may be positioned to provide a common horizontal axis across the pan for the left and right hand hinges of the lid and/or seat, the sleeve preferably being provided with perpendicular end faces to provide parallel abutments for the pivoting faces of the seat and/lid hinge apertures, the position of the sleeve in relation to the front of the pan and the substantially horizontal surface of the pan top being controllable by oversize holes in the side walls of the eminence and the sleeve being fixed into position in the over-size holes by gap-filling cement or packing structure to form a permanent hinge axis, preferably with at least one substantially rigid hinge pin fitting within the sleeve and being of sufficient length to extend out of the sleeve and into the seat and/or lid to provide a load bearing co-axial pivot point for the left and right hand seat and/or lid hinge apertures, linear movement of the floating hinge pin(s) within the sleeve preferably being restricted by end caps provided on or attachable to the lid or seat for holding the floating pin(s) captive.

The sleeve may be of sufficient overall length for its end faces to protrude beyond both of the side walls of the eminence such that shoulders provided on the seat adjacent to the hinge apertures can locate onto the protruding portion of the sleeve to aid alignment and insertion of the hinge pin through the sleeve and seat/lid hinge apertures.

The method of manufacturing a toilet pan body having a toilet pan and a hinge formation on the toilet pan may comprise forming the toilet pan and using a jig to position the hinge formation while the hinge formation is fixed in position on the toilet pan. This is highly advantageous since the jig can be used to position the hinge formation exactly on the toilet pan in a desired position with the hinge formation thereafter being immovable relative to the toilet pan. Therefore, a toilet lid and/or toilet pan secured for hinging movement about the hinge formation will stay permanently and non-adjustably correctly positioned for hinged rotation relative to the toilet pan.

A further aspect of the invention comprises a method of manufacturing a toilet pan body having a toilet pan and a hinge formation on the toilet pan, the method comprising forming the toilet pan and using a jig to position the hinge formation while the hinge formation is fixed in position on the toilet pan.

In any of the above aspects, the method may include forming the toilet pan by a process which alters the size of the toilet pan during formation thereof. In this case, the method may include forming the toilet pan of ceramics material may include altering the size of the toilet pan during firing of the ceramics material. In this case, the use of the jig to position the hinge formation to fix the hinge formation in position on the toilet pan after the firing process is particularly advantageous, because it allows the correct positioning of consistently formed toilet lids and seats (made, for example, of plastics in accurately repeatable molding processes) relative to ceramic toilet pans which will always vary in size slightly in any manufactured batch.

The method may include providing the hinge formation as a hinge bearing tube fixed in position relative to the pan. In this case, the hinge bearing tube may be fixed in position extending fully through an aperture form through a wall of the toilet pan. The aperture may comprise a hole formed through a wall of a ceramics toilet pan prior to the application of glaze and/or firing. A method may include fixing the hinge bearing tube to the toilet pan such that, with the toilet pan oriented in a used configuration thereof, the hinge bearing tube is oriented horizontally or substantially horizontally and extending from side to side across the pan. Further embodiments of the invention may use a jig to cut the holes through the wall of as ceramic toilet pan after the application of glaze and/or the pan has been fired.

The hinge bearing tube may be an open tube extending across from the wall of the toilet pan all of the way to an opposite wall of the toilet pan and may extend through both walls and project somewhat therefrom. Thus, the hinge bearing tube may be provided with sufficient length that ends thereof project out from both sides of the toilet pan. The hinge bearing tube may be patent fully therethrough and open at both ends thereof such that, with the toilet disassembled, the hinge bearing tube may be easily flushed during a cleaning process, for example with water or cleaned with pipe cleaning rods.

The hinge beaming tube (or sleeve) may have a non-smooth outer surface. In various embodiments, an outer surface or outer surface portion of the hinge bearing tube may be knurled, textured or provided with undercuts or flutes, or a plurality of these features. This assists in providing a strong bond between adhesive or the like and the tube/sleeve.

The hinge bearing tube (or sleeve) will often comprise a cylindrical wall having a continuous unbroken cylindrical inner and an outer surfaces but in some embodiments may have a reticulated or otherwise perforated structure at least partially along its length.

The method may include providing the hinge bearing tube with an outer diameter smaller than the aperture formed through the wall of the toilet pan and the fixing of the hinge formation in position may comprise fixing the hinge bearing tube in place in the aperture (or apertures when there are two similar apertures, one on either side of the toilet pan) using packing material such as adhesive, gap filling cement or a packing spacer. The method may thus include forming the toilet pan with a support aperture larger than the hinge bearing tube so as to provide adjustment play between the support aperture and the hinge bearing tube, and positioning the hinge bearing tube with the jig in the support aperture while fixing the hinge bearing tube on the toilet pan, for example using adhesive, gap filling cement or other packing material or a packing spacer such as a circular plug with an eccentric inner bore for holding the hinge bearing tube. Thus, the hinge bearing tube may be accurately positioned using the jig and then permanently fixed in position on the toilet pan. When solidifying compounds such as adhesive (such as organic substances and/or epoxy resins) or gap filling cement are used as a packing material between the hinge bearing tube and the oversized apertures formed through the wall of the toilet pan, shapers may be placed over the ends of the hinge bearing tube to abut with the wall of the toilet pan to give the solidifying compound a flush finish with the wall of the toilet pan. In one particular embodiment of the invention, the shaper may be a collar adapted to fit onto or into the hinge bearing tube and be provided with one or more holes through its end faces to enable the adhesive to be injected through the hole into the cavity between the hinge bearing tube and the oversize hole. The shaper may conveniently be made of flexible material to form a stretch and/or compression fit with the hinge bearing tube and surrounding wall of the oversize hole, and further may be constructed of material that is incompatible with the adhesive such that chemical bonding does not occur to aid removal once the adhesive has set i.e. silicone rubber. Thus, a silicone rubber shaper may work well with an organic material adhesive or packing material such as an epoxy resin, such as a two-pack epoxy resin.

The method may include inserting a hinge pin into the hinge bearing tube. The hinge bearing tube may thus act as a journal bearing for a hinge pin. The method may include pivotally attaching a toilet seat to the hinge pin for rotation thereabout. The method may include pivotally attaching a toilet lid to the hinge pin for rotation thereabout. The toilet seat and toilet lid may thus be positioned for rotation about a firmly fixed axis relative to the toilet pan such that they will always take the same positions relative to the toilet pan when in down, closed positions thereof and will never move out of alignment.

The method may include providing a sealing arrangement for providing a sealed chamber below the lid and above the toilet pan when the lid is positioned in a closed orientation thereof. The permanently accurate positioning of the toilet lid and/or toilet seat relative to the toilet pan allows the sealing arrangement to work very reliably.

The method may include using the jig to position the hinge formation relative to a front edge of the toilet pan. Accordingly, the front edge of a toilet lid and/or toilet pan may be very accurately and permanently positioned relative to a front end of the toilet pan, despite the considerable variation in size of ceramic toilet pans during the manufacture thereof. This means that a significantly simpler and more cost effective latch arrangement can be provided for holding the toilet lid closed when the toilet is still being flushed by provision of pressure, such as air pressure, to a sealed chamber formed below the toilet lid when it is down and closed and above the toilet pan because a single central front latch can be used.

The method preferably also includes using the jig to position the height of the hinge formation relative to an upper surface of an upper rim of the toilet pan. Accordingly, the height of a toilet lid and/or toilet seat may be accurately set relative to the toilet pan despite variations in toilet pan size during manufacture when the toilet pan is of ceramics material.

The method may include using another jig to fix the location of a receiving formation on the material of the toilet pan prior to altering the size of the toilet pan during manufacture thereof. In this case, the other jig may be used, when the toilet pan is to be fired of ceramics material, to select the location of the hinge apertures made to the material of the toilet pan with respect to the front of the pan (and preferably also vertically relative to an upper peripheral rim surface of the pan) prior to firing, optionally also prior to glazing of the pan. Therefore, although the size of the toilet pan will change during the firing process, the use of the other jig will help take account of variations in the size of the unfired toilet pans in a batch thereof which would naturally occur when the molds thereof will change in size slightly each time they are used, for example when the molds are made of plaster.

According to a further aspect of the present invention there is provided a toilet pan body comprising a toilet pan and a hinge formation, the hinge formation being fixed relative to a receiving formation of the toilet pan by packing located between the hinge formation and the receiving formation so as to inhibit relative motion between the hinge formation and the receiving formation. Advantageously therefore, when the toilet pan is made of ceramics material, the position of the hinge formation relative to it may be first adjusted and then fixed in place by the packing material. The packing may comprise adhesive, gap filling cement or other packing material fixing the hinge formation and receiving formation relative to one another.

The receiving formation may comprise an aperture formed through a wall of the toilet pan and the hinge formation may comprise a hinge bearing tube extending through the aperture with a clearance therebetween, the packing out the clearance. The toilet pan may have two said apertures, one positioned on either side of the toilet pan and extending through respective walls of the toilet pan on either side thereof. Typically, the apertures will be formed in generally vertical and parallel surfaces located on either side of the toilet pan near a rear end, or on an eminence of at least two side walls rising from the rear of the substantially horizontal surface of the pan top thereof.

The hinge bearing tube may extend fully across the toilet pan from one side thereof to another, the hinge bearing tube preferably being fully patent therethrough and open at both ends. This allows the hinge bearing tube to be easily flushed with water or pipe cleaning rods and clean when the toilet is disassembled.

The toilet pan body may include one or at least two hinge pins arranged for insertion in and along the hinge bearing tube. At least one of the hinge pins may in length be less than or equal to about half of the length of the hinge bearing tube. This has the advantage that relatively short hinge pins may be used so that when the toilet pan body is positioned in a narrow space such as a narrow toilet cubicle it is still possible to remove the hinge pins from the hinge bearing tube without inference of the hinge pins with the side wall of the toilet cubicle or other surrounding building structure. Thus, one long hinge pin extending fully along through the hinge bearing tube and extending far out from the two ends thereof during assembly/disassembly is not necessarily used and the toilet pan body can be installed in narrow spaces.

The toilet pan is preferably formed of fired ceramics material.

According to a further aspect of the present invention there is provided a toilet pan body comprising a toilet and a hinge bearing tube located extending across the toilet pan so as at least partly to define a hinge axis arranged for pivotal coupling of a toilet lid or toilet seat to the toilet pan. This arrangement, with a hinge bearing tube extending across the toilet pan, is highly advantageous since the tube can easily be cleaned and reliable positioning of the hinge axis is possible.

The toilet pan body may include a toilet seat pivotally coupleable to the toilet pan. The hinge bearing tube may project from the toilet pan and the toilet seat may include an alignment member arranged to engage the hinge bearing tube to align the toilet seat and hinge bearing tube relative to one another.

The toilet seat may include a projecting bearing member and a toilet lid may be provided, the toilet lid including a second alignment member arranged to engage the projecting bearing member to align the toilet lid and toilet seat relative to one another. Accordingly, the alignment members may significantly aid the assembly process. A said alignment member may comprise an arcuate formation. The toilet seat may be provided with a through bore adjacent the alignment member and a hinge pin, when the toilet pan body is in a use configuration, may extend out of the hinge bearing tube into the through bore of the toilet seat. The toilet lid may be provided with a through bore adjacent the second alignment member and a hinge pin may, with the apparatus in a use configuration, extend out of the hinge bearing tube into the through bore of the toilet lid.

An end cap may be securable to the toilet lid adjacent the through bore thereof for restraining the pin in the hinge bearing tube. The length of the hinge pin or multiple hinge pins when several are provided along the through bore may be substantially the same or slightly less than the distance between co-operating parts of the end caps. Accordingly, the hinge pin may be an easy sliding fit inside the hinge bearing tube (i.e. axially floating) but held well in the axial direction so that it will always serve as a hinge point for the toilet lid and toilet seat. The end cap may be removably fitted to the toilet lid thereby enabling the hinge pin to be removed and the toilet lid and toilet seat to be removed from the toilet pan. Accordingly, the hinge bearing tube may be easily cleaned and the toilet lid and seat may be easily removed for cleaning and repair purposes as well.

The toilet pan may include an upper peripheral rim having an upper surface lying in a first plane and a rear raised portion, the bearing tube extending through the rear raised portion with the hinge axis thereof being located above the first plane. The rear raised portion is advantageous since it allows the toilet seat and/or lid to be formed as relatively flat components with hinge bores thereof generally in the same plane as main lid and seat components thereof, respectively, such that relatively small molds can be used to make the toilet lid and toilet seat.

A further aspect of the invention comprises a toilet pan having a recess in a front surface thereof. The recess may be located in the center of the toilet pan front surface. The recess may conveniently and advantageously provide a latching surface for a single latch for centrally latching a toilet lid shut.

According to a further aspect of the present invention there is provided a latch arrangement for a toilet pan body comprising a toilet pan and a toilet lid, the latch arrangement having a latch member being moveable, when a toilet lid is in a closed position on a toilet pan, between a latched position locking the toilet lid against upward movement relative to the toilet pan and a released position in which the toilet lid is liftable relative to the pan, wherein the latch member is arranged for location under the toilet lid in the closed position and is arranged to push up under the toilet lid when in the released position and pulled upwardly. This latch arrangement is highly advantageous since it can be made very simply and relatively strongly. The latch arrangement also has no trapping hazard.

According to a further aspect of the present invention there is provided a unitarily-formed latch member for selectively latching a toilet lid to a toilet pan, the latch member being arranged to be pivotally mountable to a toilet lid and moveable, when the toilet lid is in a closed position on a toilet pan, between a latched position locking the toilet lid against upward movement relative to the toilet pan and a released position, the latch member having an integral lifting handle which is directly manually operable for directly lifting the toilet lid by hand when the latch member is in the released position thereof. Accordingly, a very simple latch member may be provided and trapping hazards may be avoided.

The latch member may include at a top end thereof a bore engageable by a pivot pin.

The latch member may include a stop member located part way therealong between a top end thereof and a manual operation location thereon, the stop member being arranged to engage the toilet lid upon lifting of the latch member, thereby causing a reaction force at the top end of the latch member. The top end of the latch member may be pivotally supported by an upwardly facing bearing surface of the toilet lid, the stop member thereby causing a downward reaction force on the upwardly facing bearing surface upon lifting of the latch member. This is highly advantageous, since the latch member may be used to lift the toilet lid with a very effective wedging action in which the more force which is applied to the manual operation location of the latch member the more securely the top end of the latch member is supported by the upwardly facing bearing surface.

The latch member preferably locks automatically upon closing the toilet lid.

The toilet lid may include an installation aperture, the latch member being insertable up through the installation aperture to a position in which a hinge pin is insertable into the latch member, the latch member thereafter being lowerable for engagement of the hinge pin with a bearing surface of the toilet lid. This enables a very simple installation procedure for the latch member. After lowering of the latch member, a cap may be attachable to the toilet lid for holding the latch member captive. The cap may be removably attachable to the toilet lid to enable removal of the hinge pin and latch member from the toilet lid. Accordingly, the latch member may very simply be removed from the toilet lid for cleaning or repair purposes. In a preferred embodiment of the latch assembly, the cap is provided with one or more sprung snap tang latches that engage into corresponding slots positioned in the lid such that the tangs pass through the corresponding slots in the lid and are forced to bend inwards by the downward motion of the cap until the tangs have passed right through the corresponding slots in the lid and move clear of the underside of the lid slots whereupon they snap back to their original position holding the cap captive on the lid. Squeezing the tangs together from the underside of the lid disengages them, whereupon they can be pushed back through the lid slots to release the cap.

According to a further aspect of the present invention there is provided a cistern body for a toilet system comprising a cistern chamber, the cistern chamber comprising a water reservoir and a water pump, the water pump being arranged to be operable by electrical power to pump water under pressure out of a water outlet from the cistern body. The use of an electrical water pump within a cistern body for a toilet system enable a toilet system which is very reliable and effective on low water volumes due to the use of an electrically powered water pump and is compact since it is not necessary to provide additional pumping means outside the cistern for providing the motive force to drive water in a flushing cycle and it is not necessary to rely upon gravity to provide the flushing water. In a preferred embodiment of the cistern, the water pump operation is by centrifugal impeller, which has the advantage that when at rest, water may free-flow over the impeller and through the body of the water pump to provide an overflow or an internal warning pipe to the WC pan through the water conduit and nozzle washing system, the nozzle apertures may collectively have a cross sectional area equal or greater than the outlet bore of the water pump so that gravity flow from the pump is not restricted, and the specific requirements of regulations relating to overflow warning pipes may be met.

In the above aspects (and in another aspect of the invention) the water inlet valve may include a shroud to deflect the incoming flow of water from the surface the water reservoir in order to prohibit splashing of the inlet valve and possible contamination of the incoming water supply.

The cistern body may include an air pump located in the cistern chamber, the air pump being operable to pump air out of an air outlet from the cistern body. The air pump and water pump may therefore be used together, either simultaneously or one after the other or overlapping in their pump durations during a flush cycle and both may be provided within the cistern body, thereby providing a very compact toilet system in which all flush pumping components are contained in a single cistern body, thereby enabling very quick installation and repair of toilet cisterns. Also, the cistern body can be used with a toilet pan of generally standard dimensions which does not need a large space behind it for a large air pump as in the prior art.

Patent US 2008253915 discloses a self aligning rotary piston machine where a single rotor fits within a single cylinder, which can be constructed with tapered walls to provide the draft angle necessary to allow de-molding when manufactured through the plastic injection molding process. However, the need for compact sizing and high volumetric displacement requires the cylinder and rotor to be of a length that is prone to distortion through the plastic molding process, and the required draft angle over the length of the long cylinder represents a significant change in diameter between the two ends.

The air pump of the preferred embodiments of and in accordance with one aspect of the current invention overcomes these problems by comprising a rotor and cylinder both constructed in two halves, which join over a central drive shaft to form a completed assembly. The advantage of this approach is that the length of the components is halved, so stresses and distortion encountered during the manufacturing process are greatly reduced, and the draft angle of the cylinder halves has a reduced effect on the difference between the end diameters. However, distortion during operation occurs to the cylinder when it comprises two cylinder halves joined together directly, so the present invention provides a flange ring onto which the two cylinder halves are attached, which provides dimensional stability during operation.

A control, which may be electronic, may be arranged to operate the water pump for a predetermined time during a flush cycle. In some embodiments, the water pump may be operated based upon water level.

Sensors may be arranged in the cistern to determine the level of the water therein and to control the operation of the water pump and/or air pump accordingly therewith.

The cistern body may include a one way valve located in an outlet path downstream of the water pump. Accordingly, where an air pump is provided for providing pressure to a toilet pan to evacuate the contents thereof when the top of the pan is sealed closed, air/water are not pushed back up through the water pump into the cistern. The valve, when in its natural open position allows an unrestricted free flow of water such as may be required during a gravity overflow situation. When in this position, the valve may have a minimum cross-sectional area for flow of at least 19 mm$^2$ all of the way along its length. The valve advantageously requires little or no back pressure or fluid pressure to move it between open and closed positions. The valve may have a poppet element of substantially neutral buoyancy in water. The valve is thus advantageous over prior valves which have in-built hysteresis requiring a substantial pressure change before the valve will move between open and closed and vice versa.

Where hoses are required to be attached between the cistern outlet connectors and the pan inlet manifold connectors, it is advantageous for the connectors to be able to swivel to prevent kinking of the hoses during installation. At least some connectors of embodiments of the present invention consist of a hose cuff that may be permanently attached to the hose, and corresponding connectors on the cistern outlet and pan inlet manifolds to form a sliding fit with the hose cuff, the hose cuff being adapted with two or more slots in its side that align with a rebate in the connector to receive a spring clip such that the clip holds the cuff captive on the connector while still allowing it to swivel. A similar connector may be provided for connecting an outlet elbow or outlet pipe to the water pump's outlet.

Also, for example in the case of a pipe-receiving socket on an anti-water-backflow valve body, a joint between the socket and a connected pipe such as a pipe leading to the water pump may be sealed with an O ring, whereupon the joint becomes telescopic to accommodate any manufacturing discrepancies between the height of a water down pipe and/or water pump and the valve body.

The cistern body may include a conduit leading to atmosphere from a location in the outlet path which is between the water pump and the one way valve. This advantageously enables any potential siphoning action through the water pump to be broken clearly, especially if the water pump is arranged to pump water from a water reservoir of the system upwards into a conduit which then turns downwards on its way towards the toilet pan and when the water pump is switched off. Even though the use of such a siphon-breaking conduit may allow a small amount of water to be pumped through it and back into the water reservoir when the water pump is operated, the conduit is relatively small in area and during water pumping and only a small proportion of the water pumped by the water pump passes through it. Similarly, the small amount of air that the conduit admits into the water siphon during flow conditions is carried along with the water flow until the water flow stops when the siphon breaks, whereupon it rapidly equalizes any partial vacuum that exists in the internal void of the downpipe by venting it to atmosphere to prohibit any partial siphon conditions occurring or remaining.

A current sensor may be provided for sensing current draw by a motor of the air pump when one is provided, and a control for the air pump may be arranged to stop or slow the air pump motor in response to a signal from the sensor indicative of air pump motor current draw dropping below a predetermined value. Accordingly, the air pump, when it is used to evacuate the contents of a toilet pan under pressure, may be switched off when current draw drops, indicative that the pan contents have been evacuated due to decreased resistance to the air flow provided by the air pump. This control method is advantageous where the toilet is connected to small diameter drains where continued air flow from the toilet flush will push the water along the drain until the air is vented, whereupon the wastewater reverts to gravity flow and the load on the motor drops.

Alternatively, a control may be provided for operating the air pump for a predetermined time during a flush cycle.

The cistern body may be provided with an overflow weir wall located by the water reservoir.

According to a further aspect of the present invention there is provided an overflow arrangement for a toilet cistern, the overflow arrangement comprising an overflow weir wall locatable by a water reservoir of a toilet cistern. The use of a weir with a toilet cistern is required to satisfy the requirements of Fluid Category 5 safety classification, which enables a substantial flow rate of water to be evacuated from the cistern through a non circular slot to free space should a water inlet to the system jam open or foul water backflow from pan to the cistern in the event of a sewer flood or other drainage malfunction. This is particularly advantageous when electrically powered components, such as a printed circuit board or other electrical components are provided within the cistern body along with an electrically powered water pump and/or electrically powered air pump for flushing purposes. The overflow weir can very reliably prevent the water level in the cistern from rising too high and causing damage to electrical components or a hazardous situation due to a high water level, or from contaminating the inlet water feed network.

The overflow weir wall may separate the water reservoir from a generally downwardly directed overflow channel. The overflow channel may be arranged to be a rectangular-sectioned substantially vertical or generally upright channel, which is in constant unobstructed communication with the surrounding free space, particularly below. The channel is preferably located inside the cistern body. The overflow weir wall may provide at least part of one or more of the water reservoir's containing walls. The top of the wall of the overflow channel is preferably lower than the surrounding walls of the water reservoir sufficient to form a weir into the vertical channel when an overflow condition occurs, with water being channeled down the vertical channel inside the cistern body and out of the bottom of the cistern into the surrounding free space. The overflow weir wall may have three wall portions which correspond to three walls of the rectangular-sectioned vertical channel and over which overflow water may run. With these arrangements, a relatively long length of non-circular overflow weir wall may therefore be provided internally and in a relatively small space, and may be manufactured as an integral part of a single molded cistern without needing to be joined or welded, and without requiring a visible overflow slot to free space through the side of the cistern.

A lower end of the overflow channel is formed to provide a rim to prohibit the movement of water away from the overflow channel and may be formed with a collection hopper leading to an outlet of the overflow arrangement for onward drainage. A collection hopper connecting to a circular onward drainage system requires a non-circular overflow weir to meet the same requirements as fluid category 5 classification, so it may be mounted a sufficient distance below the overflow channel to provide a spill-over weir, or may be provided with a side aperture and connect directly to the cistern. The overflow channel may be provided with a side aperture above the outlet of the overflow arrangement, the side aperture providing an overflow escape path for the eventuality that flow via the outlet is blocked for whatever reason. Therefore, the side aperture may advantageously act as a reserve overflow path to minimize further the chances of the water level in the cistern rising too high.

The cistern may be mounted onto a wall bracket. The collection hopper may be attached to the wall bracket and held in close proximity to the overflow channel, but remain attached to the wall bracket, together with any associated plumbing for onward drainage, if the cistern is removed from the bracket.

According to a further aspect of the present invention there is provided a manifold for a toilet pan body, the manifold having an air inlet, a water inlet and at least one air outlet and at least one water outlet, the manifold having an end connector adapted to connect both a said air outlet and a said water outlet to a single delivery aperture in a toilet pan body. Therefore, it is not necessary to provide too many inlet apertures into a toilet pan which is to be flushed by the use of both air and water.

The manifold may include an outer air delivery channel and an inner water delivery channel for transmitting water along inside the outer air delivery channel. An end plug may be connectable to the outer air channel for sealingly holding a wall of the toilet pan body between the outer air channel and the end plug, the end plug including outlets for distributing air and water into a toilet pan. The use of the end plug may therefore conveniently help position the manifold relative to a toilet pan of a toilet pan body.

The end plug may be a telescopic sliding fit into the air delivery channel, such that the two components may come together to tightly clamp the around the aperture of the pan over a varying range of pan wall thickness. Where the end plug is a telescopic sliding fit into air delivery channel, the components of the water conduit may also be a telescopic sliding fit into each other to further accommodate the range of wall sicknesses around the pan inlet aperture.

The air manifold may slope downwards towards the pan inlet aperture sufficient to provide a natural drain into the pan for any water that leaks form the water inlet delivery system during use, or which backflows into the manifold from the pan during flushing or cleaning.

The manifold may include a splitter for splitting a single incoming water flow between a plurality of water outlets from the splitter. The splitter may be mounted to the outer air delivery channel outside the outer air delivery channel and at least one of the water outlets from the splitter may be connected to a conduit leading into and then along inside the outer air delivery channel. This novel configuration is highly advantageous since it allows both air and water to be provided for flushing purposes to a toilet pan reliably and when limited space is available inside/under the toilet pan for positioning air/water delivery components therein/thereunder.

The water manifold/splitter may be located on top of the air manifold to allow the gravity flow of water from the cistern into the pan during flushing and during warning of an overflow condition through the body of the water pump. The manifold may be housed within an eminence provided at the rear of a toilet pan and may be connected to a transverse hinge sleeve located within the eminence sufficient to provide immobilization of the manifolds during fitting and use.

Central or rear water nozzle may be included within the air manifold outlet plug plate/air outlet nozzle into the pan.

Where the outlets for distributing water into the toilet pan are nozzles, they may be located around the inside of the pan to give an even washing pattern for the bowl. The rear of any nozzle mounting holes that are positioned on the sides of the bowl may be difficult to access, whereupon the nozzles may include an elbow to fit behind the hole and consisting of one arm adapted with a sleeve to fit through the mounting hole and a second arm adapted to connect to a hose for fluid communication with the water inlet system, and a front deflector plate adapted with a sleeve to connect with the elbow sleeve, both parts having engaging means such that when they are assembled, they engage with each other and sandwich the mounting hole between them in a sealing manner. The method for locating and supporting the elbow during assembly may comprise a positioning tool that slides into, or over, the hose and into, or around, the elbow. Gap-filling cement may be applied to the elbow, including a flange provided on the elbow, and the tool then used to push the hose, elbow and cement assembly through an access hole in the rear of the pan and treadle it along the pan cavity to position it where it can be seen through the nozzle mounting hole, whereupon a second tool engages the elbow assembly and pulls the elbow sleeve through the mounting hole until the cement on the elbow flange comes into contact with the rear face of the nozzle mounting hole. In a preferred embodiment of the invention, a jig is used to align the front face of the elbow sleeve with the front face of the nozzle mounting hole, thus forming a flush assembly that becomes a fixture once the gap filling cement has cured, whereupon the alignment jig is removed and the alignment tool extracted, leaving the hose hanging out of the rear access hole ready for connection to the water distribution system. It will be appreciated that with such an arrangement, the sleeve of the elbow will consistently form a sealed fixture that is flush with the face of the nozzle mounting hole regardless of the thickness or irregularities of the ceramic wall, whereupon the sleeve of the deflector plate may be conveniently pushed into the sleeve of the elbow and have engagement means set at a known measurement.

According to a further aspect of the present invention there is provided a seal for connection to the underside of a toilet lid or toilet seat for sealing the same to a toilet seat or toilet pan respectively, the seal comprising an elongate ring-like member having a cross-section comprising a flexible flange member extending from a base member, the base member being relatively rigid compared to the flexible flange. This arrangement is highly advantageous since the rigid base ensures that the flexible flange has a consistent configuration relative to a toilet lid or toilet seat once installed thereon. In particular, the rigid base member is not stretchable during the installation of the seal arrangement so that the flexible flange member part of the seal is not stretched along its length around the ring-like form thereof.

The base may contain one material and the flexible flange may be of another material. The flexible flange may be over-molded on to the base. The flexible flange may be arranged to extend generally downwardly and inwardly from the base member and may be connected to the base member at or near an outer peripheral edge of the base member such that air pressure during flushing pushes the flexible flange onto the mating pan or seat surface. The base member may be generally flat and horizontal and may be arranged to be a push fit in a cooperating slot of a respective toilet lid or toilet seat, for example a ring-like slot in an underside surface thereof, whereupon the flexible flange material of the seal is compressed onto the rigid ring material to seal and grip the receiving slot.

A further aspect of the invention comprises a method of positioning a toilet component within a toilet pan body during assembly which comprises holding the toilet component with a tool while the component is secured in place on the toilet pan body.

The toilet component may include a hose and in the tool may be slid into or over the hose to hold it, the tool preferably comprising an elongate rod.

The toilet pan body may be ceramics and may include an aperture leading to a space between walls of the ceramics pan, the method including inserting the toilet component in through the aperture while holding it with the tool. The aperture may be formed in a rear ceramics wall of the toilet pan body.

The toilet component may include an elbow member and the method may include holding the elbow member with the tool while it is secured to an aperture formed through to a water flushing upper surface of a pan of the toilet pan body.

A further aspect of the invention provides a seal for connecting to the underside of a toilet lid or toilet seat for sealing the same to a toilet seat or toilet pan respectively, the seal comprising an elongate ring-like member and including at least one buffer integrally formed therewith or connected thereto.

A further aspect of the invention provides a drainage system comprising at least one drainage conduit, means for pressurizing the drainage conduit for transporting matter, such as waste and/or water, along the drainage conduit, wherein a control is provided for sensing a drop in resistance to pressurization and stopping and/or reducing pressurization of the drainage conduit in response thereto.

BRIEF DESCRIPTION OF THE DRAWINGS

The present invention may be carried out in various ways and a number of components in accordance with various aspects of the invention and methods of manufacturing toilet pan bodies will now be described by way of example with reference to the accompanying drawings, in which.

DETAILED DESCRIPTION

Figure 1A:
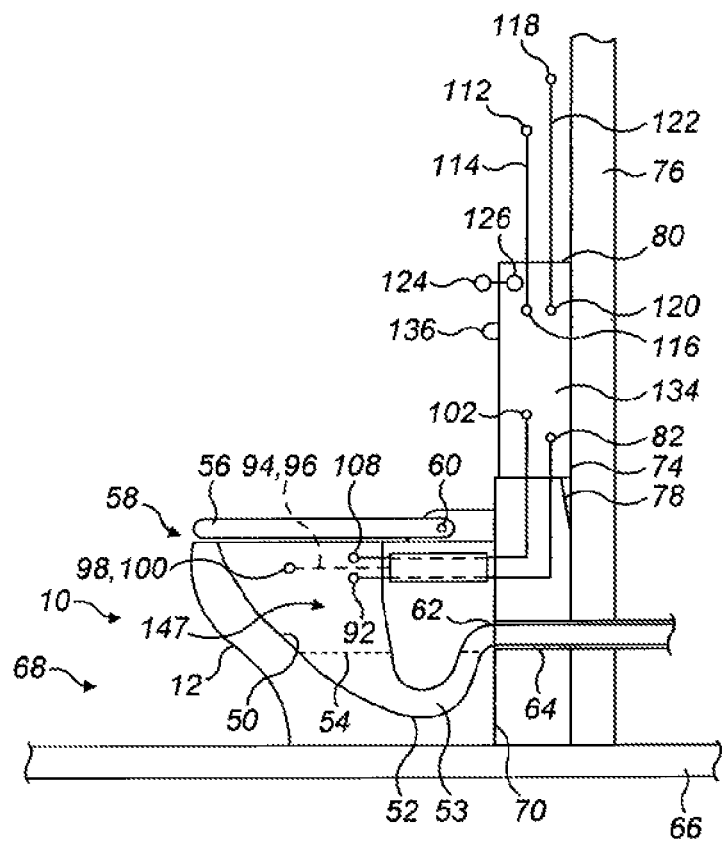
FIG. 1A is a schematic side view of a preferred embodiment of a toilet system in accordance with various aspects of the present invention.
Figure 1B:
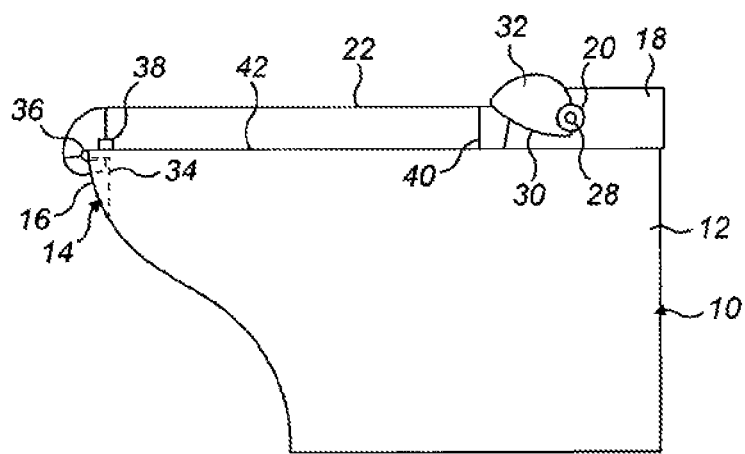
FIG. 1B shows a preferred embodiment of a method of manufacturing a toilet pan in accordance with an aspect of the present invention.
Figure 3A:
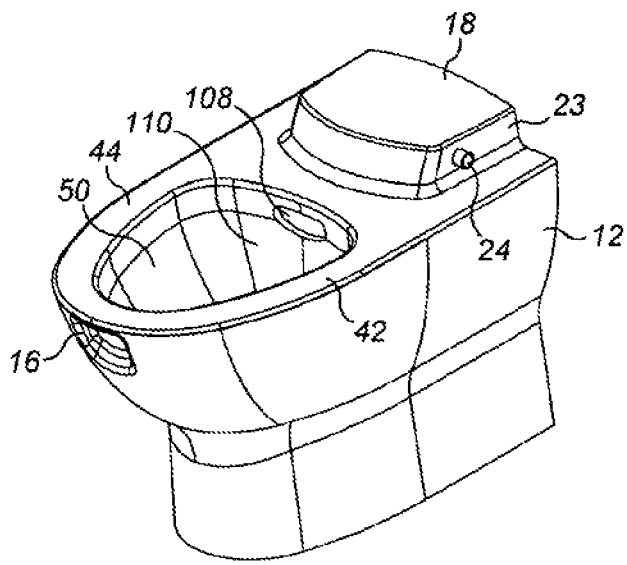
FIGS. 3A to 3G show various components of the toilet system of FIG. 1A during assembly thereof.
Figure 3B:
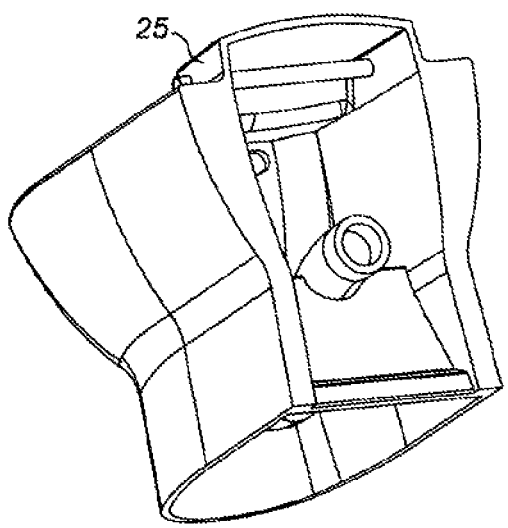
Figure 3C:
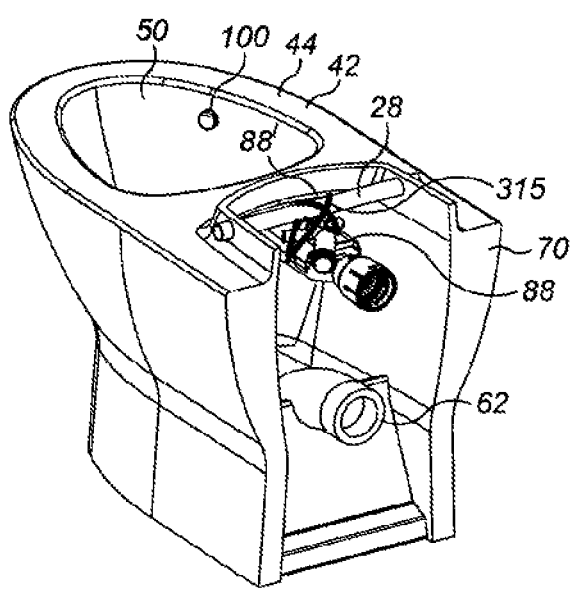
Figure 4A:
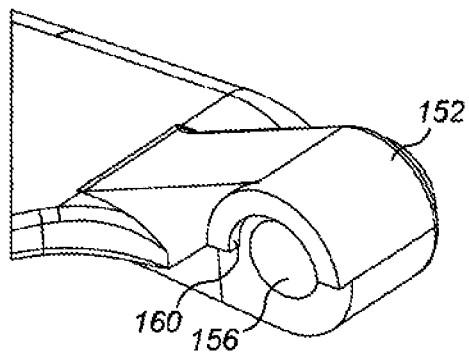
FIGS. 4A to 4D show enlarged views of part of a toilet seat of the toilet system with FIGS. 4C and 4D also showing part of the toilet pan of the toilet system.
Figure 4B:
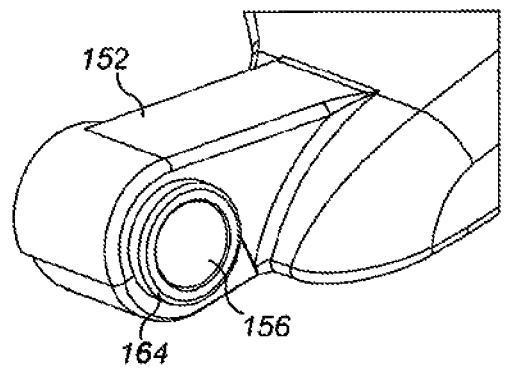
Figure 4C:
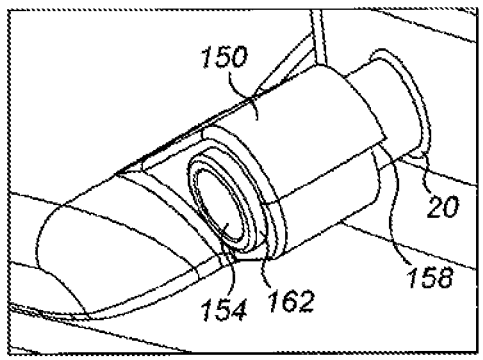
Figure 4D:
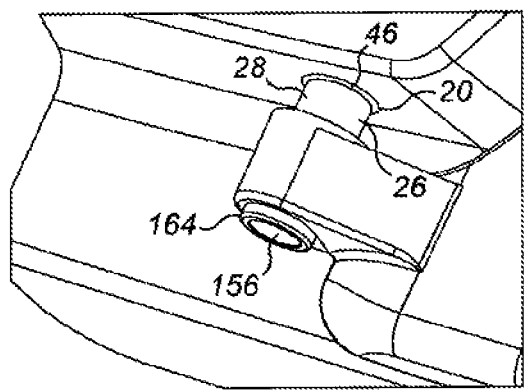

In accordance with a preferred embodiment of a method of manufacturing a toilet pan body 10 in accordance with the present invention, a ceramics toilet pan 12 with a latch recess 14 positioned at a front end 16 thereof and an eminence or a raised central rear portion 18 has a pair of apertures 20 (see FIGS. 1B, 4C and 4D, the apertures 20 being absent in other drawings for the purposes of clarity). The apertures 20 are essentially transverse horizontally arranged bores formed through two side walls 23, 25 of the rear raised portion prior to glazing and firing of the toilet pan. As shown in FIG. 1B, a jig 22 is used to clamp both ends 24, 26 of a hinge formation 28 in the form of a sleeve or hinge bearing tube in position relative to the toilet pan 12. FIG. 1B only shows two clamp members 30, 32 of the jig 22 which hold one end 24 (see FIG. 3A) of the hinge bearing tube 28, two more clamp members (not shown) being provided for holding the other end 26 (see FIG. 4D). The jig 22 has positioning members 34, 36 to position the jig 22 and therefore the hinge bearing tube 28 relative to the latch recess 14 and front end 16 of the toilet pan 12, respectively. The jig 22 also has further positioning members 38, 40 to position the height of the clamped hinge bearing tube 28 relative to a top surface 42 of a rim 44 of the toilet pan 12 (see FIGS. 1B and 3C). While the hinge bearing tube 28 is so positioned, it is noted that an outer diameter of the hinge bearing tube 28 is smaller than the inner diameters of the apertures 20 formed through the side walls 23, 25 of the raised rear portion 18. Therefore, despite the fact that the size of the ceramic toilet pan 12 (which has been fired) may vary from toilet pan to toilet pan in a batch and, in fact, this is virtually inevitable, there is play between the outer diameter of the hinge bearing tube 28 and the apertures 20. Therefore, with the positioning members 34, 36 and further positioning members 38, 40 of the jig (as well as additional laterally spaced further positioning members (not shown)) in contact with the top surface 42 of the rim 44, the hinge bearing tube 28 is positioned horizontally with its height above the top surface 42 and its distance behind the front end 16 of the toilet pan 12 fixed to be the same in every toilet pan 12, even though the hinge bearing tube 28 may be off center in the apertures 20 or otherwise varying in position relative to the apertures 20 in different toilet pan bodies in a batch. This is because with ceramic pans it is almost impossible to make every pan the same size due to variances in the firing process and changes in the sizes of plaster molds made to make the pre-fired toilet pans each time the molds are used. With the hinge bearing tube 28 fixed in position by the jig 22, packing material 46 in the form of adhesive (see FIG. 4D) is applied between the hinge bearing tube 28 and both apertures 20 through both side walls 23, 25. An applicator tool may be used to contain the spread of adhesive during filling and curing, consisting of a collar with a bore adapted to fit tightly over the protruding ends of the hinge bearing tube and an end face adapted to be substantially parallel to the end face of the side wall, such that the bore of the applicator tool may be oblique with respect to the wall of the pan, the tool being further adapted with a hole connecting the two end faces and being in communication with the void between the hinge bearing tube and the oversize hole such that adhesive can be injected through the hole and will flood the void and form an external face that is flush with the ceramic wall. Once the packing material/adhesive has set rigidly, the jig and/or applicator tool(s) are removed and the hinge bearing tube is permanently and rigidly fixed in position relative to the toilet pan 12. Alternatives to adhesive are envisaged such as molding relatively rigid plastics into place between the hinge bearing tube 28 and each of the apertures or circular spacers fixed inside each aperture 20 and having eccentric apertures for supporting the hinge bearing tube 28 with its central axis immovable relative to the pan 12.

Accordingly, the hinge bearing tube 28 is advantageously firmly fixed in position at an accurate distance above the top surface 42 of the rim 44 and behind the front end 16 of the toilet pan 12. In a further refinement of the method, a similar jig (not shown) may be applied to the un-fired toilet pan 12 in order to fix the height above the top surface 42 and distance behind the front end 16 of the toilet pan of the apertures 20 while they are punched or otherwise made through the side walls 23, 25 of the raised rear position 18 to take into account the varying sizes of the toilet pan 12 parts in a batch of toilet pans made from the same molds. Therefore, although the fired ceramic toilet pans 12 will still vary in size after firing, they will not vary in size so much as far as the height above the top surface 42 and distance behind the front end 16 of the aperture 20 are concerned as would otherwise be the case. Therefore, the amount by which the size or diameter of the apertures 20 is greater than the outer size of diameter of the bearing tube 28 can be minimized to minimize the amount of packing material or adhesive 46 which is required and maximize the integrity of the toilet pan 12. An alternative embodiment of the method may use a similar jig 400 (FIG. 17) to cut the apertures after the pan has been fired using a diamond cutter or other tool via apertures 410, 412, formed on jig 400 (see also FIGS. 18A, 18B and 18C). A further embodiment of the invention uses the jig 400 of FIG. 17 to aid cutting of the apertures for the nozzles and air manifold into the bowl by lining up apertures 402, 404, 406, in the jig with the pan 12 using front guide 408 of jig to position relative to front end 16 of pan.

As shown schematically in FIG. 1A, the toilet pan has a bowl 50 leading to a water trap 52 which is normally filled with water 53 to a water trap level 54. The toilet pan body 10 also has a toilet lid 56 and toilet seat 58 which are hingedly coupled to the toilet pan 12 for rotation about a hinge axis 60 which is defined by the longitudinal center line of the hinge bearing tube 28.

As shown in FIG. 1A, the water trap 52 leads to an outlet 62 of the toilet pan body which is connected to a waste conduit 64 which leads to sewers or collection vessels (not shown) below the floor 66 of a room 68 in which the toilet pan bowl 10 is installed. A rear surface 70 of the toilet pan 12 is abutted against a false wall 72 of the room 68 and a cistern chamber or body 74 is located mounted on a wall 76 of the room 68 above the false wall 72. The cistern chamber 74 is mounted to the wall by brackets 78, 80. The pan may either stand on the floor (as shown in FIG. 3c) or be adapted to fix to the wall, whereupon it will not be in contact the floor.

Figure 2:
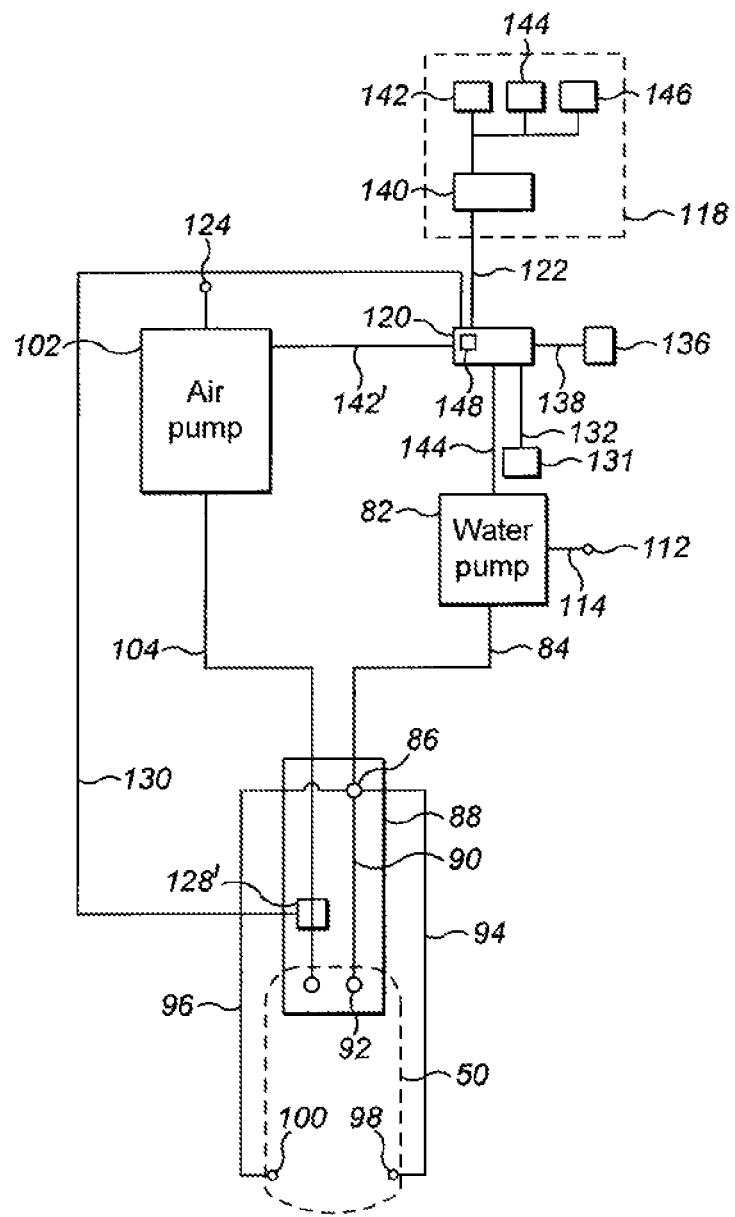
FIG. 2 shows a control and component layout of the toilet system shown in FIG. 1A.

As can be seen from FIGS. 1A and 2, the cistern body 74 includes an electric water pump 82 connected by a supply conduit 84 to a water path splitter 86 mounted on a manifold assembly 88, the water path splitter 86 splitting the water into three delivery flows, one leading along a central water conduit 90 to a central water nozzle 92, with two side water conduits 94, 96 leading to respective right 98 and left 100 water nozzles mounted high up on inner right and left upper surface portions of the toilet bowl 50, respectively. As shown in FIG. 3C, the manifold assembly may once installed be supported from the hinge bearing tube 28 by a cable tie 88'. The manifold assembly 88 will be described in further detail below.

Figure 9:
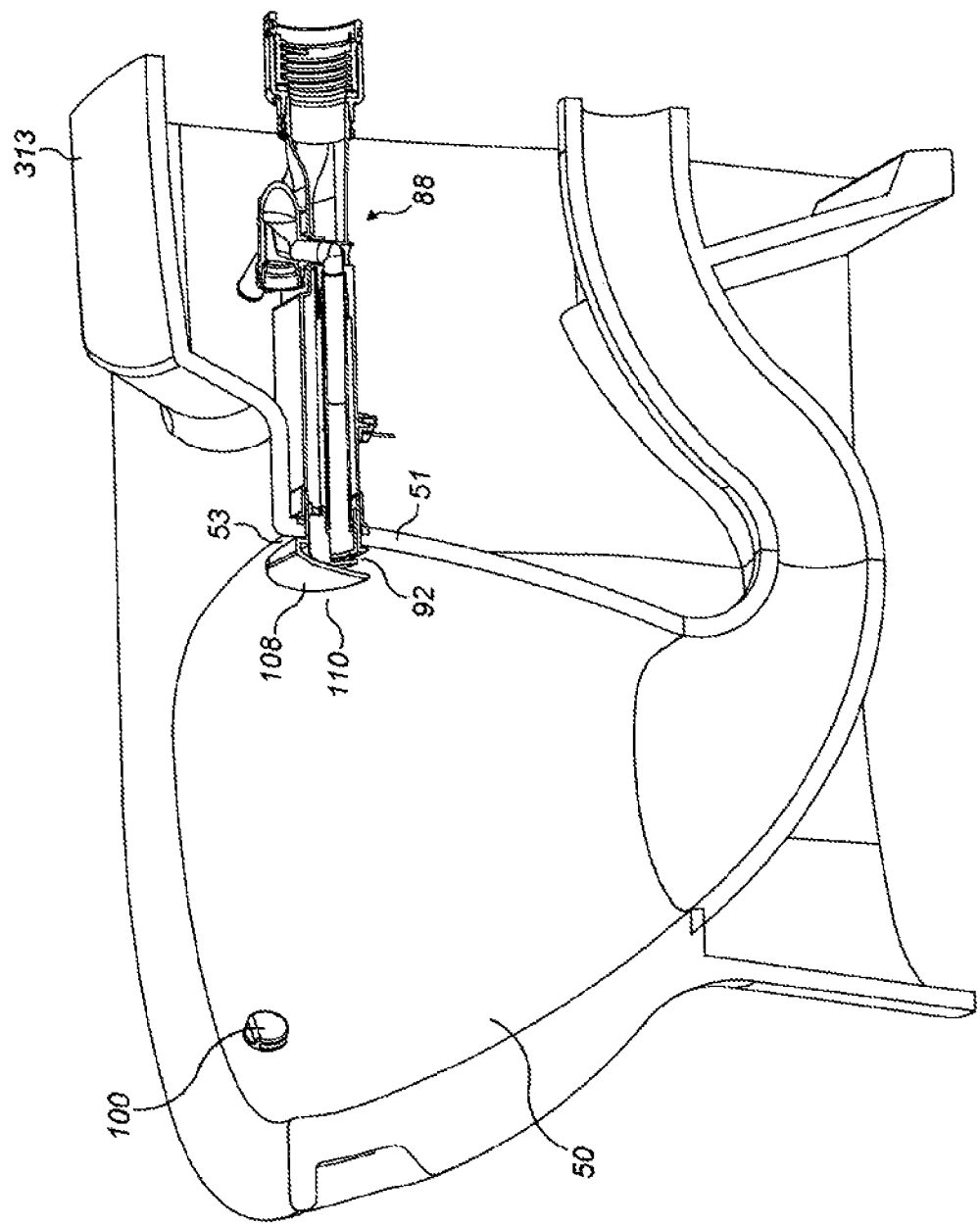
FIG. 9 is a sectional view along a central longitudinal vertical plane of the toilet pan, showing an air and water manifold assembly secured to the toilet pan.

Also as shown in FIGS. 1A and 2, the cistern body 74 contains an electric air pump 102 which is connected by an airline 104 and via the manifold assembly 88 through an air delivery channel 106 of the manifold assembly 88 to an air outlet nozzle 108 which as shown in FIG. 3A is centrally mounted high up on a rear side portion 110 of the bowl 50. This is also shown in FIG. 9.

As can be appreciated, the toilet pan 12 is hollow between the inner bowl 50 and adjacent outer bowl surface 112 of the toilet pan 12, enabling the side water conduits 94, 96 to reach the side water nozzles 98, 100 from the manifold assembly 88.

Figure 12A:
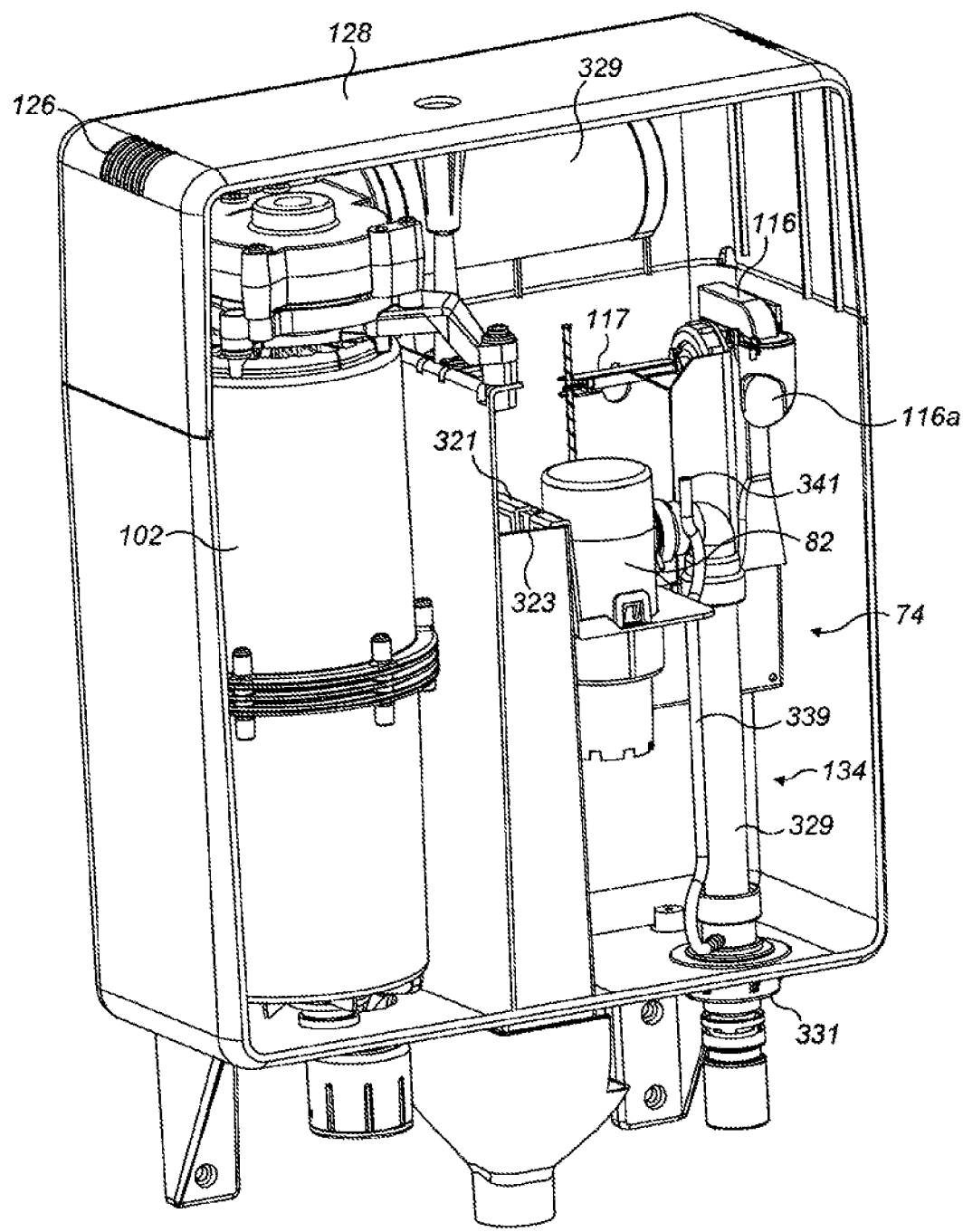
FIG. 12A shows the cistern of the toilet system with a front plate and printed circuit board control and various electrical wires thereof removed for the purposes of clarity.
Figure 12B:
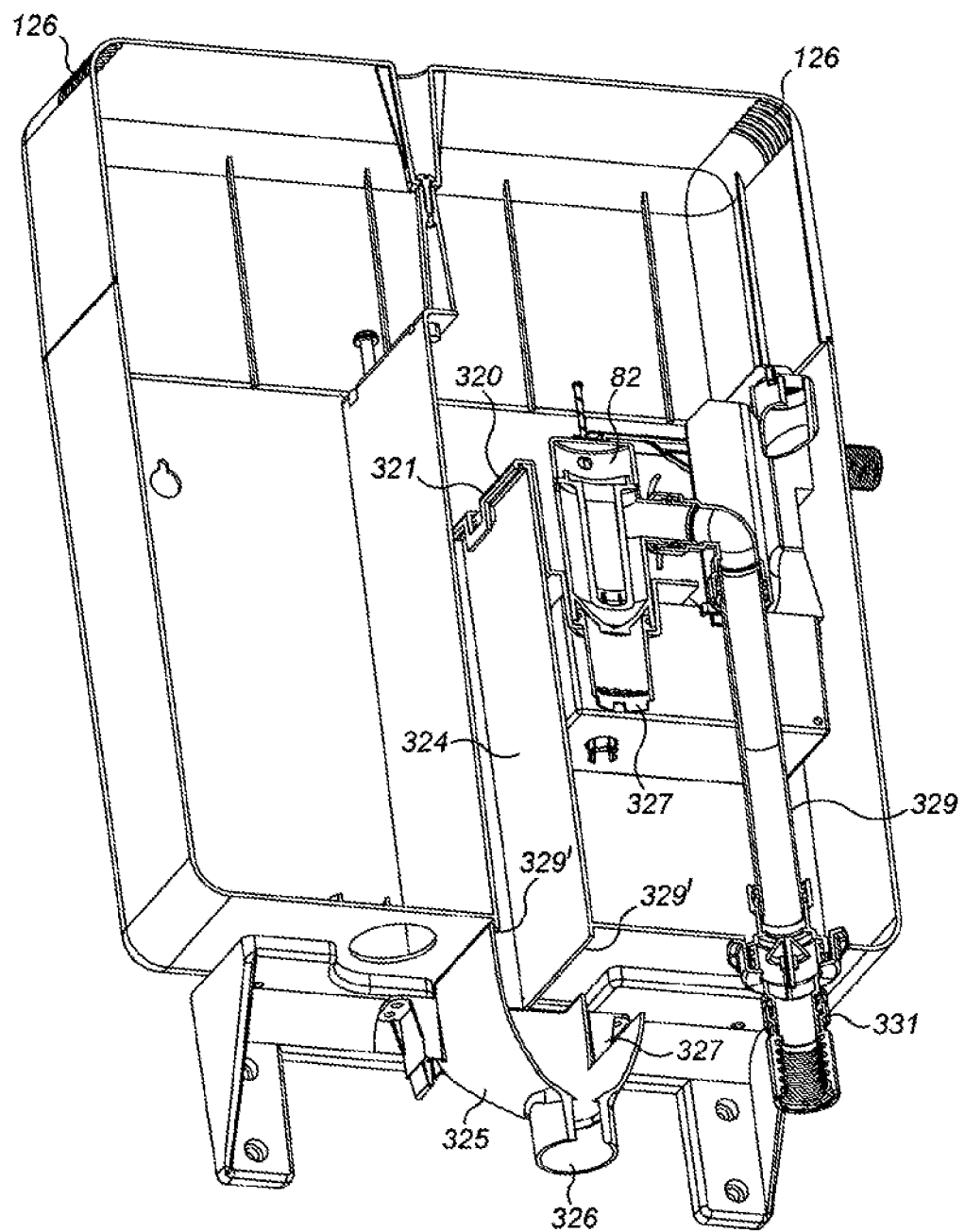
FIG. 12B shows a sectional view through the cistern components shown in FIG. 12A but with air pump components thereof removed.

As shown in FIG. 1A and FIG. 2, a water supply 112 is connected via a supply conduit 114 into the cistern body where it is connected to a water reservoir level inlet control valve 116 controlled by and electrical solenoid (not shown) or a conventional float (not shown) which pushes up on lever arm 117 (FIG. 12A) to switch off the water supply. Inlet valve 116 has a shroud 116a (FIG. 12A) to deflect the incoming flow of water from the surface the water reservoir in order to prohibit splashing of the inlet valve and possible contamination of the incoming water supply. Furthermore, an electrical supply 118 is connected to a printed circuit board controller 120 via an electrical supply path 122 and atmosphere 124 is connected via a cistern air inlet 126 to the cistern chamber 74. The air inlet 126, as shown in FIGS. 12A and 12B may consist of two series of elongate slots 126 located high up towards a top surface 128 of the cistern chamber 74.

As shown in FIG. 2, a water detection sensor 128' (see also FIG. 10B) in the air delivery channel 106 of the manifold assembly 88 is connected via a signal path 130 to the printed circuit board controller 120 for inhibiting flush if water is detected in the air delivery channel 106, indicating that the pan 50 has flooded above the level of the sensor 128'.

Additionally a water reservoir level sensor(s) 131 (e.g. a water float controlled micro switch) is connected via a signal path 132 to the PCB controller 120 and this is used to indicate when the water level in a water reservoir 134 of the cistern chamber 74 if full, which allows the PCB controller 120 to start the water pump when the start cycle signal is activated by the user, and when the water level has dropped below a certain level, causing the PCB controller 120 to switch off the water pump 82 and start the air pump 102 during a flush cycle. Furthermore, as shown in FIGS. 1A and 2, a manually or otherwise (e.g. infrared detection) actuator switch 136 is connected via a signal path 138 to the PCB controller for initiating a flush cycle when commanded by a user.

As shown in FIG. 2, the electrical supply 118 may include a battery/transformer/rectifier 140 which, on the one hand may provide power such as DC to the PCB controller (which may provide actuation signals and power via lines 142' and 144' respectively to the air pump 102 and water pump 82) and on the other hand the battery/transformer/rectifier 140 may be connected to multiple power sources including solar 142, wind turbine 144 or mains electricity grid 146 or other power supplies, as desired for the particular installation concerned. Alternatively, the electrical supply 118 may comprise direct connection to the mains AC supply, whereupon the PCB 120 and electrical components have complementary operating ratings.

With the toilet lid 56 in the closed position shown in FIG. 1A and with a sealed chamber 147 formed below the toilet lid 56 and above the bowl 50, in particular above the water level 54, and with an optional lid closed sensor (not shown) providing a signal to the PCB controller 120 that the lid is shut, and with the water detection sensor 28 indicating to the PCB controller 120 that there is not water flooding of the air delivery channel 106 of the manifold assembly 88, and with the water reservoir level sensor 131 indicating to the PCB controller 120 that the reservoir is full and the water pump 82 is primed, when a user activates the activation switch 136, the PCB controller 120 first causes the water pump 82 to activate, which lifts water up, flooding the internal body the cavity of the pump 82a and forcing water out of the pump and down the outlet tube 329 and into the water distribution system under pressure (establishing a natural siphon in the process), where nozzles 98, 100, 92 direct the water flow onto the interior surface of the bowl 50 to wash it. The water pump 82 operates for a pre-determined period of time, or until the water reservoir level sensor sends a signal to the PCB controller 120 that a pre-determined quantity of water has been dispensed, whereupon the PCB controller 120 stops the water pump 82 and causes the air pump 102 to pump air into the sealed chamber 147 above the water level 54 in order quickly to evacuate the contents of the bowl 50, including waste materials and the water 53 through the outlet 62 and down through the waste conduit 64 to the sewers or collection vessel (not shown). During the time of pan pressurization, the poppet valve 333 is pushed closed and the natural siphon that has been created in the outlet tube 329 is held static. The air pump 102 is switched off after a predetermined time or if an air pump current draw sensor 148 of the PCB controller 120 senses a reduction in air pump current, indicating that resistance in the field chamber 147 and waste conduit 64 against air flow from the air pump has dropped, which in turn is indicative that the conduits of the pan 50 have been evacuated through the outlet 62 and the air has pushed the waste matter through the wastewater conduit 64 to a point where it has interfaced with a sewer or collection vessel (not shown) and has vented the air from behind the wastewater flow whereupon it has reverted to gravity flow. Wastewater conduit 64 may preferably be of a bore small enough to allow the wastewater flow to run full-bore during pan pressurization, in which case it may conveniently be run without gradients. The PCB controller 120 then reverts to off mode, where it will respond to the next flush activation request by a user, providing the water reservoir sensor has sensed that the reservoir has refilled and the water pump 82 is re-primed. When the air pump 102 has stopped and the pressure in the sealed chamber 147 reverts to atmospheric, the poppet valve 333 opens and allows the natural siphon within outlet pipe 329 and pump body 82a to continue to flow, whereupon the water trap 53 is replenished. The siphon continues to flow until the water level in the reservoir exposes the crenels of the inlet 327 and air is drawn into the siphon, which destroy it. As the siphon breaks, the water held within the body of the water pump 327 drops back into the water reservoir, which partially raises the water level, but the crenels of water pump 327 are positioned such that they remain in communication with atmosphere to vent to siphon until all of the water has dropped out of the water delivery system 82a. However, the water may not always be fully evacuated from the water delivery system 82a before the water reservoir refill valve opens, whereupon the rising water will seal the crenulations and any subsequent emptying of the water delivery system will create a partial siphon where water may be drawn through the water delivery system 82a at a reduced flow. Consequently, a breather pipe 339 is provided so that the down side of outlet pipe 82 is in constant communication with atmosphere so that a partial siphon cannot occur.

In order to delay the refill of the water reservoir until the flush cycle has finished and the natural siphon 82a has broken, the water inlet valve float (not shown) sits within its own reservoir of water 116a which is in restricted communication with the main reservoir 116b, such that the water in the float reservoir drops at a slower rate than the water in the main reservoir, so that the natural siphon 82a has already broken before the water in the inlet float valve reservoir has dropped sufficiently to allow the valve to admit the refill water. The water reservoir 134 then refills (filling the float reservoir 116a rapidly through valve 116c, which is opened by the upward water flow in the main reservoir 74) until the inlet valve 116 shuts off.

It is noted that the water manifold assembly 88 is fitted with the central water conduit 90 extending slightly downhill towards nozzle 92. In fact, the full water path from the pump 82 to the nozzles 92, 98, 100 is downwardly all of the way, including through the splitter 86 and manifold assembly 88 such that good draining of the water is permitted. Also, the minimum cross-sectional area of flow through the whole water system from the pump is not less than 19 mm$^2$. In other embodiments it could be less.

Figure 3D:
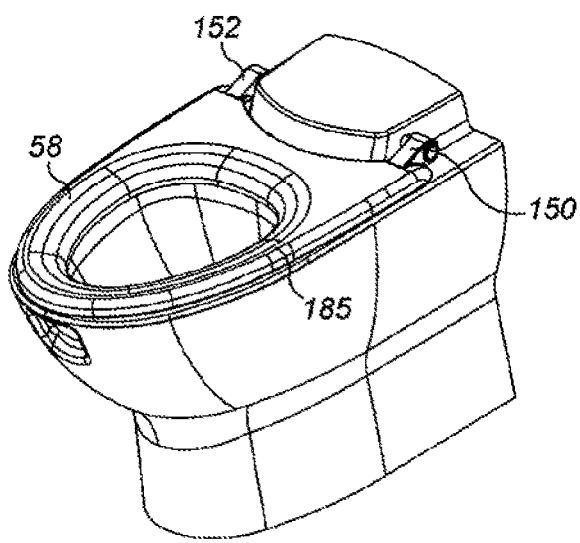
Figure 3E:
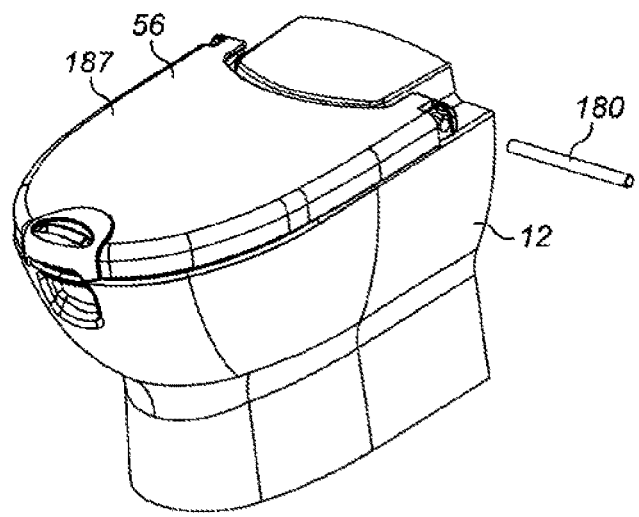
Figure 3F:
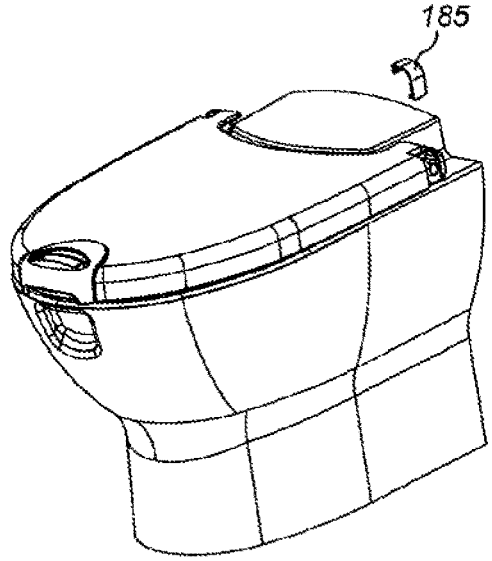
Figure 3G:
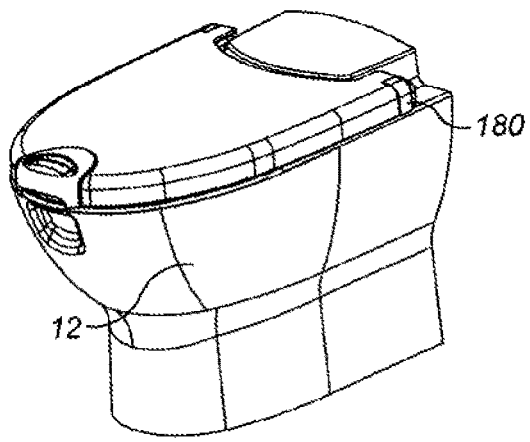
Figure 5A:
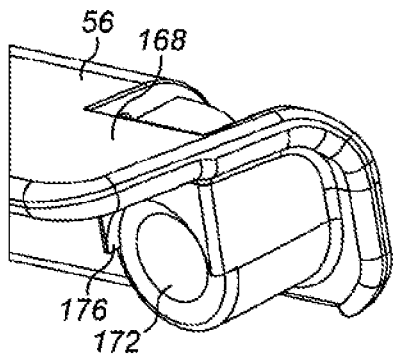
FIGS. 5A and 5B show part of a toilet lid of the toilet system and FIGS. 5C and 5D show parts of the toilet lid, toilet seat and toilet pan as the toilet lid is assembled on to the toilet seat and toilet pan.
Figure 5B:
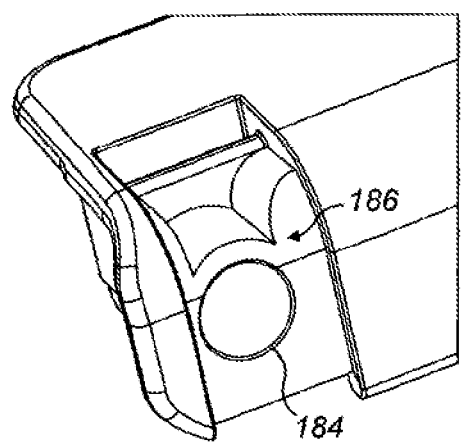
Figure 5C:
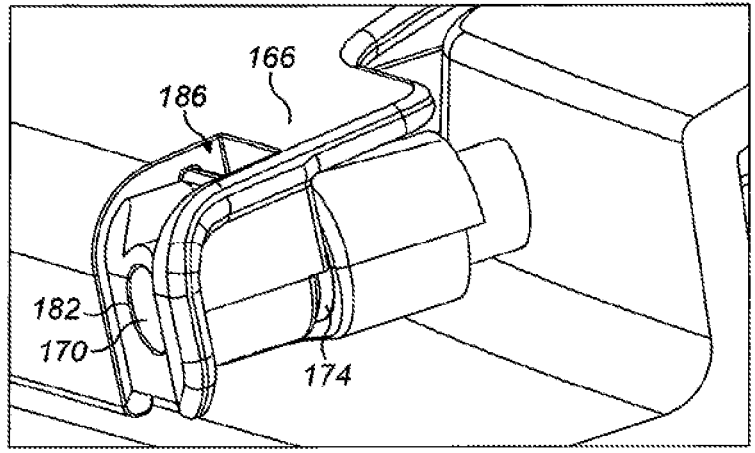
Figure 5D:
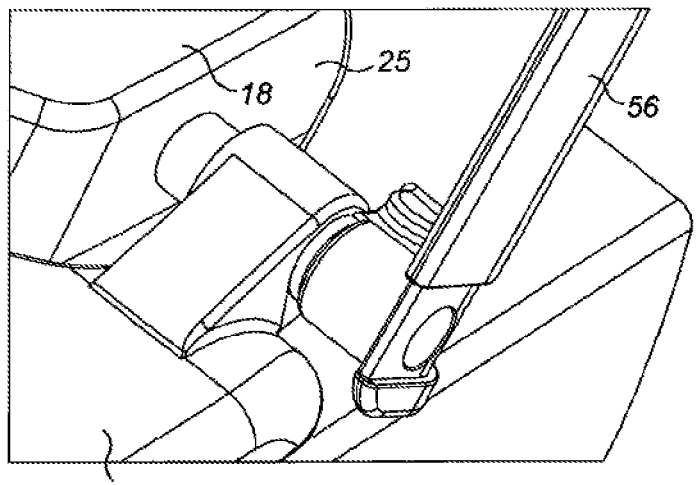

FIGS. 3A to 3G, 4A to 4D and 5A to 5D show the sequence of assembly of the toilet seat 58 and lid 56 on to the toilet pan 12. In the initial configuration in FIGS. 3A and 3D, the toilet pan 12 is fitted with the hinge bearing tube 28 which has the ends 24, 26 projecting from the side walls 23, 25 of the raised rear portion 18 thereof. The seat 58, which is of molded plastics, has two rearwardly extending hinge portions 150, 152 and these include hinge bores 154, 156, respectively, each hinge bore 154, 156 being accompanied at an inner end thereof by a semicircular arcuate upper collar part 158, 160, respectively. The collar parts are equally spaced and arranged so that the seat can be placed on the toilet pan 12 with the collar parts 158, 160 sitting on the ends 24, 26 of the hinge bearing tube 28, the engagement between the collar parts 158, 160 and ends 24, 26 of the hinge bearing tube 28 thereby aligning the seat 58 correctly in position on the pan 12. It will be seen that the hinge portions 150, 152 of the seat 58 also have respective outwardly directed circular bush portions 162, 164, respectively (see FIGS. 4B to 4D). As shown in FIGS. 5A and 5C, the toilet lid 56 includes hinge portions 166, 168 with hinge bores 170, 172 having the same internal diameter as both the hinge bores 150, 152 and the hinge bearing tube 28. The hinge portions 166, 168 also have arcuate upper collar parts 174, 176 which, like the collar parts 158, 160 are arcuate and semi-circular. The lid 56 may be placed with the arcuate upper collar parts 174, 176 sitting on top of the circular projecting bush portions 162, 164 of the hinge portions 150, 152 of the toilet seat 58. Accordingly, the collar parts 174, 176 of the lid 56 align the toilet lid 56 conveniently with both the hinge portions 150, 152 of the toilet seat 58 and the hinge bearing tube 28 (by virtue also of the action of the toilet seat collar parts 158, 160), such that all of the bores 170, 172, 154, 156 and hinge bearing tube 28 are coaxially aligned. The parts then have the configuration shown in FIG. 3E and two hinge pins 180, one of which is shown in FIG. 3E may then be slid into the bores 170, 172, i.e. into one of the bores from one side of the pan 12. There are two hinge pins 180 and the length of each one is equal to half of the distance between outer entrances 182, 184 to the bores 170, 172 of the toilet lid 56. Therefore, when both pins are fully inserted, the space they take up includes all of the internal volume of the hinge bearing tube 28 the hinge bores 154, 156 of the toilet seat 58 and the hinge bores 170, 172 of the toilet lid 56. Then, clips, 185, one of which is shown in FIG. 3F, the other being a handed mirror image, are snap-lockingly clipped into recesses 186 formed in the hinge portions 166, 168 of the lid 56 to achieve the configuration shown in FIG. 3G in which the toilet seat 58 and toilet lid 56 are securely fastened to the pan 12 without the possibility of adjusting the hinge axis thereof and without possibility of the hinge axis inadvertently moving over time. The assembly procedure for the components described may easily be reversed so as to remove the components including the toilet seat 58, toilet lid 56, clips 185 and hinge pins 180 for cleaning/repair purposes. Since the hinge bearing tube 28 is patent and open at both ends, it can easily be flushed with water for example from a hose (for cleaning). Also, since the two hinge pins 180 are relatively short in length, they can be extracted towards the sides of the pan 12 in relatively narrow toilet cubicles or other installation spaces without interfering with walls or other obstructions adjacent to the toilet pan 12.

It will also be noted that the hinge portions 150, 152 of the seat 58 lie generally in the same plane as the toilet seat 58 main ring-like body 185 and the hinge portions 166, 168 of the toilet lid 56 lie generally in the same plane as a main body 187 of the toilet lid 56. Therefore, the presence of the hinge portions 150, 152 does not significantly increase the size of the molds necessary to make the plastics toilet seat 58 and toilet lid 56. This is enabled at least partly by the presence of the raised rear portion 18 advantageously enabling the axis of the hinge bearing tube 28 to be spaced above the top surface 42 of the rim 44 of the toilet bowl 50.

Figure 6A:
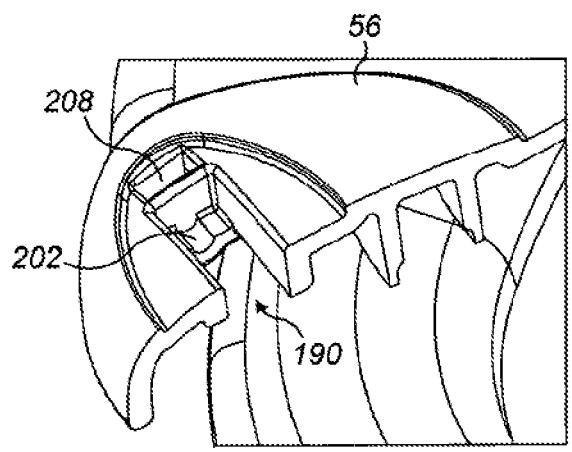
FIG. 6A shows a section through the toilet lid at a front latch region thereof, with part of the toilet seat and toilet pan shown below it.
Figure 6B:
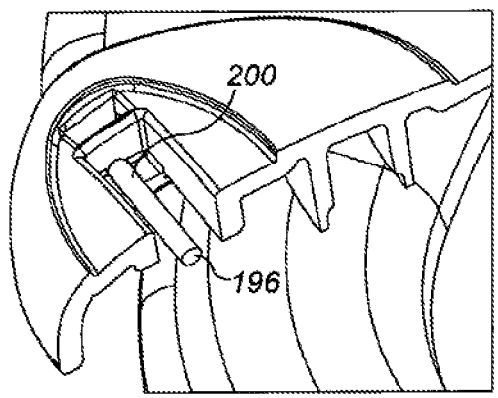
FIG. 6B shows a similar view to FIG. 6A but with a section through a latch hinge pin also shown in place in its operational position.
Figure 6C:
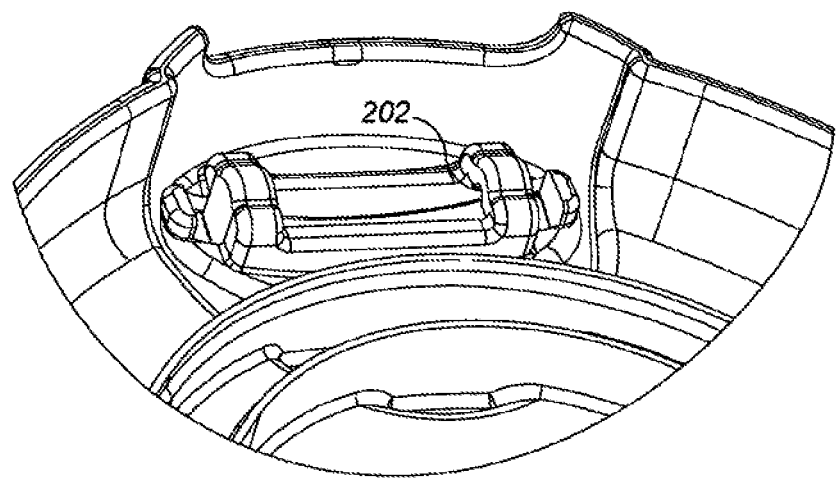
FIG. 6C shows a perspective view of the front latch region of the toilet lid from the underside thereof.
Figure 6D:
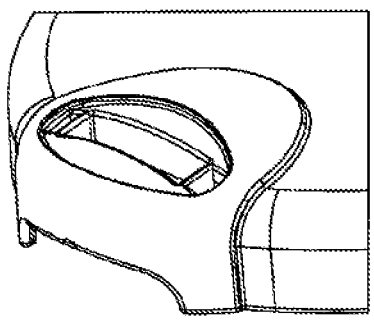
FIGS. 6D to 6G show various stages in the installation of a latch member on to the toilet lid.
Figure 6D:
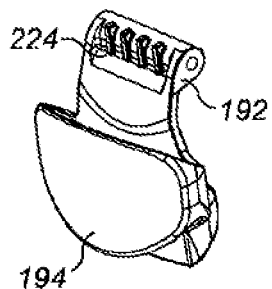
Figure 6E:
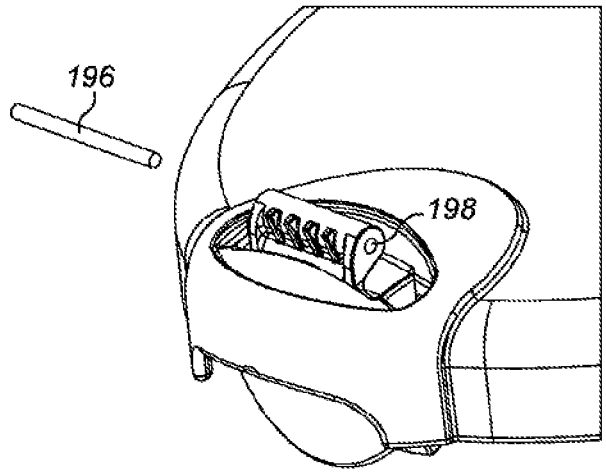
Figure 6F:
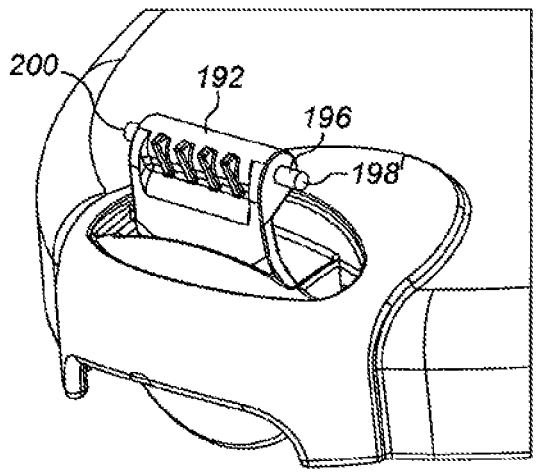
Figure 6G:
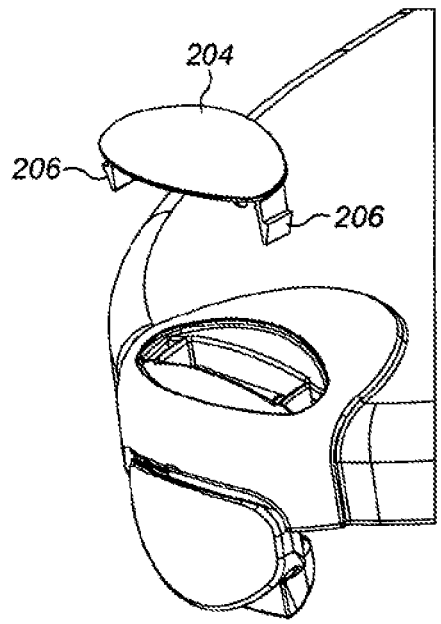
Figure 15A:
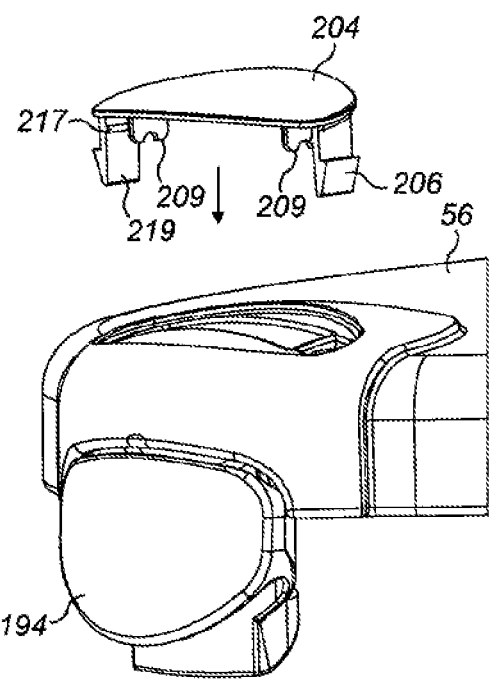
FIGS. 15A, 15B, 15C, 15D, 15E, 15F and 15G show additional views of the latch components shown in FIGS. 6A to 6I, but also showing a splashguard/tang lock of the latching assembly.
Figure 15B:
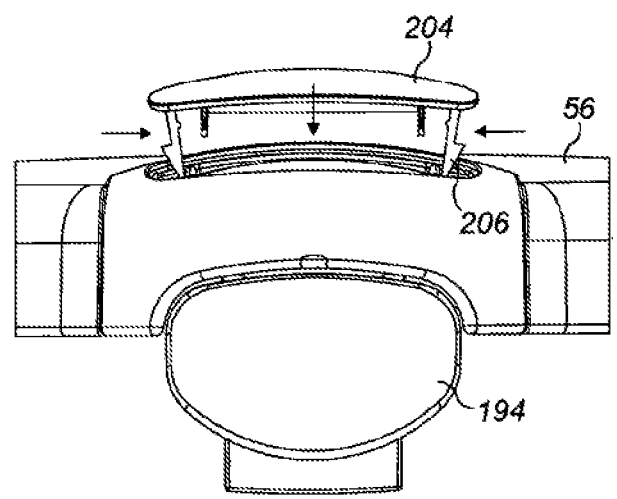
Figure 15C:
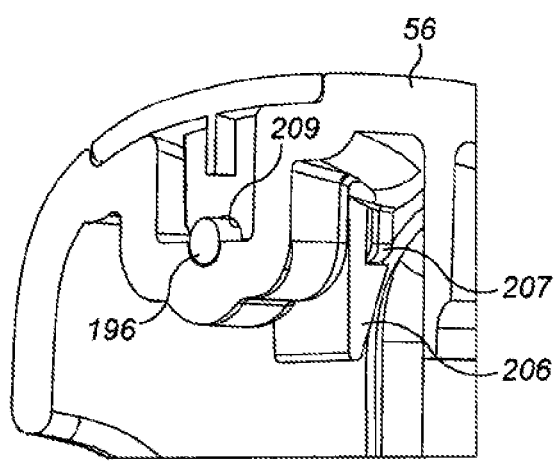
Figure 15D:
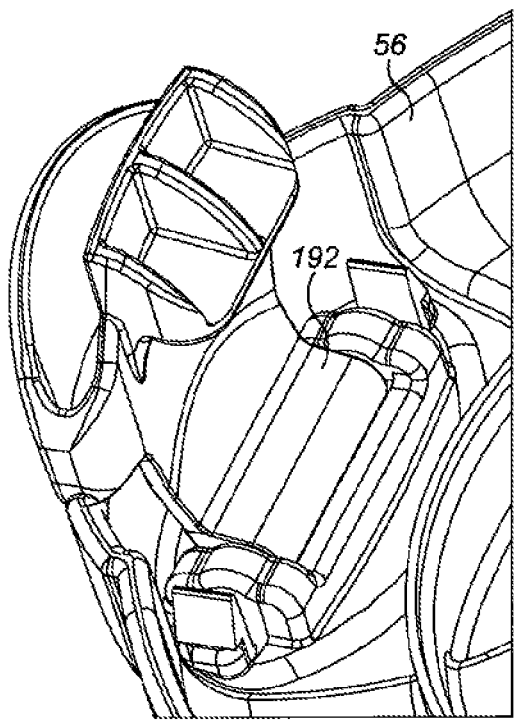
Figure 15E:
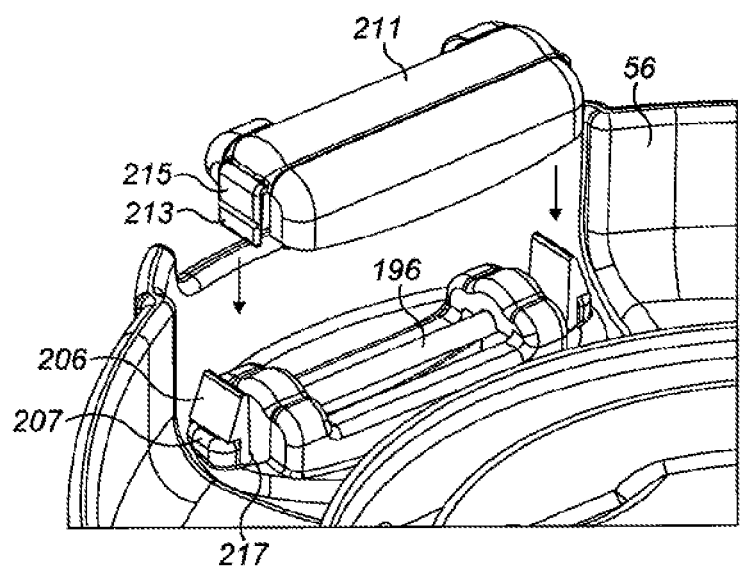
Figure 15F:
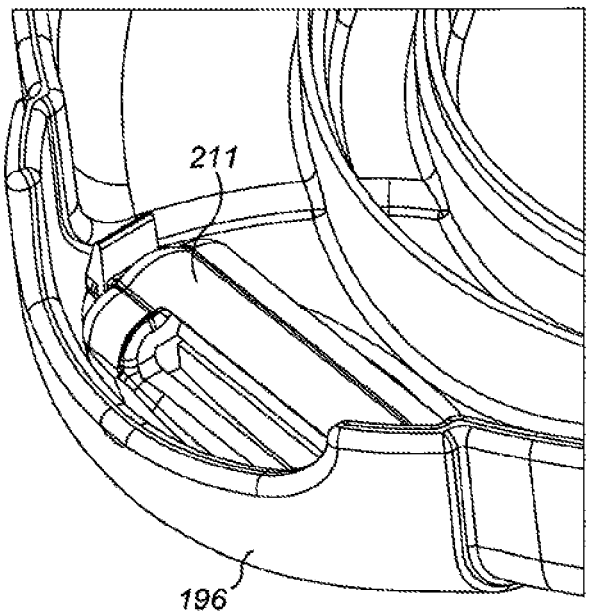
Figure 15G:
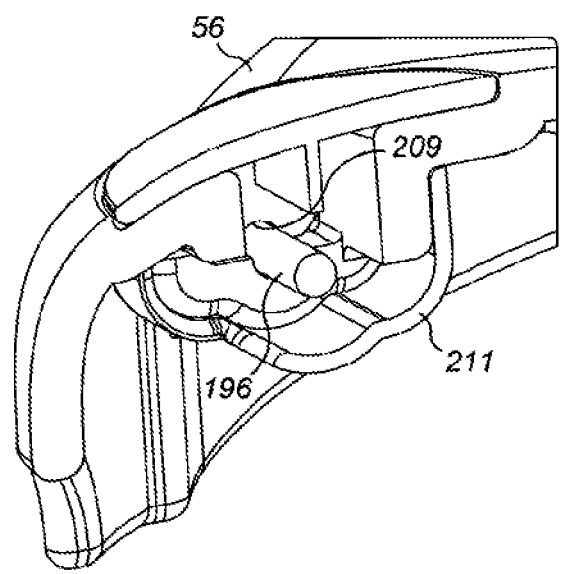

As shown in FIG. 6 A, the toilet lid 56 includes a front latch installation recess 190 up through which an upper portion 192 (see FIG. 6D) of a latch member 194 may be installed as shown in FIG. 6E. With the latch member 194 in the raised position of FIG. 6E, a latch pin 196 may be inserted through latch upper bore 198 to the position shown in FIG. 6F where it has end portions 198', 200 projecting from either end thereof. The latch member 194 may then be lowered to an installed position as shown in FIG. 6G in which the latch pin 196 engages at either end as shown in FIG. 6B (with the latch member 194 omitted for clarity) with the ends 198', 200 of the pin 196 bearing down upon upwardly facing bearing surfaces 202 formed next to the latch installation recess/aperture 190 of the lid 56. Then, a cap 204 with snap tangs 206 may be inserted from above the latch installation recess 190 into it such that the snap tangs 206 engage under clipping surfaces 207 to hold the cap 204 captive in installation apertures 208 either side of the bearing surfaces 202 (FIGS. 15A to 15D. Accordingly, the cap 204, which, as shown in FIG. 6H has a downwardly extending flange 206 which engages the top end 192 of the latch member 194, holds the latch member 194 captive against upward movement thereof. As shown in FIG. 15 A, cap 204 has bearing surfaces 209 which act as upper bearing parts for the pin 196. A latch splashguard 211 may be fitted as shown in FIG. 15E by sliding it into the position shown in FIG. 15F in which channels 213 in outwardly facing walls 215 of splash guard 211 snap-lockingly engage protrusions 217 on inner walls 219 of tangs 206 of the cap 204. While in place, splashguard 211 therefore serves as a tang lock preventing disengagement of tangs 206 from surfaces 207.

Splashguard/tang lock 211 may be removed again by pulling it and, once removed, in order to clean or repair the latching arrangement 208 formed by the latch member 194, pin 196, cap 204 and bearing surfaces 202, the cap 204 may conveniently be removed by squeezing the tangs together from the underside of the lid and the reverse of the installation process may easily be applied to remove the components in a very simple way. The components may then be washed or repaired or replaced and the arrangement quickly reassembled.

Figure 6H:
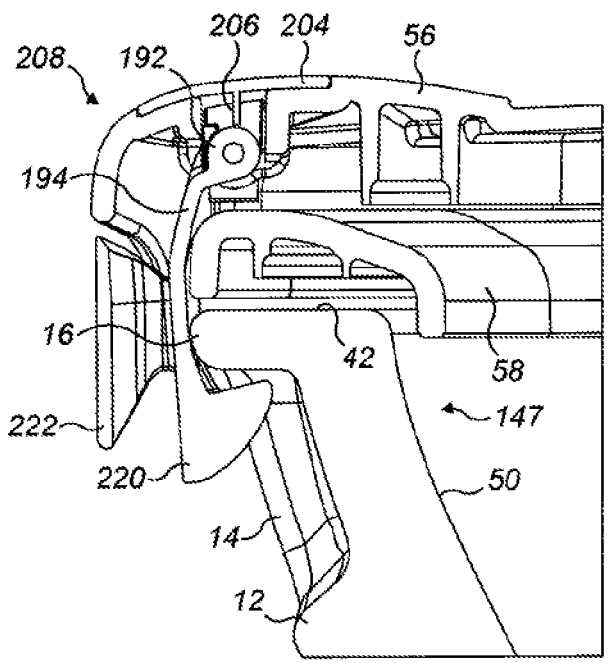
FIG. 6H is a section through the toilet pan, toilet seat, toilet lid and latch arrangement including a latch member, with the latch member in a latched/locked position.
Figure 7A:
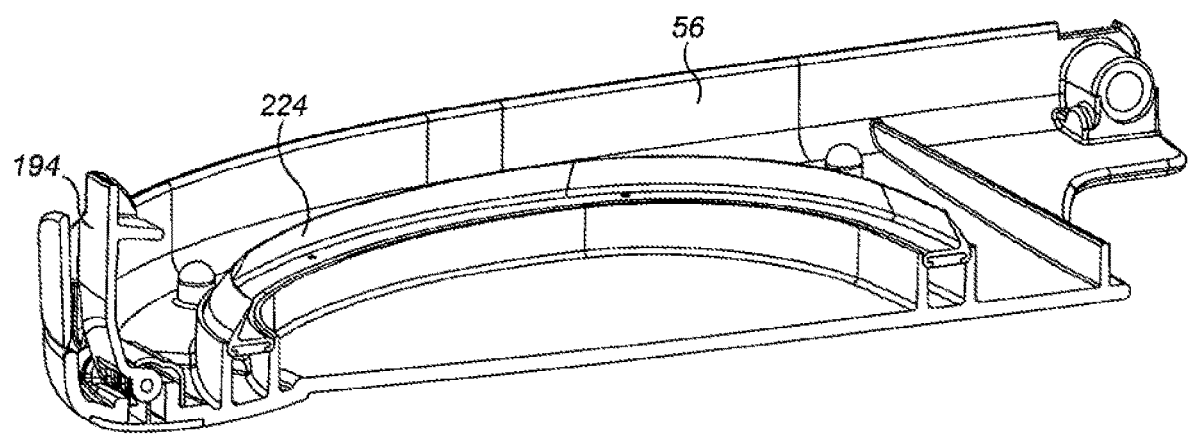
FIG. 7A shows a perspective sectional view through the toilet lid and latching arrangement viewed from underneath and from one side.
Figure 8A:
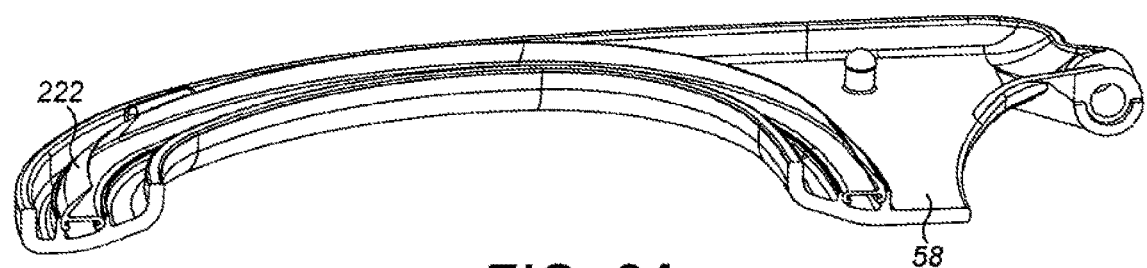
FIG. 8A is a sectional view in perspective through the toilet seat, viewed from underneath and to one side.

FIG. 6H shows the latch member 194 with a hook member 220 thereof engaged in a recess at the front of the toilet bowl 12. It will be seen that the latch member 194 in this position prevents the toilet seat 58 and lid 56 from rising up. In this closed position, the lid 56 is sealed by a peripheral seal 222 (FIG. 7A) to the toilet seat 58 and the toilet seat 58 is sealed to the top surface 42 of the pan 12 by a peripheral seal 224 (FIG. 8A). Therefore, during the toilet flush when the air pump 102 is pressurizing the sealed chamber 147 under the lid 56 and above the bowl 50 of the pan, the toilet seat 58 and lid 56 do not rise up or do not rise up sufficiently that the sealing is broken.

Figure 6I:
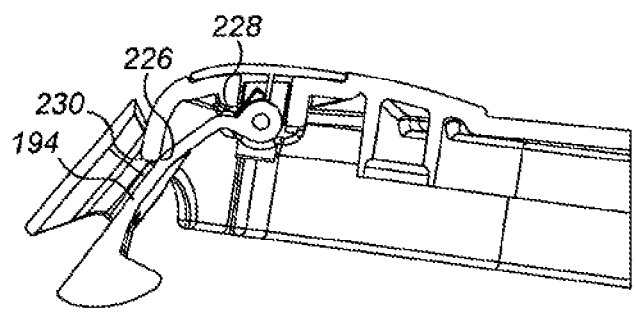
FIG. 6I shows a sectional view similar to FIG. 6H, but with the latch member rotated to an unlatched position and lifted away from the toilet seat and toilet pan together with the toilet lid.
Figure 6I:
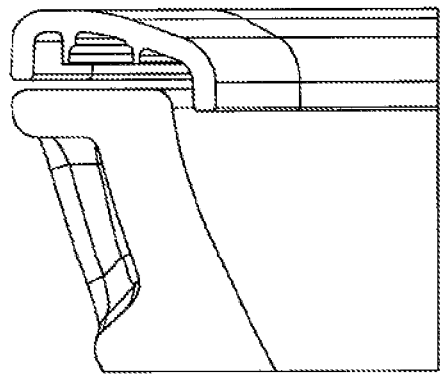

As shown in FIG. 6I, a user may pull forwards and upwards on an integrally formed handle portion 222 of the latch member 194 which is spaced in front of the hook portion 220 to rotate the latch member 194 forwards and upwards away from the recess 14. In doing this, stop members 224 which are essentially spaced between the hinge pin 196 and hook portion 220 and a middle portion 226 of the unitary latch member 194 engage underneath the lid 56 against respective engagement portions 228, 230 of the underside of the lid 56. This causes a wedging action by the latch member 194 in which pulling up on the handle portion 120 causes a pushing down by the hinge pin 96 on the upwardly facing bearing parts 202 in the lid 56. Therefore, the harder the user pulls up on the handle portion 222, the greater the engagement with the engagement portions 228, 226 and the firmer the downward engagement of the pin 196 in the upwardly facing bearing parts 202. The latch member 194 is therefore both very simple in construction and very stable and strong, yet as described above it may be very easily taken apart for cleaning or repair. The latch member 194 is a unitarily formed single rigid component which may, for example be molded, and the handle portion 222 and hook portion 220 move together.

Also, since the hinge bearing tube 28 has been carefully positioned with respect to the front end 16 of the pan 12 as described above and since the toilet seat 58 and toilet lid 56 have been accurately manufactured in a plastics molding process, the latch member 192 is very accurately positioned relative to the front end 16 of the pan 12 and the recess 14, even though the size of the pan 12 has been very difficult to control due to the ceramics firing process meaning that the pan 12 may differ in size greatly between different pans in a batch.

Figure 7B:
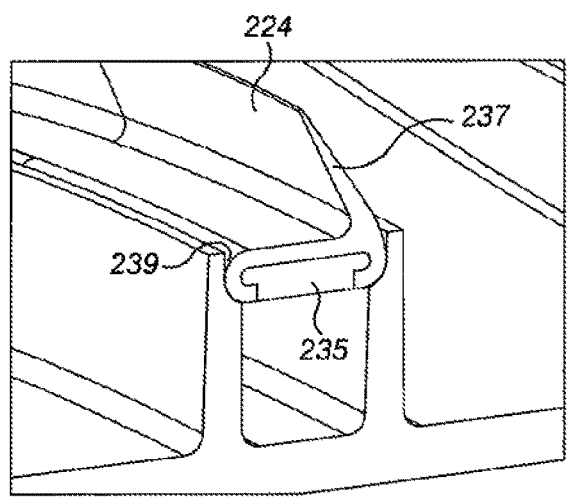
FIG. 7B is an enlarged view of part of FIG. 7A.

As shown in FIG. 7B, the seal 224 has a rigid base portion 235 on to which a flexible flange portion 237 has been over-molded. The base portion 235 is sufficiently rigid and non-stretchable that when installed into the lid 56 by pressing it and the surrounding over-molded portion of the flexible flange 237 into recess or slot 239 extending circumferentially all around the lid 56, there is no stretching of the seal 224 in the peripheral direction. Therefore, the seal 224 and in particular the flexible flange 237 takes up a very regular position all of the way around the periphery of the ring-like form thereof, including that the rest position angle of the flexible flange 237 is generally very constant all of the way along/around the seal 224. This is a great advantage over the prior seal disclosed in EP1838193-A in which the angle of the flexible flange would vary greatly after installation. In the region of the recess (or slot) 239, the material of the flexible flange 237 is compressed between the recess/slot 239 and the base portion 235.

Figure 23A:
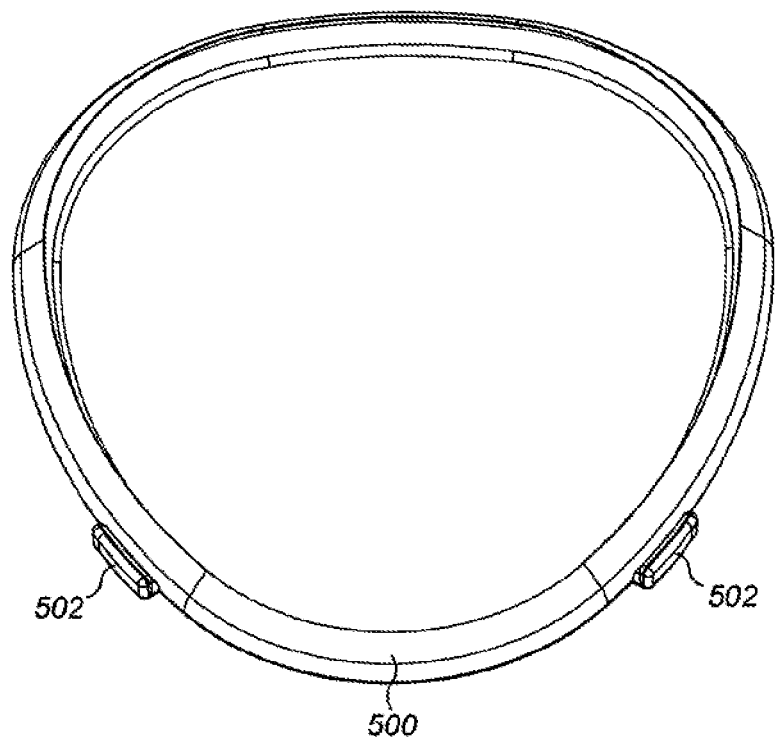
FIG. 23A shows a modified toilet seat seal incorporating two integral buffers.
Figure 23B:
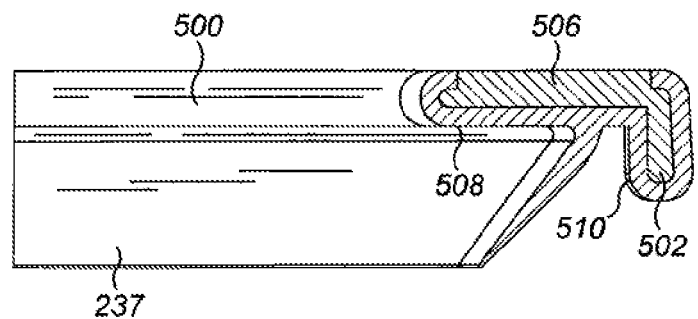
FIG. 23B shows a cross section through one of the buffers.
Figure 23C:
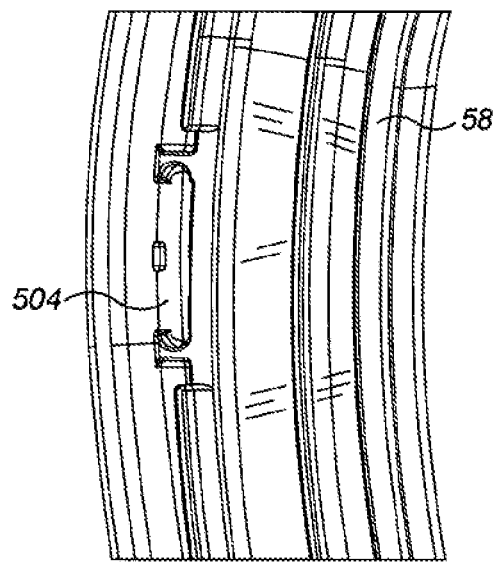
FIGS. 23C and 23D show perspectives of a modified toilet seat, showing one of two seat seal recesses arranged to mate with and hold the buffers.
Figure 23D:
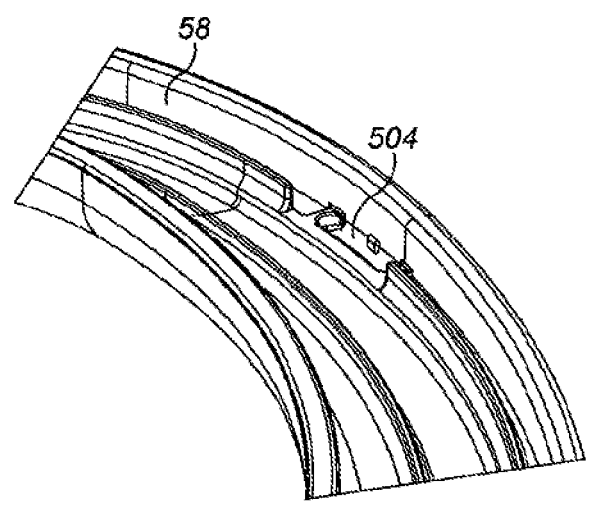

As shown with the modified seat seal 500 of FIG. 23A, which is the seal for sealing the toilet seat 58 to the pan 12, the seal 500 is a modification in that it incorporates two integral buffers 502 arranged to overlie and/or be at least partially enveloped by support recesses 504 which are modifications to the toilet lid. Each buffer 502 includes an L-shaped portion 506 of the base portion 235 generally surrounded on a downwardly facing side 508 thereof by a covering 510 of the same material as the flexible flange 237. The buffers 502 advantageously may be located as part of the seal 500, taking up very little space, especially in the direction towards/away from the center of the pan 12. Separate buffers do not need to be provided although additional buffers may be provided if desired. The buffers 502 cushion the landing of the seat 58 when it is closed on the pan 12 and support the seat when weight is applied. Only one integral buffer or more than two may be used instead of two in other embodiments. A similar buffer arrangement may in some embodiments be used with the seal of the toilet lid 56.

Figure 8B:
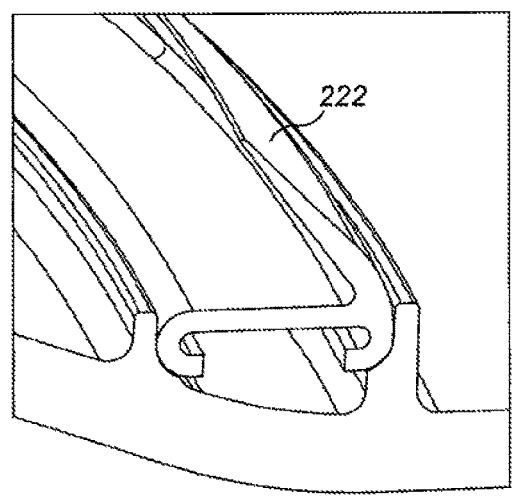
FIG. 8B is an enlarged view of a portion of FIG. 8A.

The seal 222 of the lid 58 shown in FIGS. 8A and 8B is similar to a seal 224, although the base portion is omitted from the seal 222 in FIGS. 8A and 8B for the purposes of clarity. In practice it has the same section as that shown in FIG. 7B for seal 224.

Figure 10A:
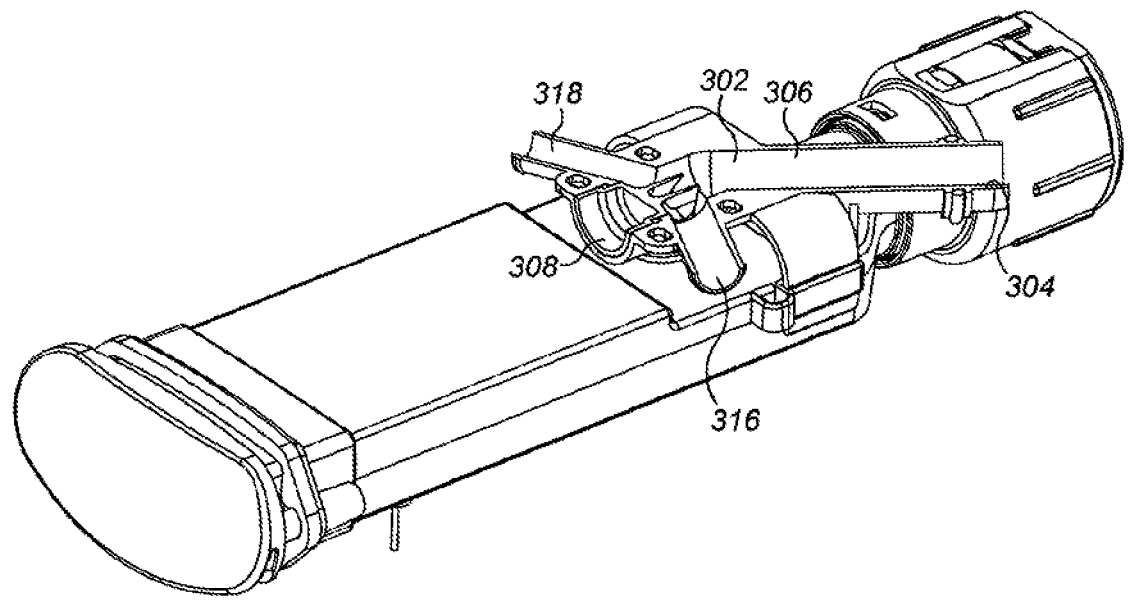
FIGS. 10A and 10B are respective sectional views, which are isometric, through the manifold shown in FIG. 9.
Figure 10B:
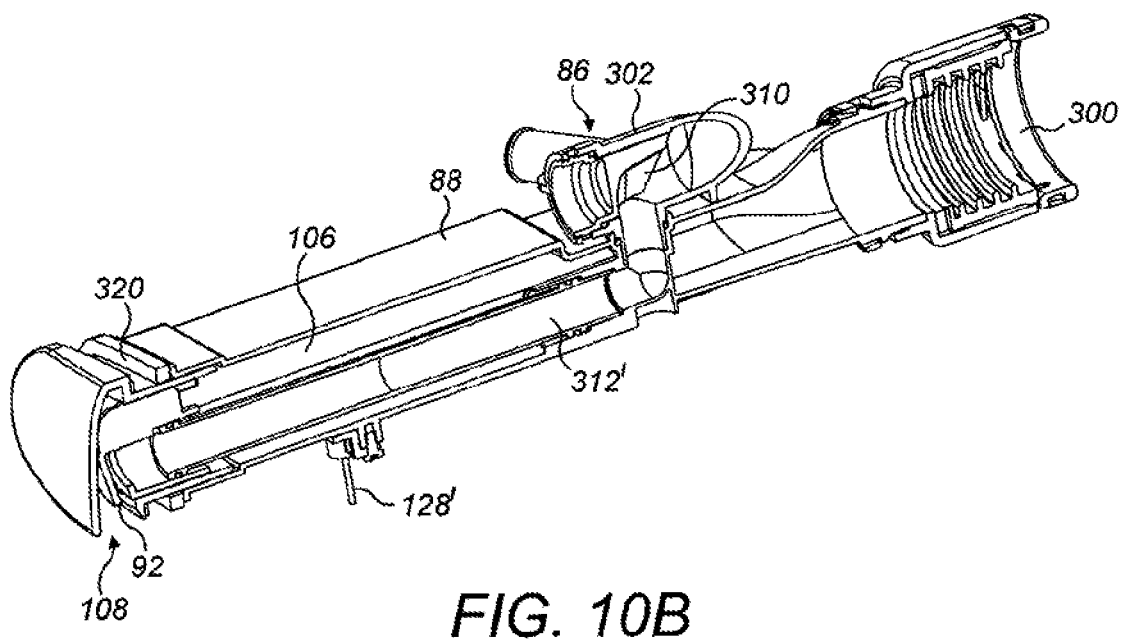
Figure 11A:
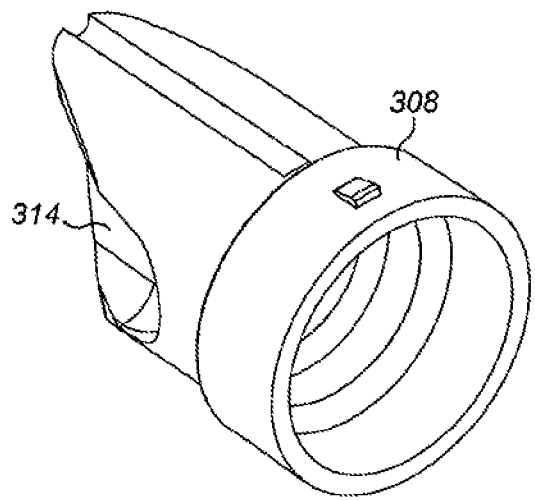
FIGS. 11A and 11B are front and rear quarter perspective views respectively of a splitter plug of the manifold assembly shown in FIGS. 10A and 10B.
Figure 11B:
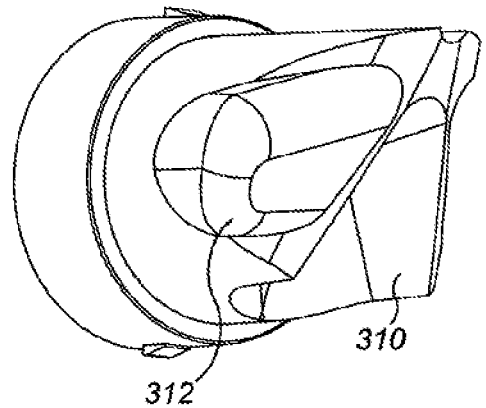
Figure 11C:
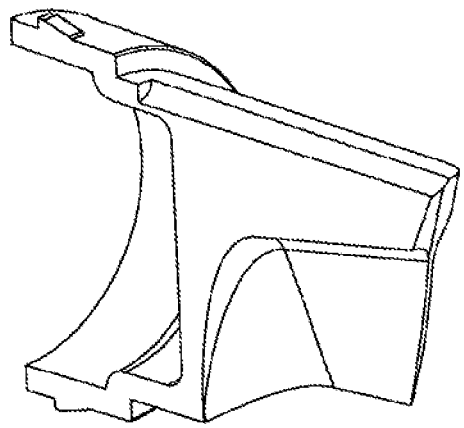
FIG. 11C shows a central longitudinal sectional view through the splitter plug.

As shown in FIGS. 10A and 10B the manifold assembly 88 has an air inlet free 300 leading via air delivery channel or passageway 106 to air nozzle 108. A splitter 86,302 is mounted on top of the manifold assembly 88 and includes a water inlet 304 leading to a splitter plug 308. The splitter plug 308 has a downwardly directed surface 310 and two opposed sideways directed surfaces 312, 314 which direct flow into conduit sections 316, 318 which lead to conduits 94, 96 which lead to nozzles 98, 100. The nozzles 108, 92 are sealingly push fitted into end part 320 of manifold assembly 88 in order to seal on to the air delivery channel 106 and lower water passage 312' leading down from downwardly directed surface 310. The outer air nozzle 108 clamps the adjacent surface 51 of the pan 50 at a single aperture 53, the presence of both of the nozzles 108, 92 in the single aperture 53 thereby saving on the formation of apertures in the ceramic bowl 50.

Figure 14A:
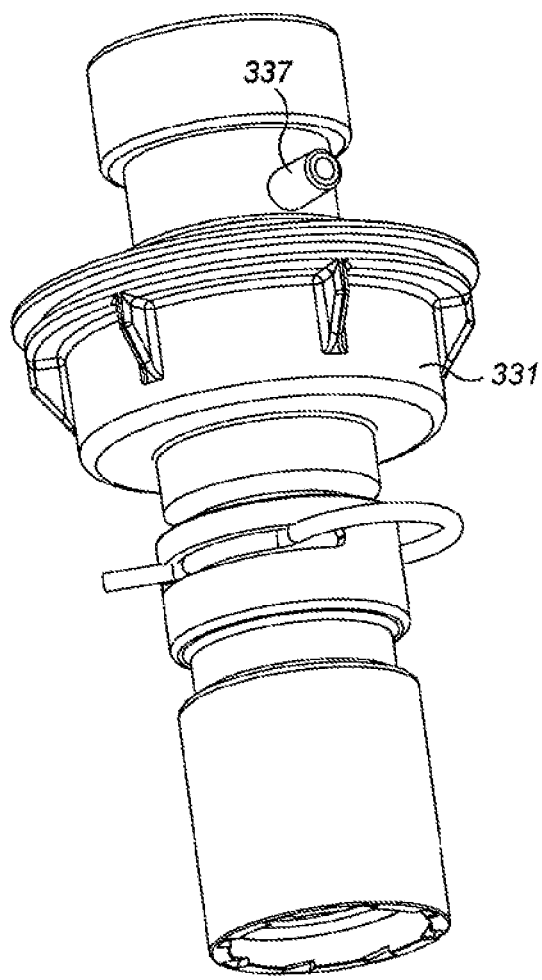
FIGS. 14A and 14B show an enlarged view and longitudinal sectional view, respectively, of a one way valve of the cistern shown in FIGS. 12A and 12B.
Figure 14B:
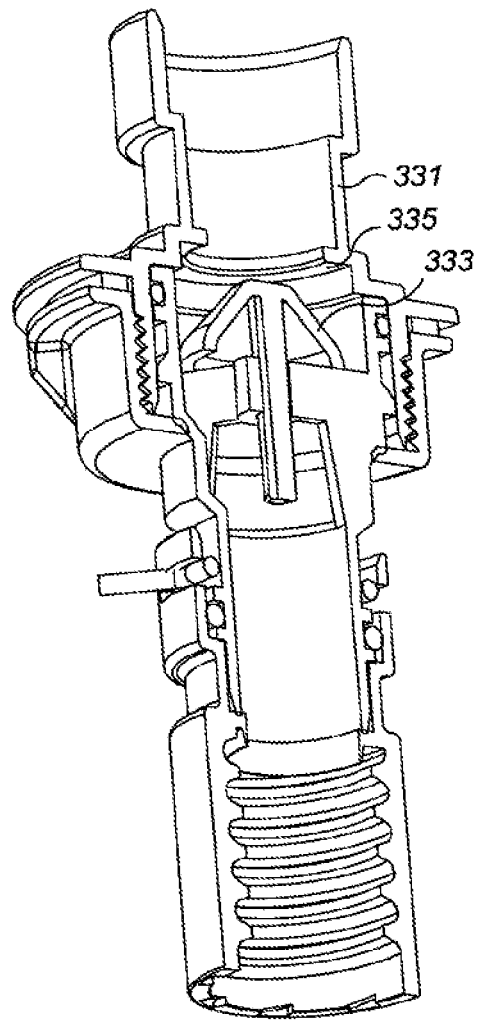

As shown in FIGS. 12A and 12B, the water pump 82 has a crenelated inlet 327 from the water reservoir 134 to help break siphon effect and the outlet tube 329 from the pump 82 leads to a one way valve 331 which as shown in FIG. 14B has a poppet valve 333 which will be lifted up against valve seat 335 in the event of reverse flow up the tube 329 caused by pressure in the toilet pan 50 applied by the air pump 102. The one way valve 331 also has an outlet 337 which leads to pipe 339 as shown in FIG. 12A whose top end 341 is above the level to which water might rise in the chamber 134, the purpose of the pipe 339 being to equalize pressure in the pipe 329 with atmosphere so as to break any siphon through the pump 82.

The cistern chamber 74 also includes an overflow weir 320 having a rectangular wall 320 having three sides, consisting of a long side 321 and two short sides 323. Two of these walls 321, 323 are shown in FIG. 12A. The overflow weir 320 provides a significant overflow capacity in the event that the inlet valve 116 to the water reservoir 134 is jammed open. The overflow wall 320 allows water to escape down vertical overflow channel 324 leading to hopper 325 and overflow exit 326. If overflow exit 326 becomes blocked or the water path downstream of it does, a side aperture 327 in the hopper 325 horizontally to the side of the downwardly directed channel 324 allows water to escape through it on to the floor 66 in the event that the outlet 326 is blocked. This is highly advantageous since the risk of water rising up to a level in which it would interfere with the water inlet valve or the electric components above the water pump 82 in the system chamber, such as motor housing 329 for the air pump and the PCB controller 120, is absolutely minimized. The overflow weir may be positioned at such a height that in the event of an overflow condition caused by a water inlet valve failure, the rising water will overflow first through the internal body of the water pump 82a through the water distribution system and into the pan through the nozzles, where it give a visual warning that an overflow condition is occurring. The weir 320 may thus be higher than all internal water passages through the water pump 82. Should this internal overflow warning system fail to expel the overflow water at the same rate as it is overflowing, or should the overflow condition be caused by sewer backflow from the toilet pan, then the water in the water reservoir will continue to rise until it reaches the overflow weir, whereupon it will spill over. The channel 324 has a rim 329' (FIG. 12B) extending downwardly into the hopper 325 in an overlapping manner so that there is no leakage at the joint between these two components or across the outside of the bottom of the cistern chamber/body 74.

Figure 13A:
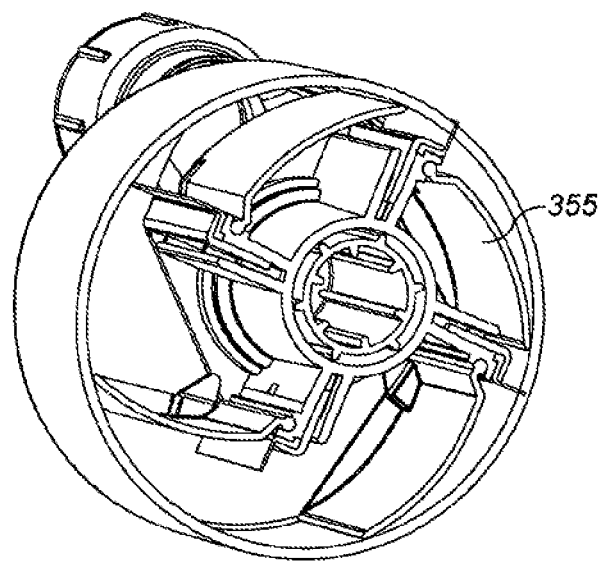
FIGS. 13A, 13B and 13C show various views of the air pump of the toilet cistern.
Figure 13B:
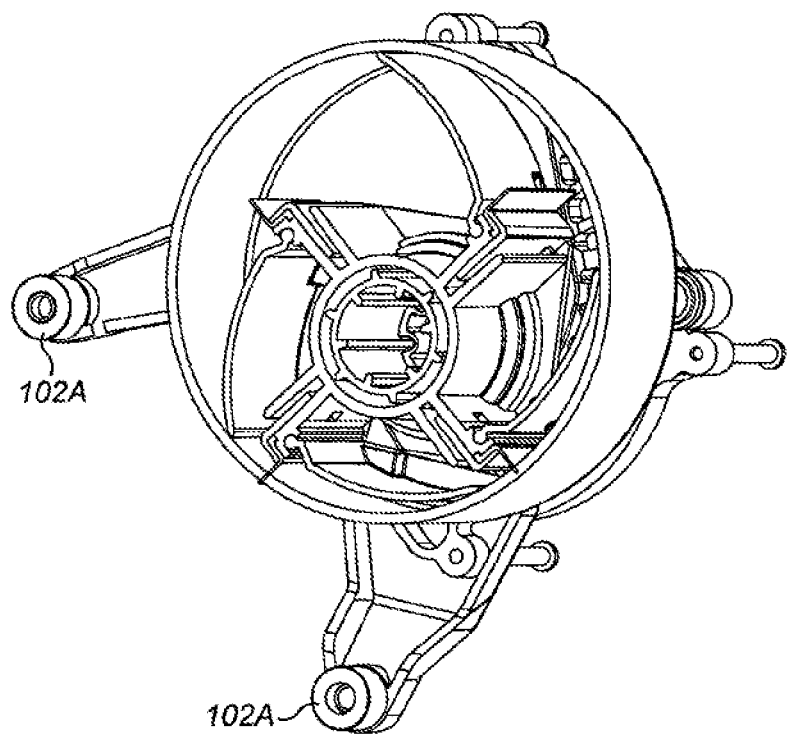
Figure 13C:
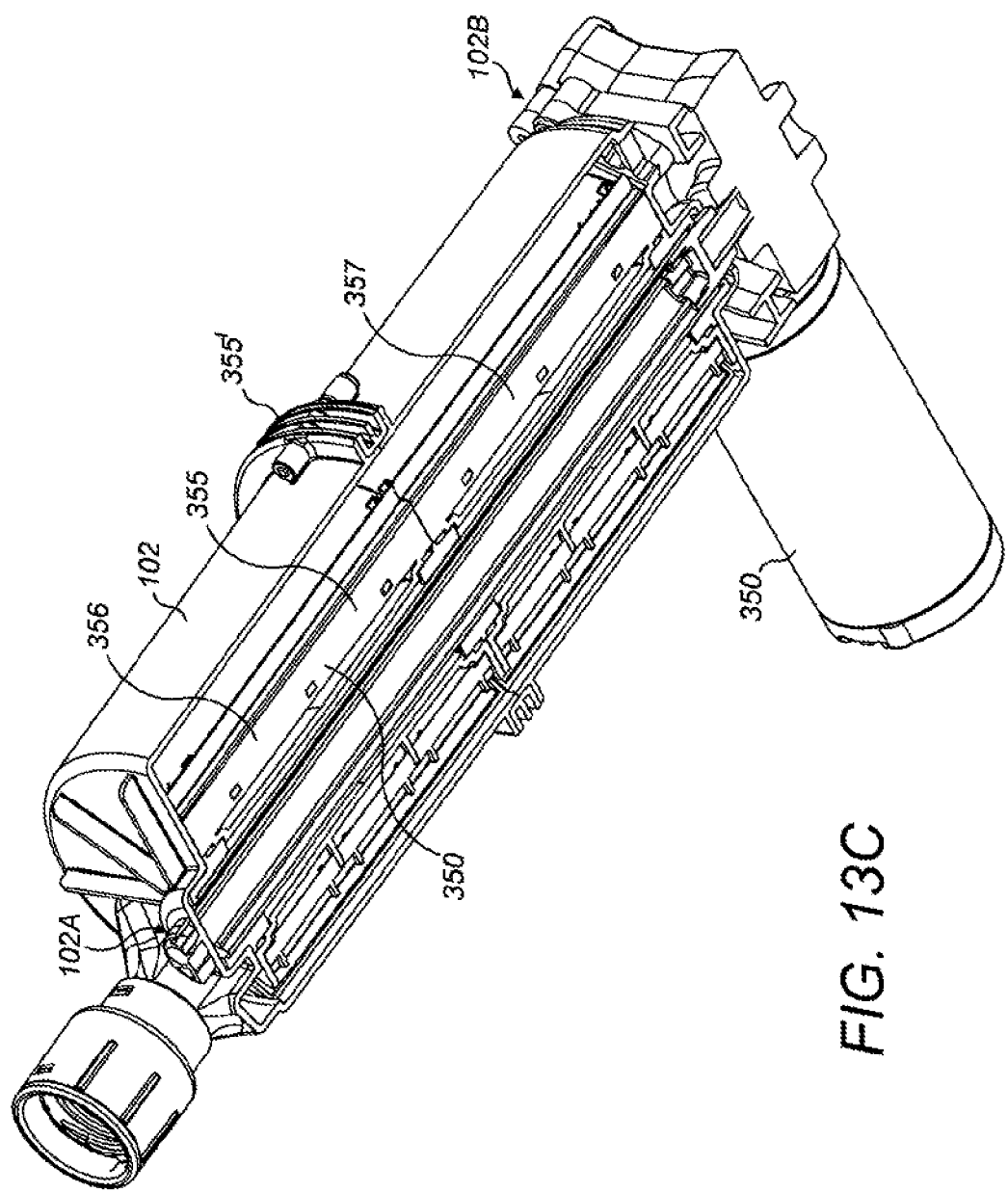

As shown in FIGS. 13A to 13C, the air pump 102's construction is similar to that disclosed in US-A-2008/0253919, except that the rotor 350, vanes 355, 356, 357 and seals of the eccentric hinged vane rotor 350 are each split into two parts joined end to end, and a cylinder comprising two halves joined together against a flange ring 355', which provides dimensional stability during operation, being further provided with anti-vibration mounts 102a to connect the pump to the cistern body. The rotor 350, vanes 355, 356, 357 and seals may be molded or otherwise formed and then trimmed accurately to length before assembly so as to minimize stresses in the air pump 82 while it is in use pumping.

The air pump 102 is also fitted with a motor 350 and anti-vibration mounts 102b.

Figure 16A:
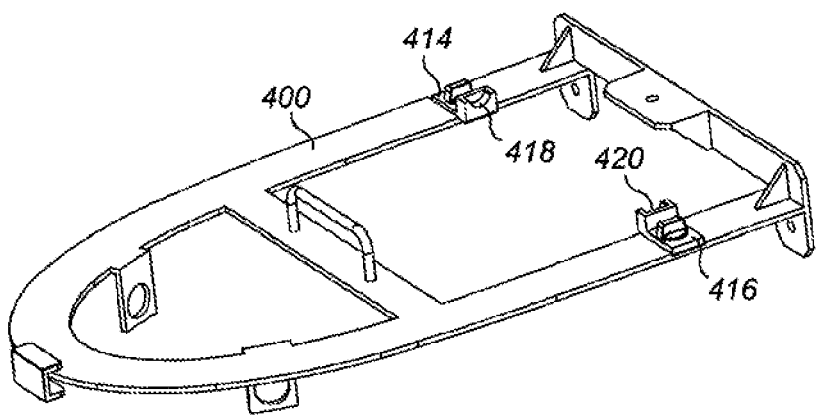
FIG. 16A shows an alternative jig which may be used to set the position of the hinge bearing tube.
Figure 16B:
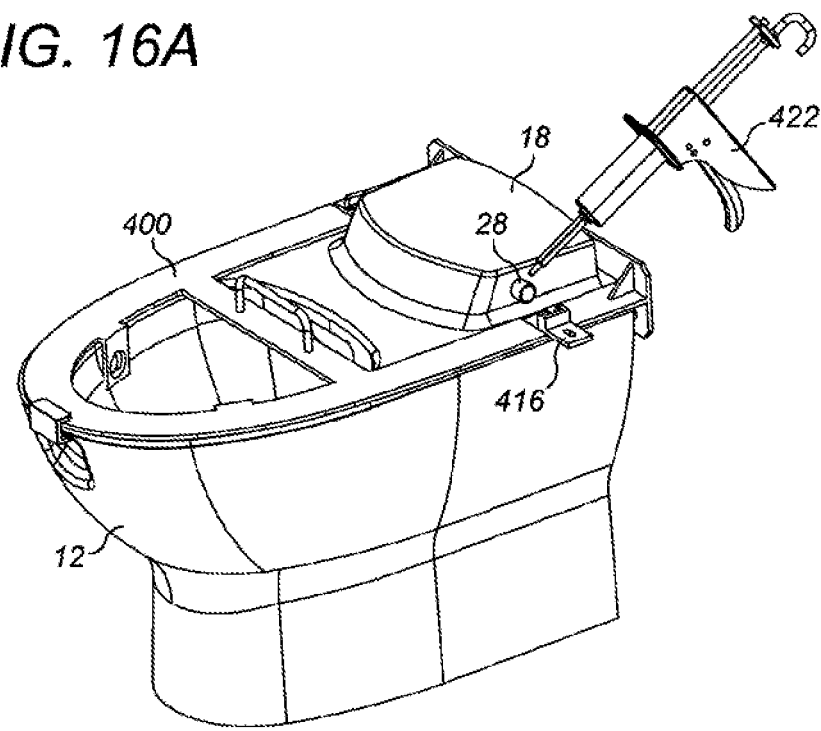
FIG. 16B shows the jig of FIG. 16A positioned on the toilet pan.
Figure 16C:
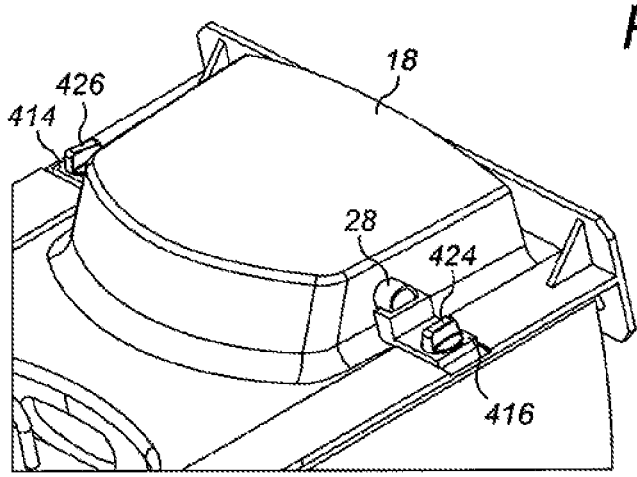
FIG. 16C shows the jig of FIG. 16A supporting a hinge bearing tube while it is fixed in position.
Figure 17:
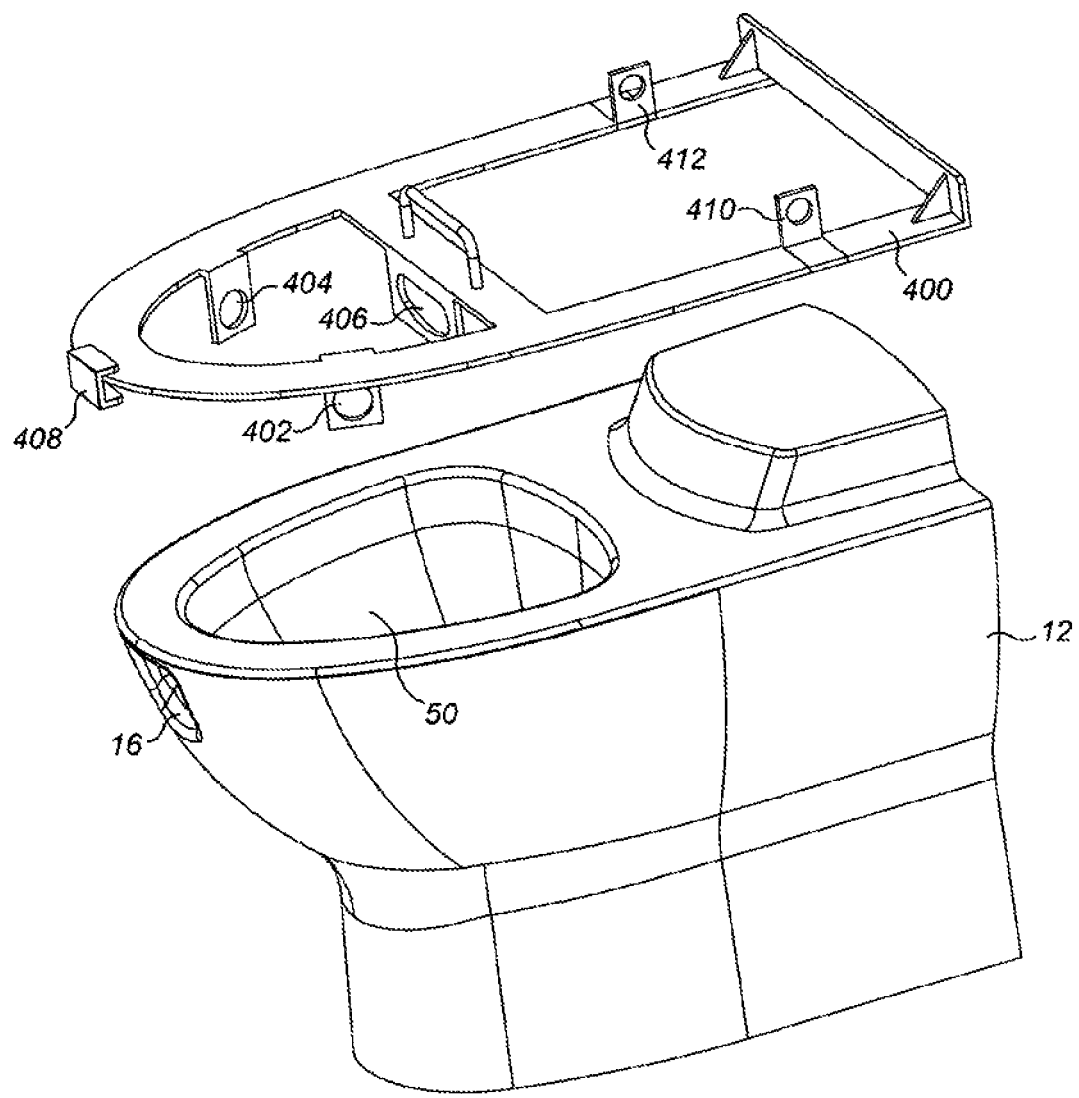
FIG. 17 shows an alternative jig which may be used in order to cut apertures for the hinge bearing tube and for nozzle apertures in the toilet pan bowl.

FIG. 16A shows a modified jig 400, which is a modification of the jig shown in FIG. 17. The jig in FIG. 16A includes two slidable supports 414, 416, which are laterally slidable and have arcuate upwardly facing supports 418, 420. As shown in FIG. 16B, the jig 400 may be lowered on to the pan 12 and positioned on it with the supports 414, 416 positioned to the sides of the raised rear portion or eminence 18. Adhesive or other packing material of structure may be applied in the region of the hinge bearing tube 28 by an applicator 422 and, as shown in FIG. 16C the supports 414, 416 may be slid inwardly such that arcuate upwardly facing supports 418, 420 support the bearing tube 28 while the adhesive sets, the supports 414, 416 being tightened in position by nuts 424, 426 for the duration of this process.

Figure 16D:
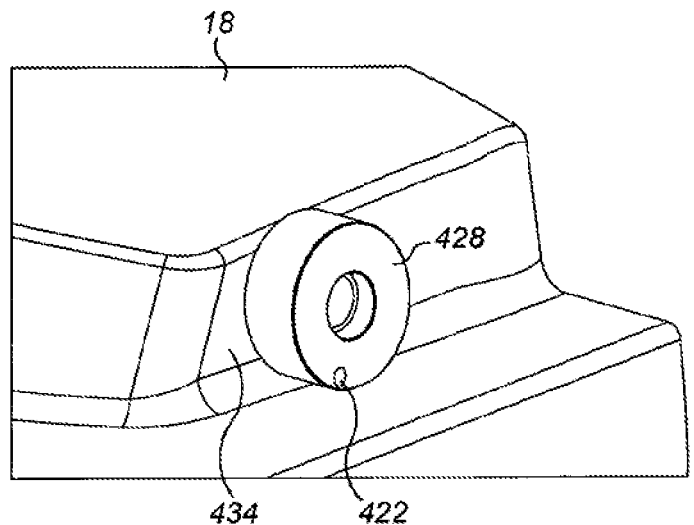
FIGS. 16D and 16E show how shapers may be used when applying packing adhesive to fit the hinge bearing tube in position.
Figure 16E:
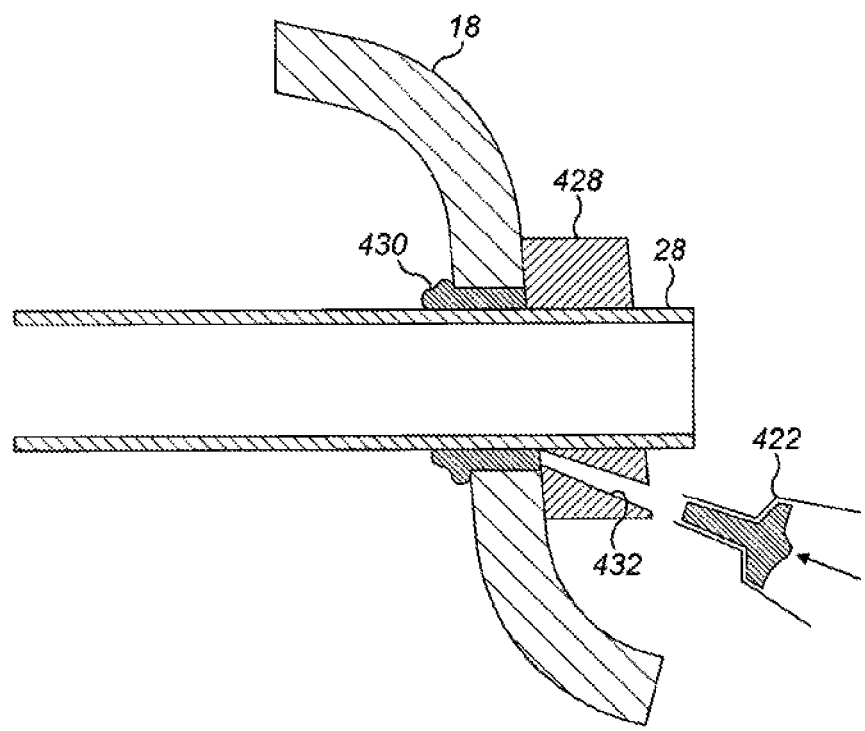

In a modification of this process as shown in FIGS. 16D and 16E, shapers 428 of silicone rubber material may be fitted over each end of the hinge bearing tube 28 while epoxy resin packing material 430 (or other adhesive or gap-filling material or structure) is injected into the position shown in FIG. 16E through aperture 432 using applicator 422. The bearing tube 28 may be held by the jig 400 during the injection process or from just after injection while the adhesive packing material 430 sets. Since the silicone shapers 428 are of silicone material and the packing material 430 is an organic material such as a two-pack epoxy resin they do not adhere to one another and once the packing material 430 has set, the silicone shapers 428 may be removed leaving a neat surface for the packing material 430, as required, such as generally flush with the side surfaces 434 of the raised rear portion 18 of the pan 12.

Figure 18A:
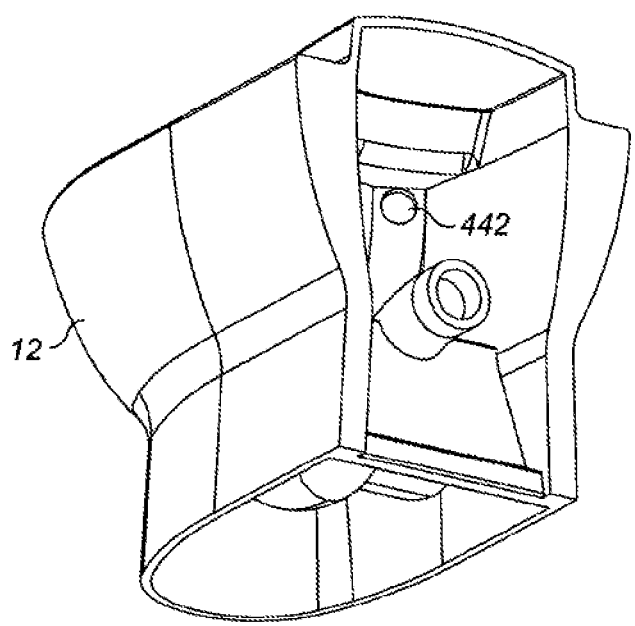
FIG. 18A is a perspective from behind and below of the toilet pan.
Figure 18B:
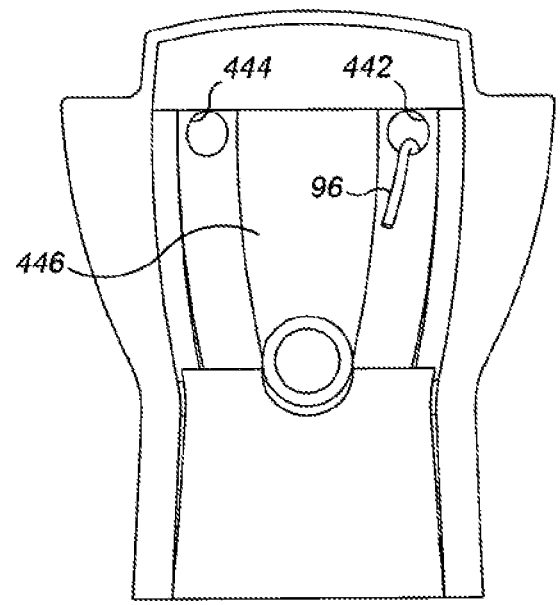
FIG. 18B is a view from behind of the toilet pan, showing apertures useful for assembling side water conduits.
Figure 18C:
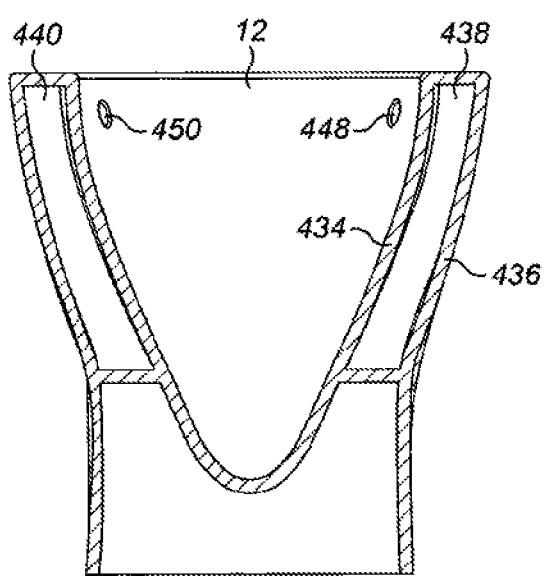
FIG. 18C is a section through the toilet pan viewed from behind, showing how the toilet pan has interior and exterior ceramic side walls and a space therebetween.

As shown by the cross-section in FIG. 18C, the ceramic pan has inner 434 and outer 436 ceramic side walls. As shown in FIG. 18A, and FIG. 18B, the spaces 438, 440 between the walls 434, 436 may be accessed by apertures 442, 444 in an inner rear wall 446 of the ceramic pan casting. The side water conduits 94, 96 are fitted through the apertures 442, 444 and reach to the pan side apertures 448, 450 as will now be described.

Figure 20A:
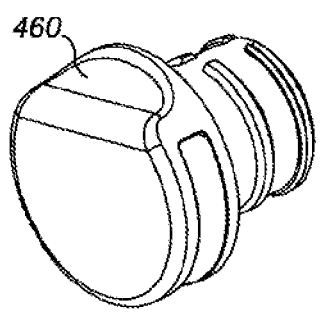
FIGS. 20A to 20C show various views of a nozzle deflector part of each side water nozzle.
Figure 20B:
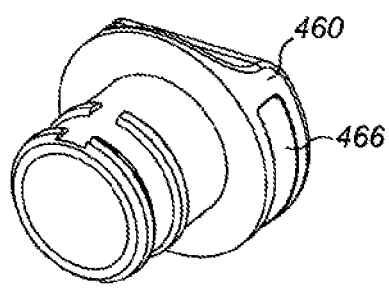
Figure 20C:
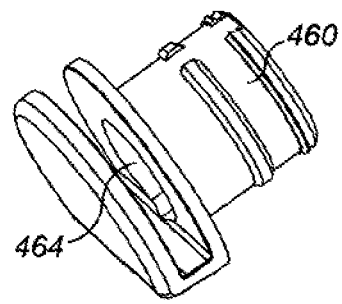
Figure 21A:
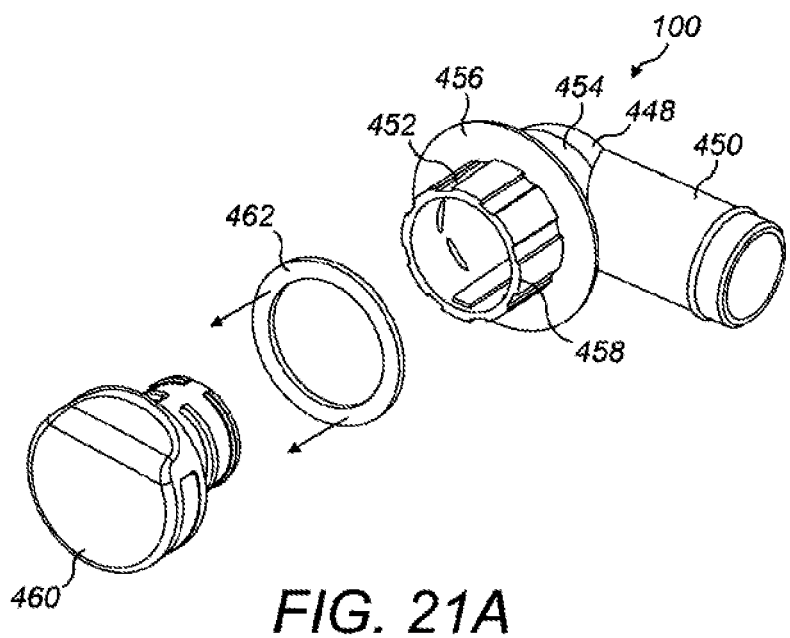
FIGS. 21A to 21C show the components of the side water nozzles, including elbow members thereof.
Figure 21B:
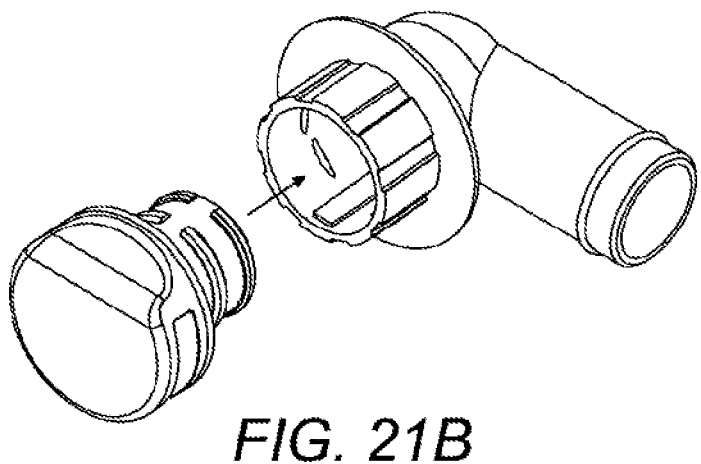
Figure 21C:
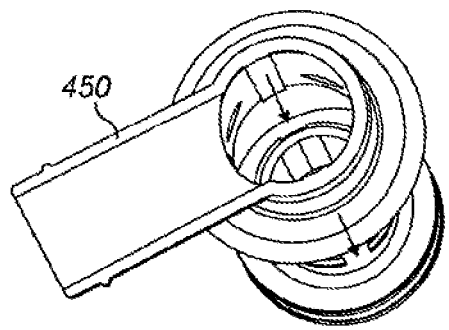

As shown in FIG. 21A, each nozzle 98, 100 is made up of a right angle part or elbow member 448 having a first arm or sleeve part 450 generally perpendicular to a second arm 452 and an elbow 454 between the two arms 450, 452. Each nozzle 98, 100 also includes a ring-like flange 456 on the second arm 452. The second arm 452 has a connector part 458 which may be connected to nozzle deflector plate part 460 with a circular ring seal, or O-ring or compression seal 462 positioned between nozzle deflector plate part 460 and the flange 456. The deflector plate part 460 is shown in more detail in FIGS. 20A, 20B and 20C and it will be seen that this has an exit aperture 464 leading to an outlet deflector plate 466 which is configured to form a spray on the bowl 50 of the toilet pan 12.

Figure 19A:
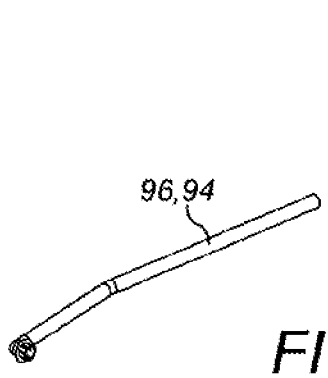
FIGS. 19A to 19J show various views of steps during the assembly of side water conduits and nozzle components on to the toilet pan.
Figure 19B:
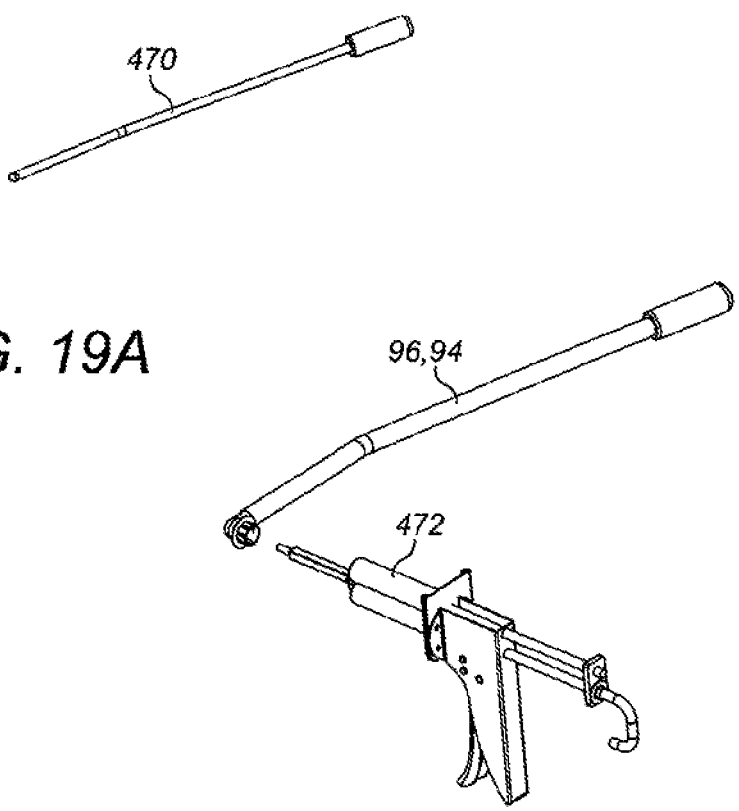
Figure 19C:
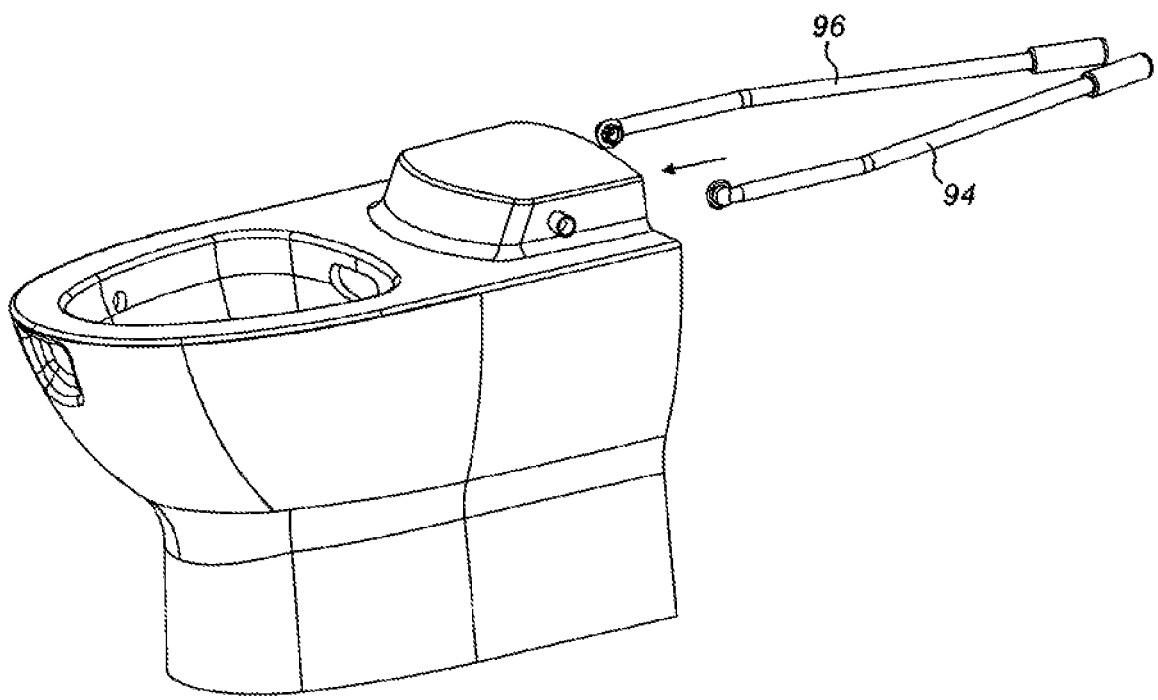
Figure 19D:
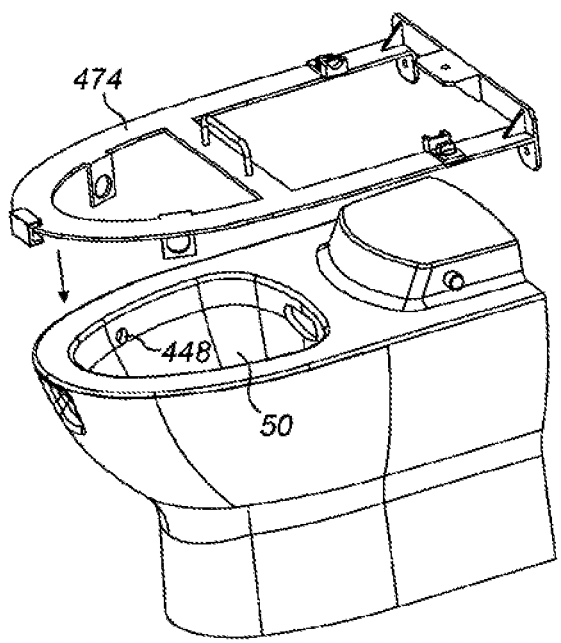
Figure 19E:
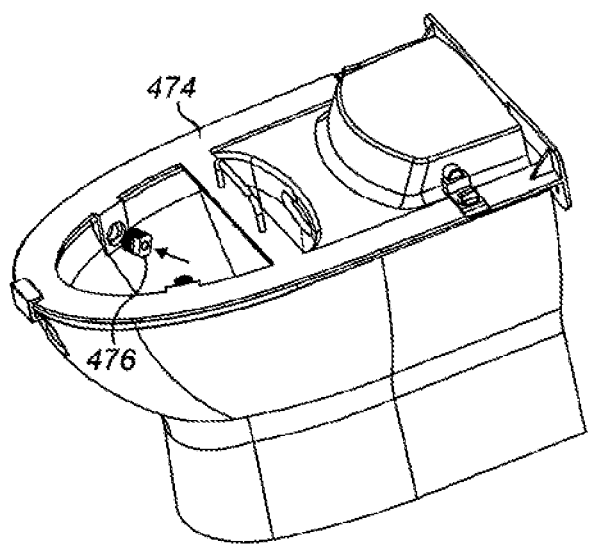
Figure 19F:
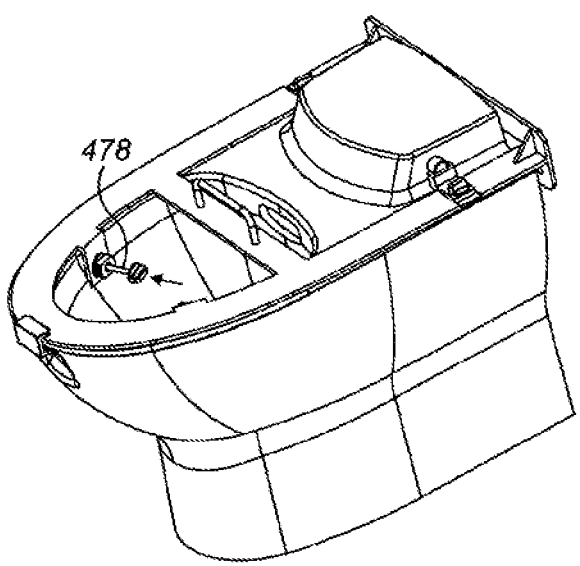
Figure 19G:
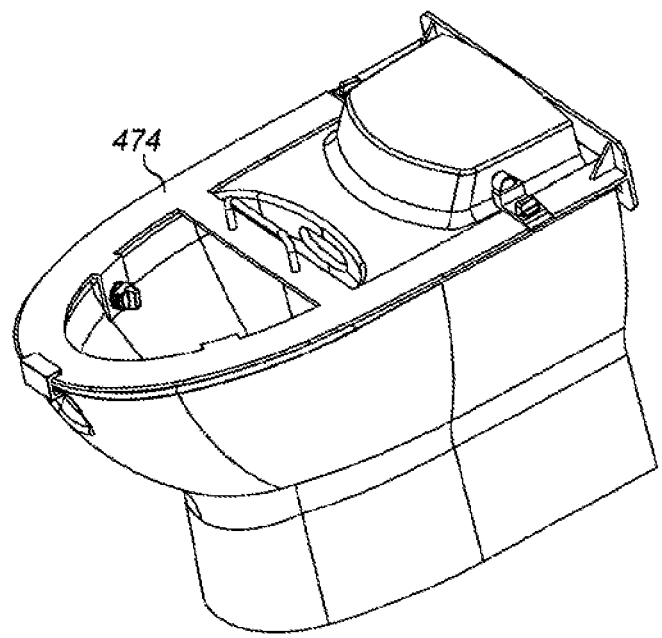
Figure 19H:
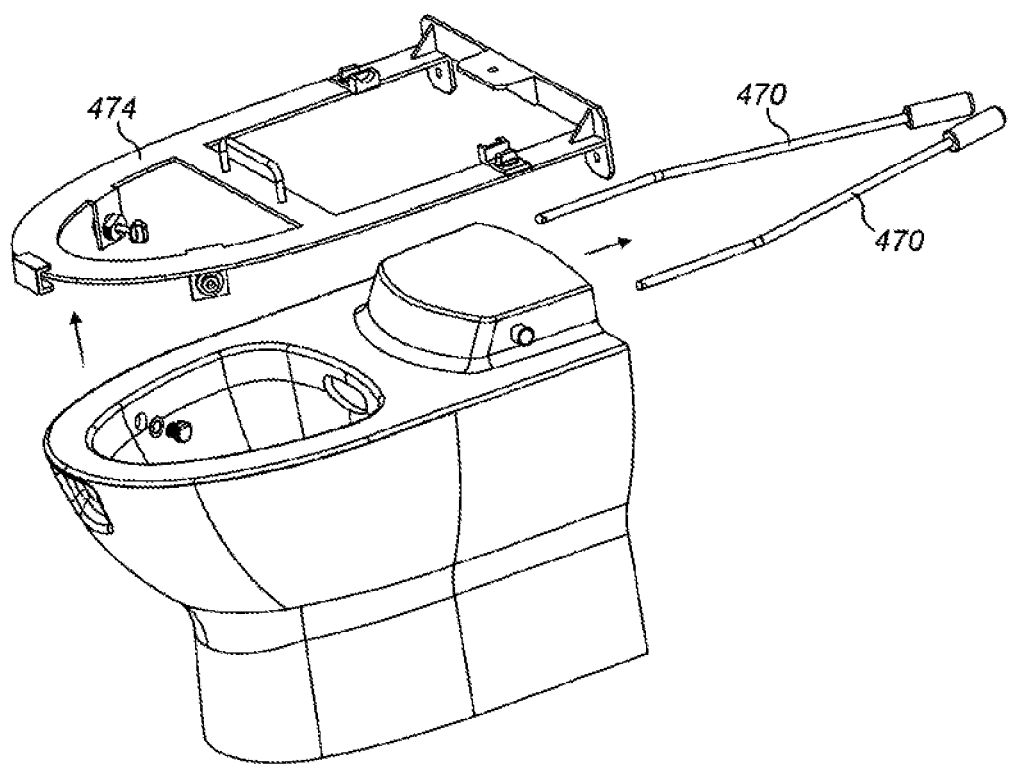
Figure 19I:
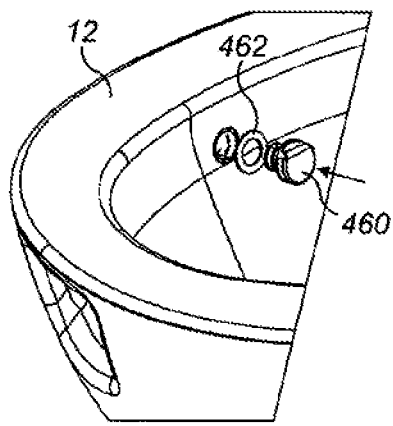
Figure 19J:
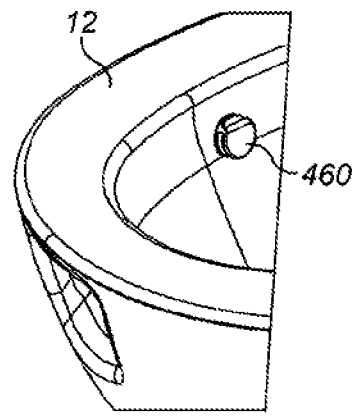
Figure 22:
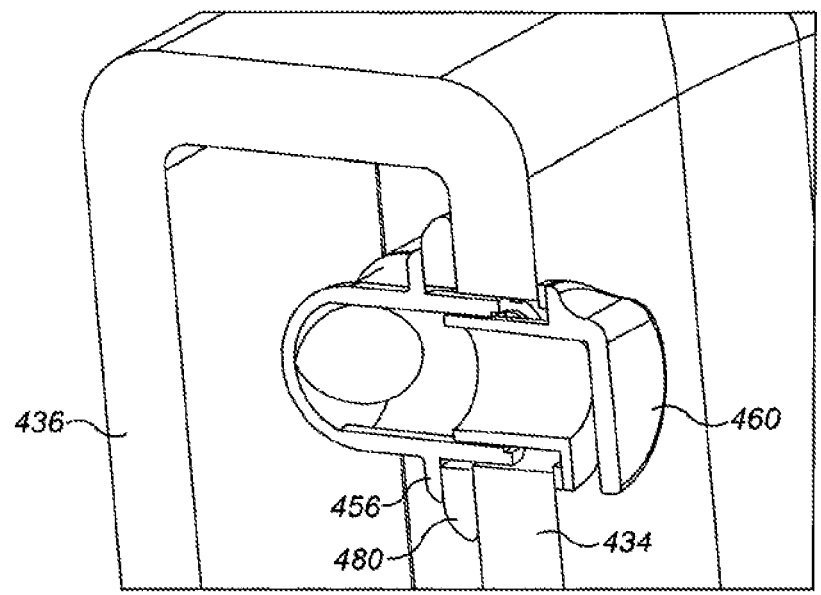
FIG. 22 is a section through one side of the toilet pan and through one of the side nozzles, showing the configuration of the side nozzle once connected to the pan bowl.

As shown in FIG. 19A, once side water conduits 94, 96 are connected to elbow members 448, a rod 470 may be manually slid along inside (or in other embodiments a tube over and outside) each of the side water conduits 94, 96 to adopt the configuration shown in FIG. 19B. Next, as shown in FIG. 19B, adhesive may be applied using an applicator 472 to place adhesive on the flange 456 and near the flange 456 on connector part 458. Then, as shown in FIG. 19C the side water conduits 94, 96 may be inserted through the apertures 442, 444 (FIG. 18B), Then, using the jig 474 shown in FIGS. 19D, 19E, 19F and 19G, jig parts 476, 478 may be used to hook into or otherwise connect to the nozzle part 440 in order to set the flange 456 in the desired position for each of the water conduits 94, 96, this position being shown in FIG. 22 in which the adhesive 480 is shown. At this stage, though, the deflector part 460 has not been fitted. Once the adhesive 480 has set, the jig components 476, 478 and then the jig 474 are removed as shown in FIG. 19H as are the rods 470, leaving the water conduits 94, 96 in place. Then as shown in FIG. 19H and more clearly in FIG. 19I the ring washers/compression seals 462 are slid on to the deflector plate parts 460 and the deflector plate parts 460 are pushed into and snap-fittingly or otherwise connect to the second arms 452 of the nozzle parts 448. The water conduits 94, 96 may then be connected up to the manifold assembly 88.

Figure 24A:
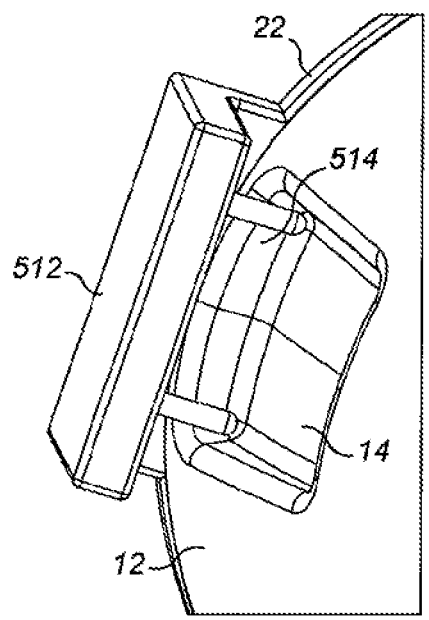
FIGS. 24A to 24F show a modified jig for positioning the hinge tube while it is fixed in position relative to the toilet pan body.
Figure 24B:
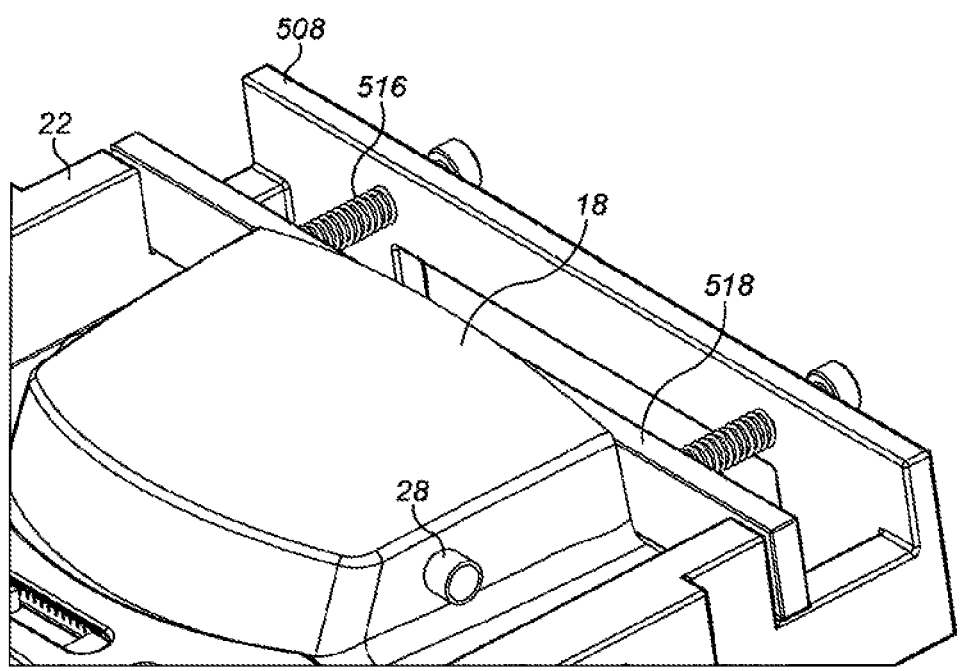
Figure 24C:
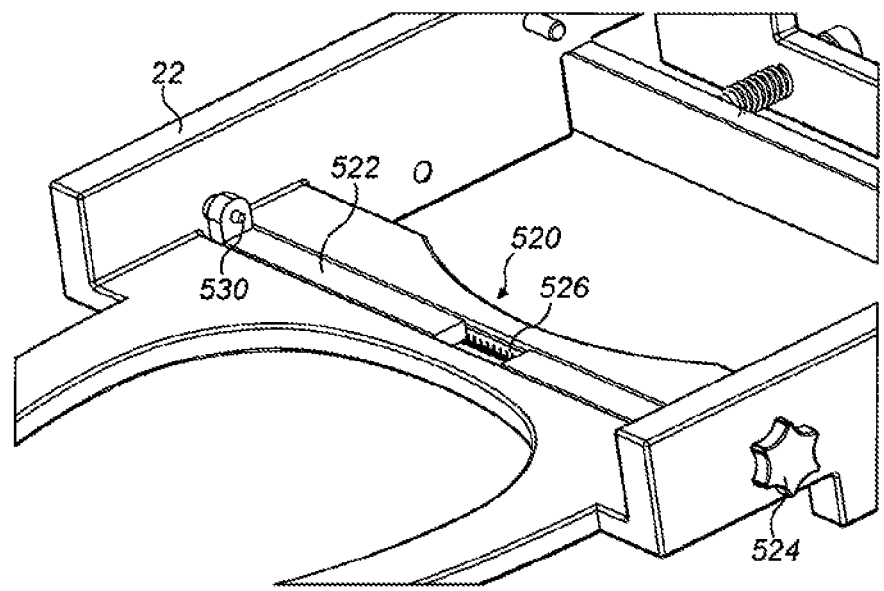
Figure 24D:
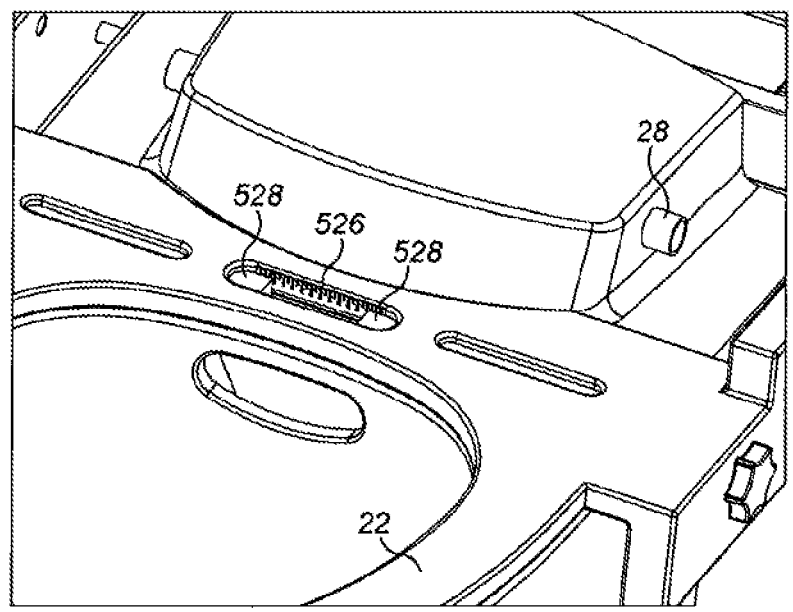
Figure 24E:
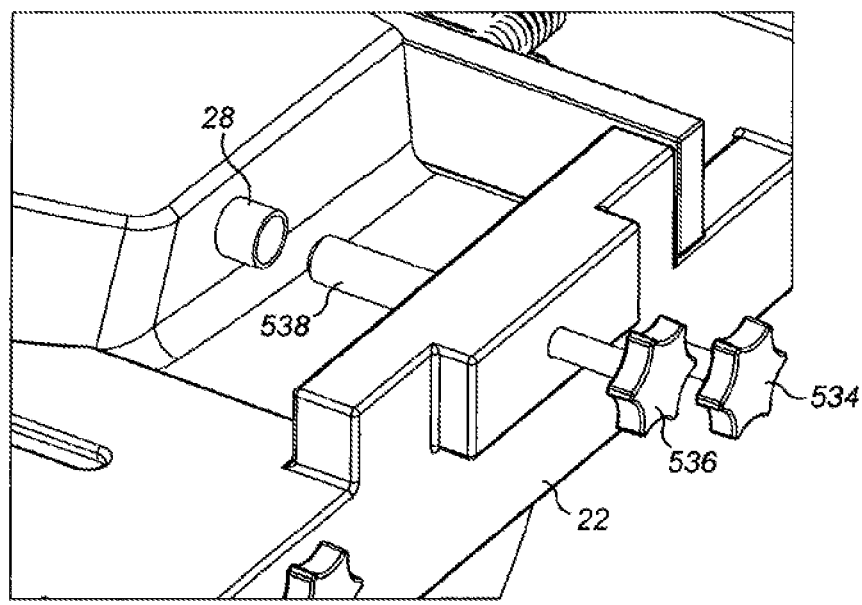
Figure 24F:
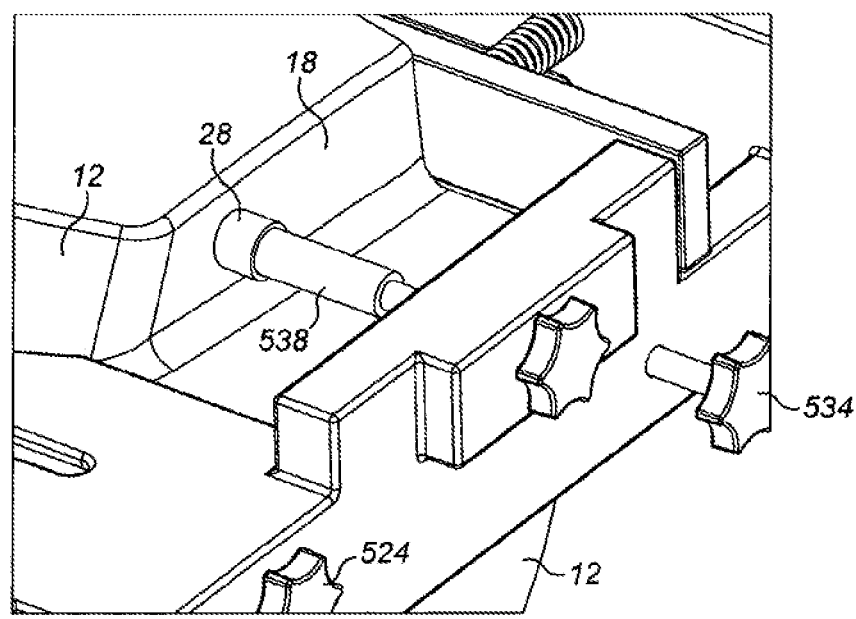

FIGS. 24A to 24F and FIGS. 26A and 26B show a modified version of the jig 22 which is used to position the hinge tube 28 while it is secured in position by adhesive using shapers like the one 428 shown in FIGS. 16D and 16E, although the two shapers 428 are not shown in the FIGS. 24A to 24F. It will also be appreciated that the hinge tube 28 shown for example in FIGS. 24B and 24E and 24F is positioned within a larger aperture (not shown) as shown in FIG. 16E in the raised rear portion 18 and the radial gap between the tube 28 and the aperture in the raised rear portion 18 is filled with adhesive as shown in FIG. 16E.

Figure 25A:
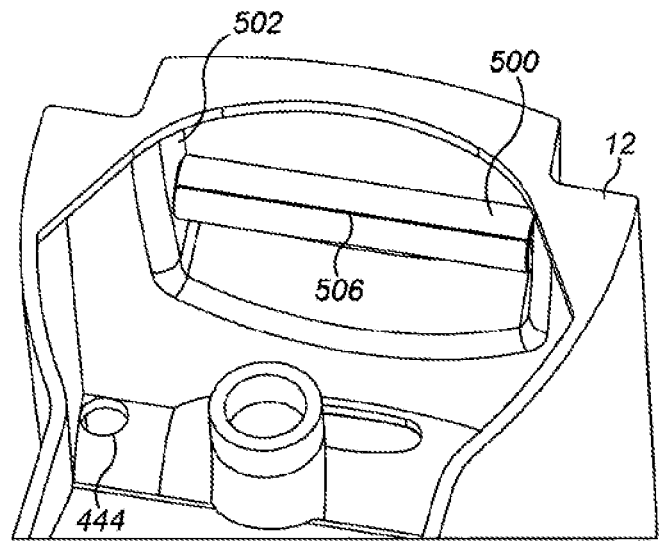
FIGS. 25A and 25B show a resilient tube which is positioned around the hinge tube to limit adhesive flow during adhesive fixing of the hinge tube in position relative to the toilet pan.
Figure 25B:
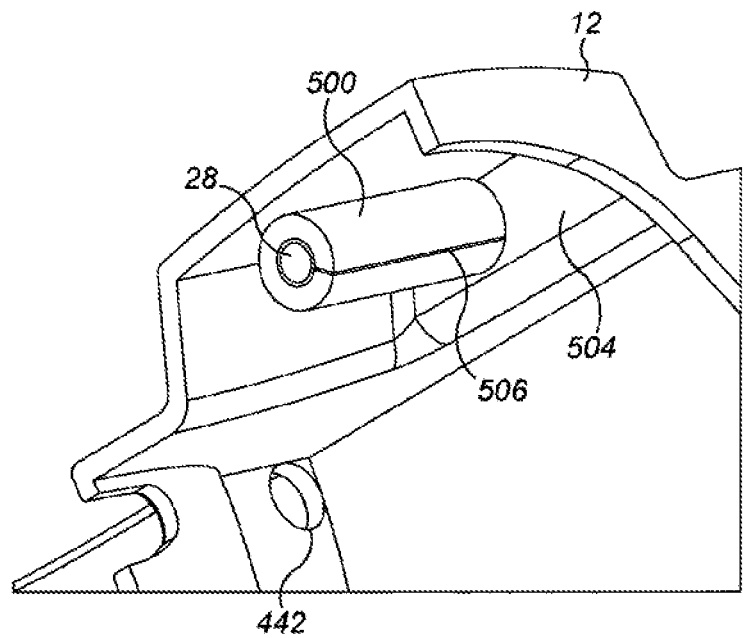

As shown in FIGS. 25A and 25B, before the jig 22 is applied to the pan 12, the hinge tube 28 is slid approximately into position through a resilient flexible tube 500, the tube resiliently abutting against internal faces 502, 504 of the pan 12 raised rear portion 18 such that when the adhesive is applied as shown in FIG. 16E or in a similar way, there is little or no leakage of adhesive to the interior of the pan 12 and the use of adhesive and spillage is minimized. The flexible resilient sleeve 500 has a radial cut 506 extending the whole way along it so that the tube 500 can be removed from the hinge tube 28 (and re-used) once the adhesive 430 has set.

Figure 26A:
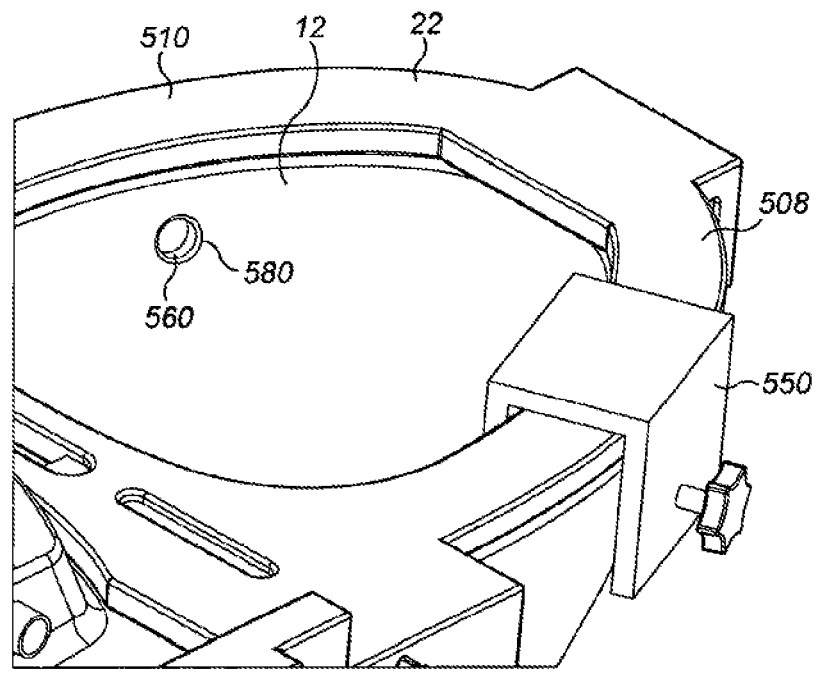
FIGS. 26A to 26D show how an additional jig component is used to accurately position the side water nozzles as they are secured to the toilet pan body.
Figure 26B:
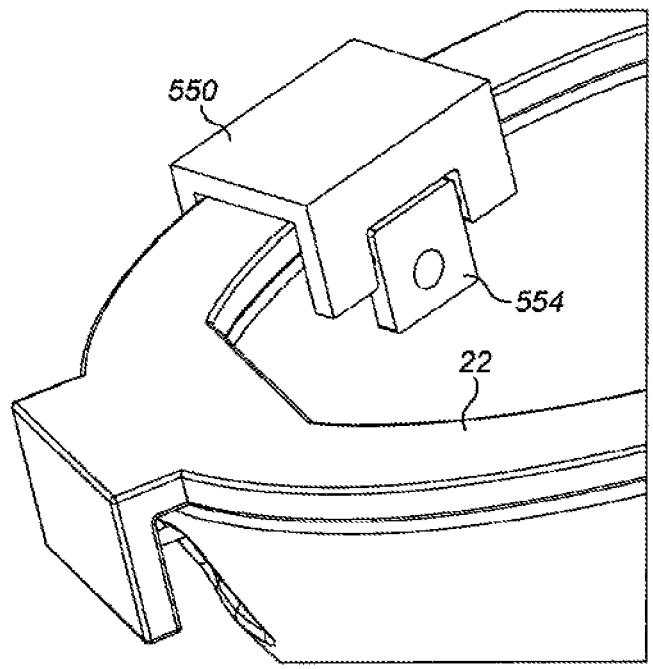
Figure 26C:
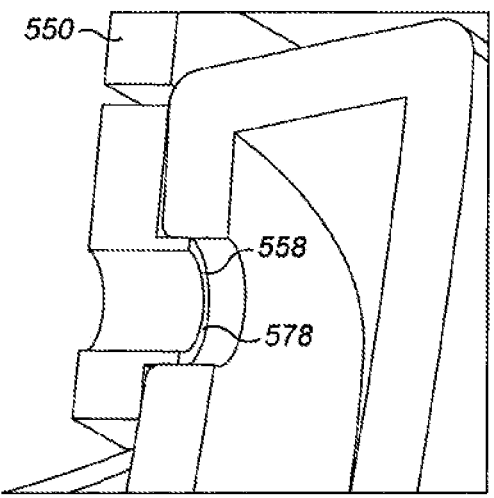
Figure 26D:
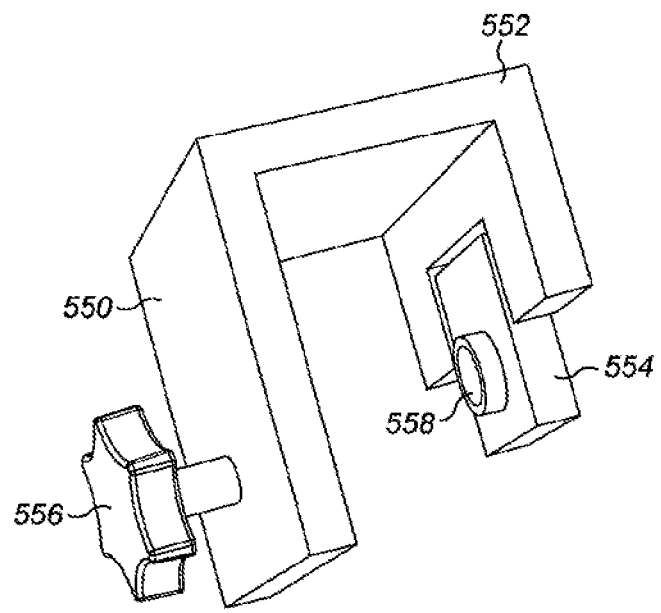

As shown by FIGS. 26A and 24C, the jig 22 has a main body 508 having a ring 510 and which sits on the toilet pan 12 on three stabilizing pads (not shown), the ring 510 having a pass/fail latch feature 512 at a front end thereof, the pass/fail latch feature having a ledge 514 for engaging within the latch recess 14 and the fired ceramic toilet pan 12 may be rejected if the flange 514 of the pass/fail latch feature 512 does not correctly fit in the recess 14. The pass/fail latch feature 512 engages on the front of the toilet pan 12 in the region of the recess 14 and defines the longitudinal position at which the hinge bearing tube 28 will be glued or otherwise fixed in position relative to the toilet pan 12.

At a rear end of the jig 22 the main body 508 of the jig is coupled via spring biases 516 (FIG. 24B) to a pusher plate 518 which pushes on the rear of the raised rear portion 18 of the toilet pan 12 thereby resiliently controlling the longitudinal position of the jig 22 on the toilet pan 12.

Next, a lateral alignment arrangement 520 is used to set the lateral position of the jig 22. FIG. 24C shows the jig 22 upside down and it can be seen from this view that the lateral alignment arrangement includes two sliders 522, each of which is laterally slidable using a thumb screw 524 relative to the main body of the jig, as well as an indicator strip 526. The sliders 522 have inward ends 528 and as the thumb screws 524 are rotated, the slider ends 8 can be seen when viewed from above as in FIG. 24D to move relative to the indicator strip 526. The thumb screws 524 are threaded into the main body 508 such that as they are rotated, end faces 530 thereof slide with the sliders 522. The thumb screws 524 may be adjusted until both end faces 520 or pads (not shown) or other components attached to them are engaged with the sides of the toilet pan 12 while at the same time both of the slider ends are equal distances from the two ends of the indicator strip 526, such that the jig is defined laterally centrally relative to the toilet pan 12.

Next, additional support thumb screws 534 may be tightened up such that pads (not shown) on inner ends thereof (not shown) engage against the sides of the pan 12 to provide additional support so that the jig 22 does not slip during the adhesive application for securing the hinge tube 28.

Next, alignment pin screws 536 with pins 538 are extended (by rotation and, again, threaded) action laterally inwardly so that they move from the position shown in FIG. 24E to the position of FIG. 24F in which the pins 538 engage on the hinge tube 28 and position it exactly laterally centrally with respect to the pan 12, with the longitudinal position of the hinge tube 28 relative to the pan front and the height of the hinge tube 28 relative to the toilet pan 12's top surface 42/rim 44 also exactly set. It will be appreciated that in this position, there is a radial gap as outlined above between the hinge tube 28 and a larger aperture in the raised rear portion 18 of the toilet pan 12, similar to that shown in FIG. 16E. Shapers 428 are then added at both ends of the hinge tube 28 and adhesive 430 (such as an epoxy) is injected as packing material (as shown in FIG. 18E or in a similar way) between the hinge tube 28 and the surrounding surface of the toilet pan 12 in the region of the rear raised portion 18. Once the adhesive 430 has set and the hinge tube 28 is permanently fixed in position, the shapers 428 and sleeve 500 may be removed and the rest of the toilet can be assembled later on as described herein (i.e. including the seat 58 and lid 56 and all the various other components). In this way therefore, despite some variation in the sizes of ceramic pans 12, the hinge tube 28 may be set at a constant longitudinal position and height relative to the front of the pan 12 and the upper surface 42/rim 44 respectively (and set centrally) so that such pans 12 of slightly different sizes due to firing may nevertheless be used with seats 58 and lids 56 and other components which do not vary noticeably in size in a production run.

As shown in FIGS. 26A to 26D, however, before the jig 22 is removed, an additional jig component tool 550 having a clamp 552 holding a generally flange-like positioning element (or top hat member) 554 may be positioned on the jig and secured with a clamping action by rotation of a clamp screw 556. The tool 550 is positioned and clamped in place with a projecting part (which is a short length of a cylindrical tube giving the appearance of a top hat therefore) 558 of the positioning element 554 located inside a side nozzle hole 560 of the pan 12. Although one tool 550 is shown in FIG. 26A, two can be used simultaneously, one for each side of the pan 12.

Figure 27A:
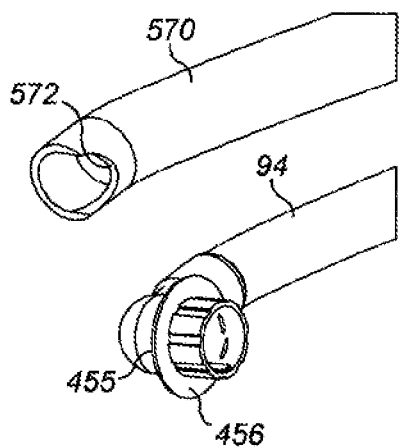
FIGS. 27A to 27D show a modification to the embodiment described with reference to FIGS. 19A to 19C in which tool rods are replaced with tubular tools for holding side nozzle components in position while they are secured by adhesive to the toilet pan body.
Figure 27B:
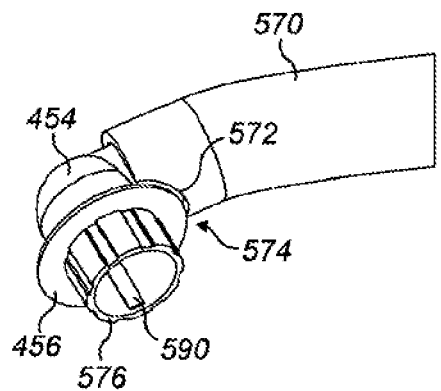

Next, in a modification of the above description with reference to FIGS. 19A to 19C, as shown in FIG. 27A a tubular tool 570 is slid along each of the side wall conduits 94, 96 (i.e. two tools 570) which have been attached to elbow members 454, with a curved cut out 572 in each tool 570 engaging against a corresponding curved formation 574 of each elbow 454 so that the elbow 454 and tool 570 do not easily rotate relative to one another.

Figure 27C:
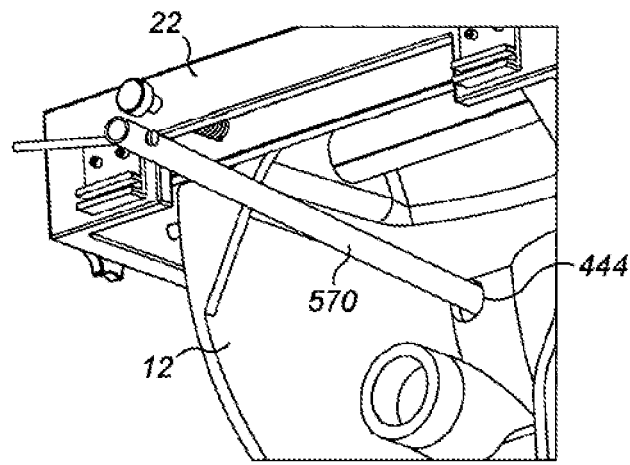
Figure 27D:
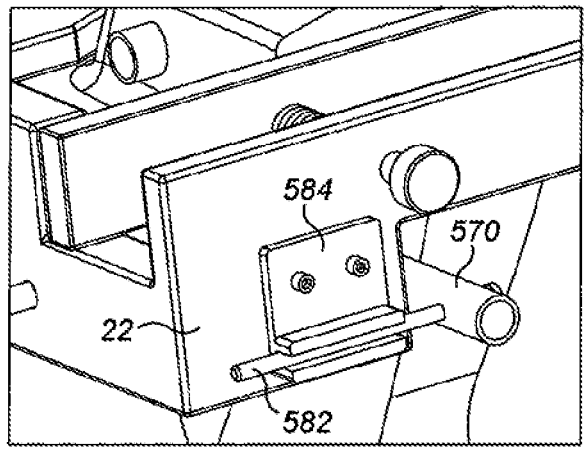
Figure 28A:
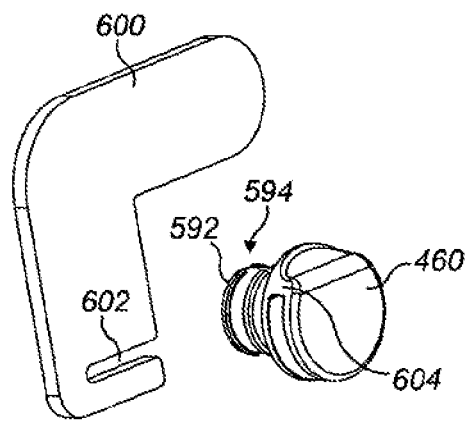
FIGS. 28A to 28D show stages in the method of attaching the side water nozzles to the toilet pan body.
Figure 28B:
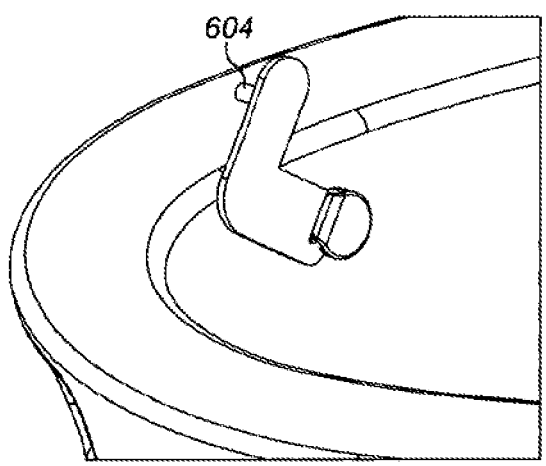
Figure 28C:
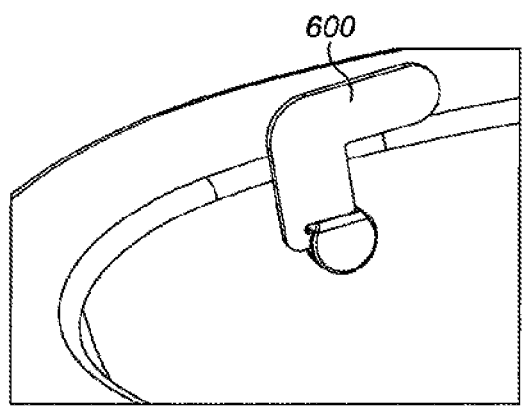
Figure 28D:
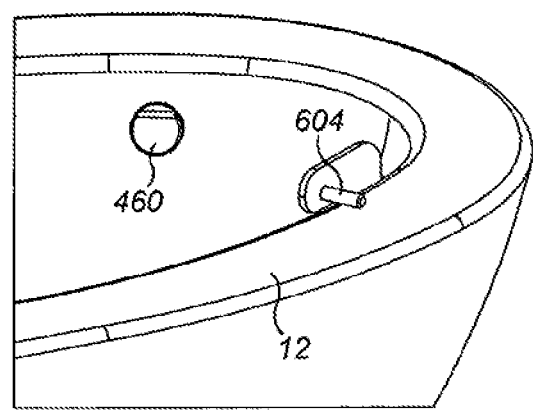

Adhesive is then applied to the annular flange 456 of each elbow member 454 before the tools 570, one of which is shown in FIGS. 27C and 27D are slid into the holes 442, 444 in the rear of the pan 12. The elbow members 454 are positioned with front faces 576 thereof touching the opposing faces 578 of the projecting parts 558 of the positioning elements 554 by the side of the pan. Adhesive between the annular flanges 456 and the pan 12 then sets to fix the elbow members 454 in place. Due to the use of the projecting parts 558 with fixed length, the elbow members 454 are fixed a set distance recessed (which may for example be about 1 mm or 2 mm) from the upwardly facing surface 580 of the pan 12 and this provides for variation in the thickness of the ceramic pan 12 walls as the pan 12 is fired, i.e. so that all toilets in a batch may have the same amount of recessing. While the elbow members 454 are being maintained in place, a formation 582 on each tool 570 may lock (by latching or hooking action or otherwise) with a formation 584 on the jig 22 to maintain the elbow members 454 in place and to push the elbow members 454 towards the positioning elements 554 (due to reaction forces from holes 442, 444 on the tools 570) to ensure the elbow members 454 are accurately positioned in place.

Once the adhesive has set, the tools 570, jig 22 and additional jig components 550 may be removed, leaving the elbow members 454 and conduits 94, 96 in place. It will be noted that using the jig 22 enables the longitudinal, height and lateral position of the hinge tube 28 to be set, using the pass/fail "latch" feature 512 for longitudinal position, three pads (not shown) under the jig for finding a good average height and laterally by use of the lateral alignment arrangement 520 (or "centering gauge").

Each elbow member 454 may incorporate a fin 590 and the nozzle deflector plate parts 460 may include circumferential ribs 592 having at least one slot 594 defined therein (one is shown in the figures—others may be present) which may allow the nozzle deflector plate parts 460 to be pushed into the elbow members 454 (with or without the use of adhesive applied first). As shown in FIGS. 28A to 28D, once pushed into place in the elbow members 454, the nozzle deflector plate parts 460 may be rotated using a jig part 600 having a slot 602 arranged to locate on a corresponding formation 604 of the nozzle deflector plate part 460. The jig tool 600 incorporates a stop member 604 for limiting rotation of the nozzle deflector plate part 460 to the position shown in FIGS. 28C and 28D in which the stop member 604 engages upon the upper surface of the pan 12. The amount of rotation may be approximately 45 degrees or 90 degrees or another angle. The nozzle deflector plate parts 460 may be very accurately aligned in position such that the nozzle spray therefrom while in use is accurately directed. The circumferential member or members 592 may cut into the fin 590 to assist in holding the nozzle deflector plate parts 460 in position. As indicated above, adhesive may be used for sealing the nozzle deflector plate parts 460, but alternatively, a circular ring seal or O-ring or compression seal 462 as described may be used.

It will be appreciated that it can, for example, be before or after the addition of the nozzle deflector plate parts 460 that the rest of the toilet assembly, i.e. including seat 58 and lid 56 and the various other components, may take place.

Figure 29A:
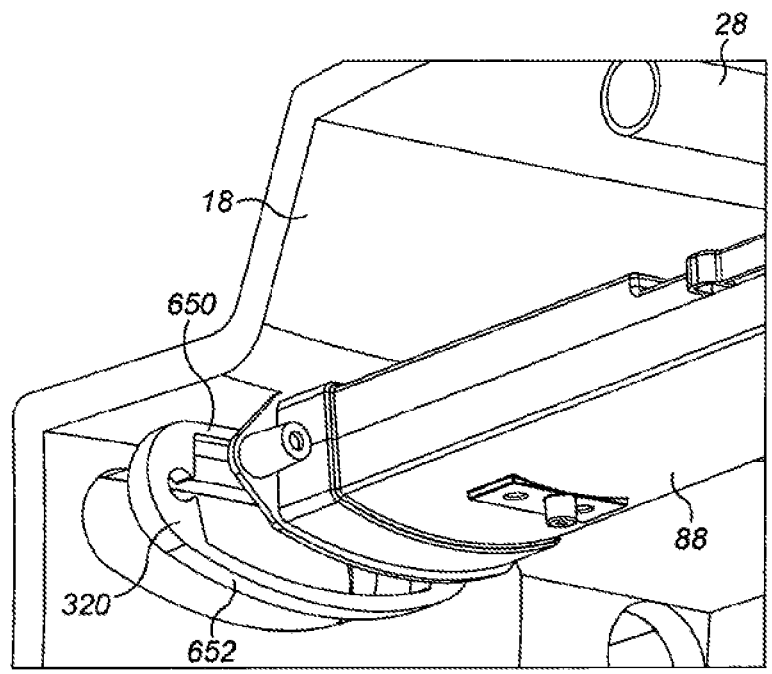
FIGS. 29A and 29B show a modified version of the water manifold assembly shown in FIGS. 10A and 10B and FIG. 29C shows a modification to the water path splitter of those views.
Figure 29B:
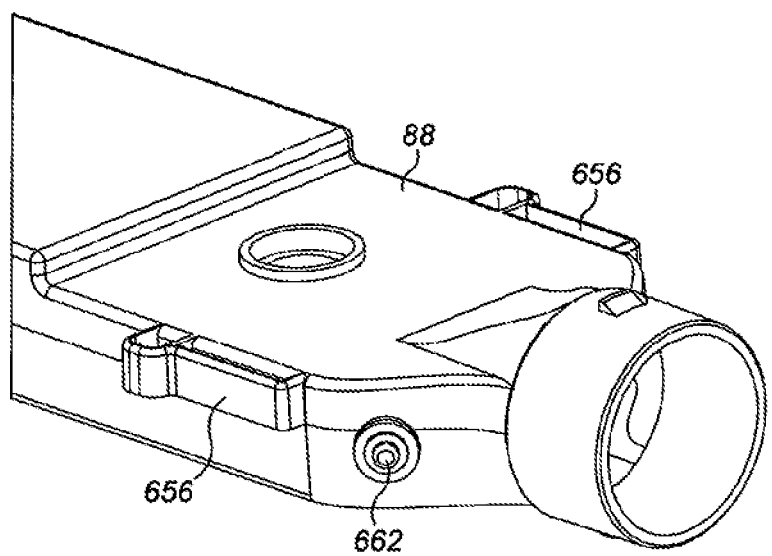

FIG. 29A shows a modification to the manifold assembly 88 whereby gasket 320 may be formed wedged, either being thinner towards the top edge 650 thereof and thicker at a lower edge 652, or vice versa, in order to align the manifold assembly 88 and nozzles 92, 108 as desired within the toilet pan body 10. The gasket 320 may, for example be formed from a thermoplastic elastomer (TPE) or a rubber or similar useful sealing material.

Figure 29C:
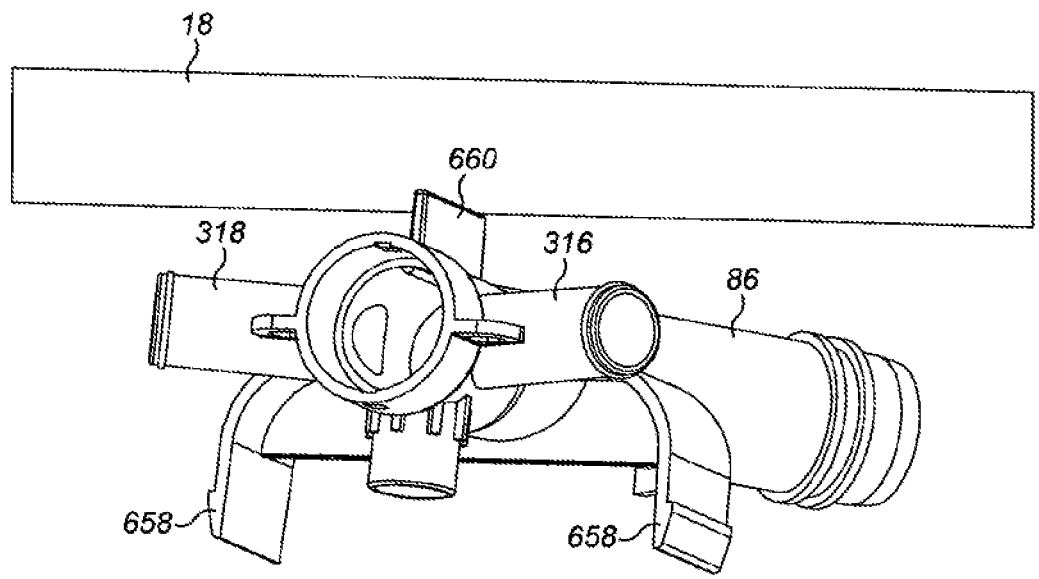

The manifold assembly 88 is modified to include slots 656 for snap-fittingly accepting barbs 658 (also a modification to the arrangement of the earlier embodiment) of water path splitter 86. The modified water path splitter 86 also includes an upstanding alignment member, fin or tab 660, the tab being trimmable (e.g. by cutting) such that it may engage the underside of the raised rear portion 18 (see FIG. 29C) with the gasket 652 substantially unstressed and the air outlet nozzle 108 and central water nozzle 92 correctly oriented for outlet of air and water in the pan 12. The trimmable nature of the tab ensures that this can be achieved despite the natural variations in size of ceramic pans 12 used due to the firing process thereof. The manifold assembly may be held up with the tab 590 engaging the hinge tube 28 using one or more cable ties 88'.

The manifold assembly 88 is also modified to include a pressure relief valve 662 consisting of a sprung diaphragm arrange to open to dump air in the event of excess air pressure, for example if the air pump should produce too much pressure or if a blockage may occur.

Figure 30:
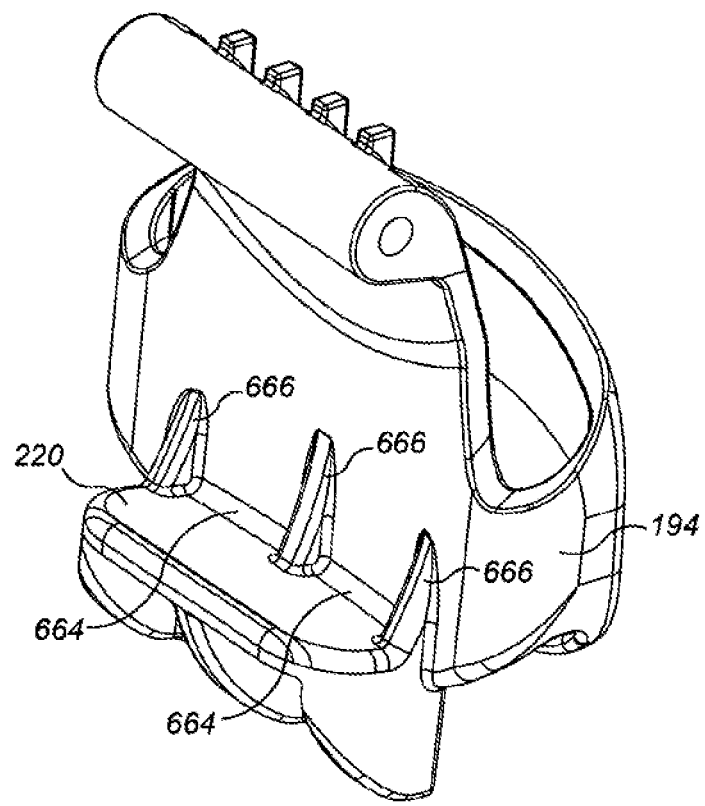
FIG. 30 shows a modified version of the latch member shown in FIG. 6D.

FIG. 30 shows a modification to the latch member 194 in which stress relieving fillets 664 and strengthening ribs 666 are included to strengthen hook 220 portion which engages in recess 14 of pan 12 so that a very large number of flush cycles may be completed without breakage of the latch member 194 due to the forces applied through it due to the potential for pressurization of the pan 12 during flushing.

Instead of injecting the adhesive 430 from below as shown in FIG. 16E it could in other embodiments be applied from a different direction or location.

Instead of using the sleeve 500 (FIG. 25B) to minimize the use of adhesive (and potentially also to minimize undesirable adhesive flow) silicon washers (not shown) could optionally be used to engage the surfaces 502, 504 inside the raised rear portion 18 in its place.

The tool (not shown) for forming the bores 154, 156, 170, 172 (e.g. by molding) may be tapered to allow the parts to come off the tool and these bores may be formed undersize and then reamed out in order to provide a good close rotational fit with the hinge pins(s) 180 and so that the lid 56 and seat 58 do not easily rattle.

A flush sensor (not shown) in the form of a float sensor such as a reed switch may be provided for sensing at least a fill level sufficient for flush in order to prevent a flush without sufficient water in the cistern reservoir. A sensor may also be provided for sensing when a predetermined amount of water has passed through the water pump during a flush and a signal from this may be used in order to switch off the water pump and switch on the air pump, for example after 1.5 litres of flush water, or less or more in some embodiments.

The PCB controller 120 or another component may include means for recording toilet use information such as metered water used, energy use (e.g. by the pumps or more generally) and number of flushes and may incorporate communication means for transmitting such data to a remote location for analysis, for example so that toilet servicing may be easily planned. Such information may incorporate one or more alarm signals, for example, identifying water overflow, blockage or pump pressure conditions.

The present invention merely modified in various ways without departing from the scope of the invention as defined by the accompanying claims as interpreted under patent law.

What is claimed is:
1. A toilet system comprising:
   a cistern body defining a cistern chamber including a water reservoir;
   a water pump in fluid communication with the water reservoir the water pump having a water outlet providing water under pressure when the water pump is operated;
   a toilet pan body having a bowl with a water trap, the bowl receiving water from the water outlet;
   a lid for the toilet pan body having a sealing arrangement for providing a sealed chamber below the lid and above the bowl of the toilet pan when the lid is positioned in a closed orientation; and
   an air pump providing pressurized air to the sealed chamber on top of the water trap when the lid is closed for pushing down on the water trap to evacuate the contents of the toilet pan bowl.

2. The toilet system as claimed in claim 1 in which the water pump is electrically powered.

3. The toilet system as claimed in claim 1 in which the water pump includes a centrifugal impeller, the impeller at rest enabling free flow of water through a body of the water pump to provide an overflow.

4. The toilet system as claimed in claim 1 further comprising a water distribution system coupled to the water outlet to supply water under pressure to the water distribution system directing the water flow onto an interior surface of the bowl of the toilet pan body to wash the bowl.

5. The toilet system as claimed in claim 1 in which the air pump is located in the cistern chamber, the air pump being operable to pump air out of an air outlet from the cistern body.

6. The toilet system as claimed in claim 5 further comprising a control for using the air pump and water pump together.

7. The toilet system as claimed in claim 6 in which the control is arranged to use the air pump and water pump together simultaneously, or one after the other, or overlapping in their durations during a flush cycle.

8. The toilet system as claimed in claim 5 in which both of the air pump and water pump are provided within the cistern body.

9. The toilet system as claimed in claim 1 further comprising a control arranged to operate the water pump for a predetermined time during a flush cycle.

10. The toilet system as claimed in any of claim 1, claim 1 further comprising a control arrangement to operate water pump start and/or stop in response to at least one water level sensor, said at least one sensor optionally being arranged to sense at least a fill level such that flush may be prevented in the event of insufficient water level, and/or so as to sense when predetermined volume has flushed such that water pumping may be stopping after a predetermined volume of flow.

11. The toilet system as claimed in claim 10 further comprising a sensor arranged in the cistern body to determine the level of water in the bowl and to control the operation of the water pump.

12. The toilet system as claimed in claim 1 further comprising a one-way valve located in an outlet path downstream of the water pump.

13. The toilet system as claimed in claim 12 wherein the valve has a poppet element of substantially neutral buoyancy in water.

14. The toilet system as claimed in claim 12 further comprising a conduit leading to atmosphere from a location in an outlet path which is between the water pump and the one-way valve.

15. The toilet system as claimed in claim 1 further comprising a current sensor for sensing current draw by a motor of the air pump and in which a control for the air pump is arranged to stop or slow down the air pump motor in response to a signal from the sensor indicative of air pump motor current draw dropping below a predetermined value or upon a rapid drop in current.

16. The toilet system as claimed in claim 1 further comprising a control arranged to operate the air pump for a predetermined time during a flush cycle.

17. The toilet system as claimed in claim 1 further comprising a control arranged to operate air pump start and/or stop in response to at least one water level sensor.

18. The toilet system as claimed in claim 1 further comprising an overflow weir wall located by the water reservoir.

19. The toilet system as claimed in claim 18 in which the overflow weir wall is higher than all internal passages through the water pump.

20. The toilet system as claimed in claim 18 in which the overflow weir wall separates the water reservoir from a generally downwardly directed overflow channel.

21. The toilet system as claimed in claim 20 in which the overflow channel is arranged to be a rectangular-sectioned vertical channel, and in which the overflow weir wall preferably has three wall portions which correspond to three walls of the rectangular-sectioned vertical channel and over which overflow water may run.

22. The toilet system as claimed in claim 19 in which the overflow channel is located inside the cistern chamber which contains the water reservoir.

23. The toilet system as claimed in claim 20 in which a lower end of the overflow channel is formed with or leads to a collection hopper leading to an outlet of the overflow arrangement.

24. The toilet system as claimed in claim 23 in which the collection hopper is a separately formed component to the channel and the channel has a downwardly extending rim extending into the hopper.

25. The toilet system as claimed in claim 23 in which the overflow channel is provided with a side aperture above the outlet of the overflow arrangement, the side aperture providing an overflow water escape path for the eventuality that flow via the outlet of the overflow arrangement is blocked.

26. The toilet system as claimed in claim 18 in which the overflow weir wall is arranged to be positioned lower than a water inlet to the water reservoir.

27. The toilet system as claimed in claim 4 in which the toilet pan body includes a manifold, the manifold having an air inlet, a water inlet and at least one air outlet and at least one water outlet, the manifold having an end connector adapted to connect both a said air outlet and a said water outlet to a single delivery aperture in a toilet pan body.

28. The toilet system as claimed in claim 27 in which the manifold includes an outer air delivery channel and an inner water delivery channel for transmitting water along inside the outer air delivery channel.

29. The toilet system as claimed in claim 27 in which the inner water delivery channel is adjustable in length, such as by having at least one telescopic connector.

30. The toilet system as claimed in claim 27 further comprising an end plug which is connectable to the outer air channel and for sealingly holding a wall of the toilet pan body therebetween, the end plug including outlets for distributing air and water into a toilet pan, optionally in which the end plug is a telescopic fit with the outer air channel.

31. The toilet system as claimed in claim 27 further comprising an air pressure relief valve for relieving excess air pressure excess air pressure.

32. The toilet system as claimed in claim 27 further comprising a splitter for splitting a single incoming water flow between a plurality of water outlets from the splitter.

33. A toilet comprising:
a cistern body defining a cistern chamber including a water reservoir;
a water pump in fluid communication with the water reservoir, the water pump having a water outlet providing water under pressure when the water pump is operated;
a toilet pan body having a bowl with a water trap, the bowl receiving water from the water outlet;
a lid for the toilet pan body having a sealing arrangement for providing a sealed chamber below the lid and above the bowl of the toilet pan when the lid is positioned in a closed orientation;
an air pump providing pressurized air to the sealed chamber on top of the water trap when the lid is closed for pushing down on the water trap to evacuate the contents of the toilet pan bowl;
wherein the water outlet is connected to a water distribution system and in which the water pump is arranged to supply water under pressure to the water distribution system to direct the water flow onto the interior surface of the bowl of the toilet pan body to wash the bowl;
the toilet pan body including a manifold, the manifold having an air inlet, a water inlet and at least one air outlet and at least one water outlet, the manifold having an end connector connecting to both of the air outlet and the water outlet to a single delivery aperture in a toilet pan body;
a splitter for splitting a single incoming water flow between a plurality of water outlets from the splitter which is mounted to an outer air delivery channel outside the outer air delivery channel and wherein at least one of the water outlets from the splitter is connected to a conduit leading into and then along inside the outer air delivery channel.

34. The toilet system as claimed in claim 27 which includes a sensor for sensing flooding of the manifold.

35. A toilet comprising:
a cistern body defining a cistern chamber including a water reservoir;
a water pump in fluid communication with the water reservoir, the water pump having a water outlet providing water under pressure when the water pump is operated;
a toilet pan body having a bowl with a water trap, the bowl receiving water from the water outlet;
a lid for the toilet pan body having a sealing arrangement for providing a sealed chamber below the lid and above the bowl of the toilet pan when the lid is positioned in a closed orientation;
an air pump providing pressurized air to the sealed chamber on top of the water trap when the lid is closed for pushing down on the water trap to evacuate the contents of the toilet pan bowl; and
a water inlet valve for the water reservoir, the valve including a shroud for deflecting incoming water flow from a water surface of the water reservoir in order to prohibit splashing of the valve and possible contamination of the incoming water supply.

36. The toilet system as claimed in claim 1 in which the pump comprising a rotor and a cylinder both constructed in two halves (or more sub-assemblies) which join over a central drive shaft to form a completed assembly.

37. The toilet system as claimed in claim 36 in which the two halves (or more subassemblies) are joined together at a peripheral support flange.

\* \* \* \* \*

UNITED STATES PATENT AND TRADEMARK OFFICE
CERTIFICATE OF CORRECTION

PATENT NO. : 10,612,223 B2
APPLICATION NO. : 15/828020
DATED : April 7, 2020
INVENTOR(S) : Garry Moore It is certified that error appears in the above-identified patent and that said Letters Patent is hereby corrected as shown below:

In the Claims

Column 30, Lines 43-44, Claim 10:
After "as claimed in"
Delete "any of claim 1".

Column 30, Line 45, Claim 10:
After "pump start and / or stop in response"
Insert -- to --.

Column 31, Lines 66-67, Claim 31:
After "air pressure relief valve for relieving excess pressure"
Delete "excess pressure" (second instance).

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*